(12) United States Patent
Kikukawa et al.

(10) Patent No.: US 10,999,498 B2
(45) Date of Patent: May 4, 2021

(54) IMAGE PROCESSING APPARATUS AND IMAGE PROCESSING METHOD

(71) Applicant: SONY CORPORATION, Tokyo (JP)

(72) Inventors: Tetsuya Kikukawa, Tokyo (JP); Junichi Tanaka, Kanagawa (JP)

(73) Assignee: Sony Corporation, Tokyo (JP)

(*) Notice: Subject to any disclaimer, the term of this patent is extended or adjusted under 35 U.S.C. 154(b) by 17 days.

(21) Appl. No.: 16/318,310

(22) PCT Filed: Jul. 14, 2017

(86) PCT No.: PCT/JP2017/025722
§ 371 (c)(1),
(2) Date: Jan. 16, 2019

(87) PCT Pub. No.: WO2018/021066
PCT Pub. Date: Feb. 1, 2018

(65) Prior Publication Data
US 2019/0230280 A1 Jul. 25, 2019

(30) Foreign Application Priority Data

Jul. 29, 2016 (JP) .............................. JP2016-149881

(51) Int. Cl.
*H04N 5/225* (2006.01)
*H04N 5/232* (2006.01)
(Continued)

(52) U.S. Cl.
CPC ....... *H04N 5/23229* (2013.01); *G06T 3/4053* (2013.01); *G06T 7/50* (2017.01);
(Continued)

(58) Field of Classification Search
CPC ......... G06T 15/00; G06T 15/04; G06T 15/08; G06T 15/10; G06T 19/00; G06T 15/20;
(Continued)

(56) References Cited

U.S. PATENT DOCUMENTS

2010/0215251 A1* 8/2010 Klein Gunnewiek ...................... H04N 13/128
382/154
2015/0125093 A1* 5/2015 Jeong ...................... G06T 11/60
382/284
(Continued)

FOREIGN PATENT DOCUMENTS

CN 101822068 A 9/2010
JP 2006-014174 A 1/2006
(Continued)

OTHER PUBLICATIONS

International Search Report and Written Opinion of PCT Application No. PCT/JP2017/025722, dated Oct. 10, 2017, 07 pages of ISRWO.

*Primary Examiner* — Kelly L Jerabek
(74) *Attorney, Agent, or Firm* — Chip Law Group

(57) ABSTRACT

The present disclosure relates to an image processing apparatus and an image processing method that make it possible to generate a high picture quality texture image of a predetermined viewpoint using an omnidirectional image. A reception section receives a texture image and a depth image as well as a guide image to be referred to upon generation of a display image in which the texture image and the depth image are used. A drawing section compares a pixel value of the display image generated using the texture image and the depth image and a corresponding pixel value of the guide image with each other and executes a process for changing the pixel value in response to a result of the comparison. The present disclosure can be applied, for example, to a home server or the like that generates a display image of a predetermined viewpoint from an omnidirectional image.

17 Claims, 47 Drawing Sheets

(51) Int. Cl.
  *G06T 15/20*   (2011.01)
  *H04N 13/00*   (2018.01)
  *G06T 7/50*    (2017.01)
  *H04N 13/111*  (2018.01)
  *G06T 3/40*    (2006.01)

(52) U.S. Cl.
  CPC ......... *G06T 15/20* (2013.01); *H04N 5/23238* (2013.01); *H04N 13/00* (2013.01); *H04N 13/111* (2018.05)

(58) Field of Classification Search
  CPC ......... G06T 7/50; G06T 3/4053; H04N 13/00; H04N 13/111; H04N 5/23238; H04N 5/23229
  See application file for complete search history.

(56) References Cited

U.S. PATENT DOCUMENTS

| | | | | |
|---|---|---|---|---|
| 2015/0201176 A1* | 7/2015 | Graziosi | .............. | H04N 13/243 348/43 |
| 2017/0150115 A1* | 5/2017 | Vandewalle | ......... | H04N 13/351 |
| 2017/0280133 A1* | 9/2017 | Niemela | .............. | H04N 13/257 |

FOREIGN PATENT DOCUMENTS

| | | | |
|---|---|---|---|
| JP | 2011-501496 A | 1/2011 |
| KR | 10-2010-0095420 A | 8/2010 |
| RU | 2010118446 A | 11/2011 |
| WO | 2009/047681 A1 | 4/2009 |

\* cited by examiner

FIG. 9

| FILE NAME | AZIMUTH ANGLE | ELEVATION ANGLE | ROTATION ANGLE | SIGHT LINE VECTOR (X, Y, Z) | | | VIEWPOINT POSITION INFORMATION (X, Y, Z) | | | TRANSVERSE ANGLE OF VIEW | VERTICAL ANGLE OF VIEW | TRANSVERSE PIXEL NUMBER | VERTICAL PIXEL NUMBER |
|---|---|---|---|---|---|---|---|---|---|---|---|---|---|
| posZ | 0° | 0° | 0° | 0 | 0 | +1 | 0 | 0 | 0 | 100° | 100° | 1024 | 1024 |
| negZ | −180° | 0° | 0° | 0 | 0 | −1 | 0 | 0 | 0 | 100° | 100° | 1024 | 1024 |
| posX | +90° | 0° | 0° | +1 | 0 | 0 | 0 | 0 | 0 | 100° | 100° | 1024 | 1024 |
| negX | −90° | 0° | 0° | −1 | 0 | 0 | 0 | 0 | 0 | 100° | 100° | 1024 | 1024 |
| posY | 0° | +90° | 0° | 0 | +1 | 0 | 0 | 0 | 0 | 100° | 100° | 1024 | 1024 |
| negY | 0° | −90° | 0° | 0 | −1 | 0 | 0 | 0 | 0 | 100° | 100° | 1024 | 1024 |

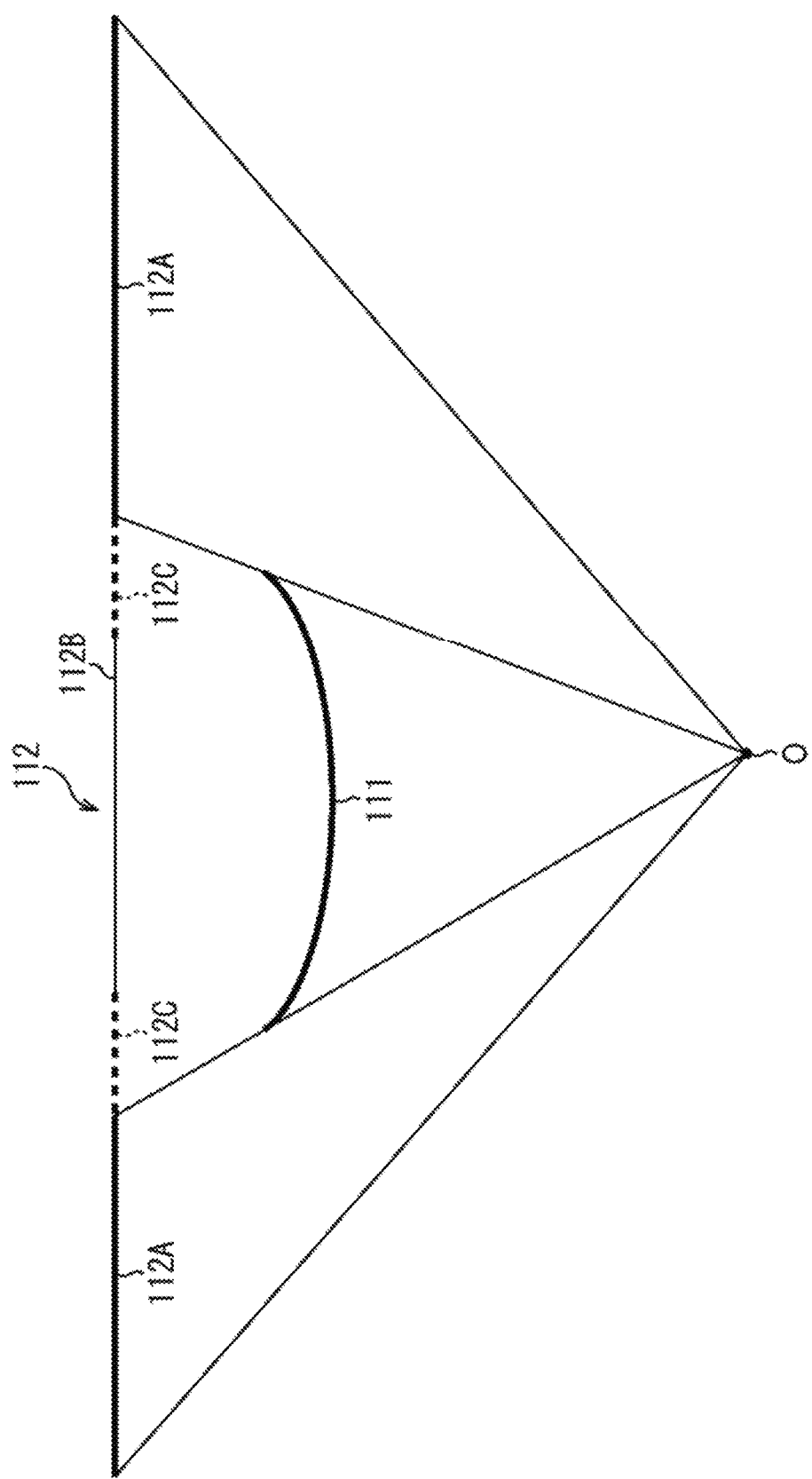

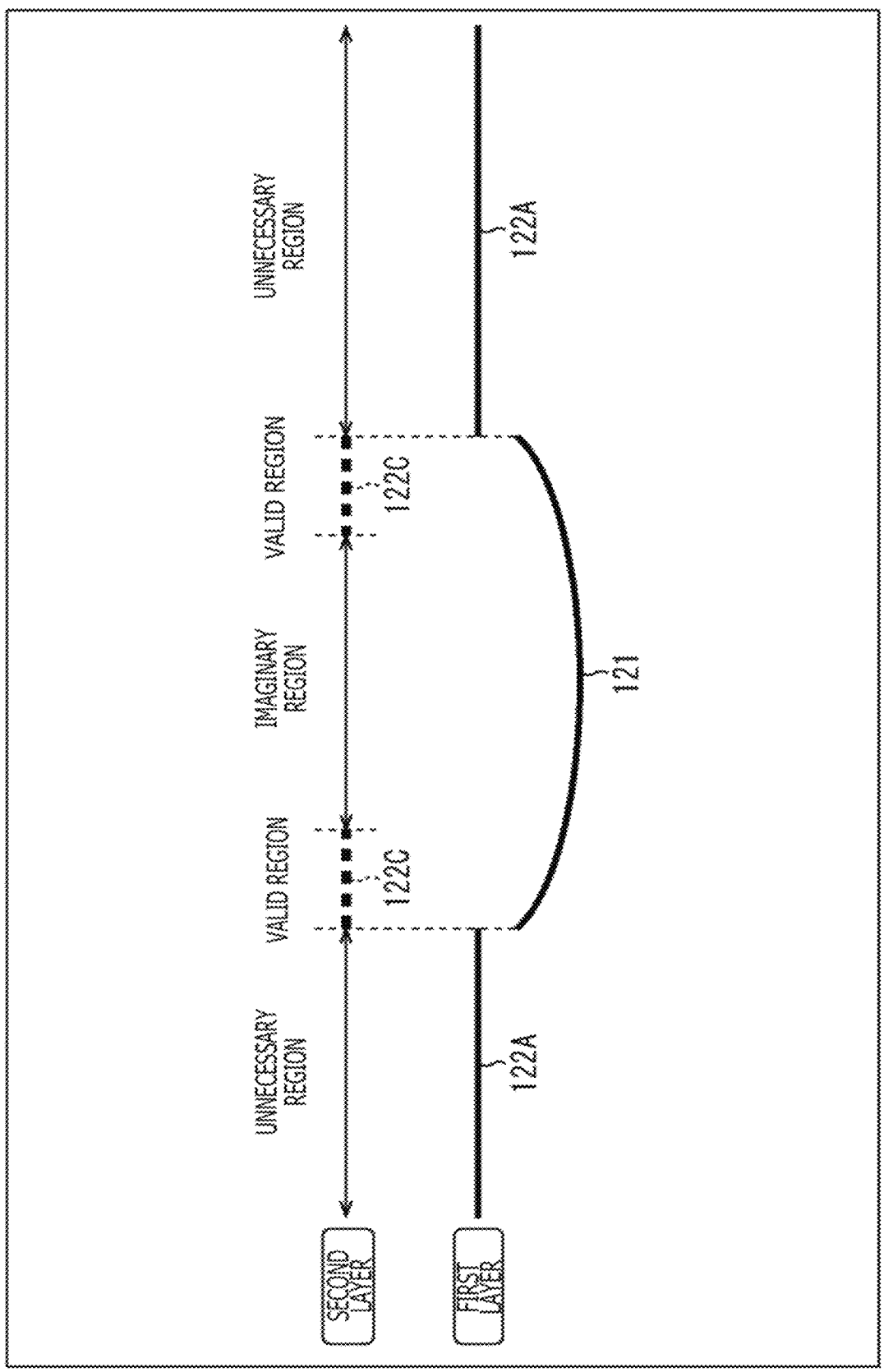

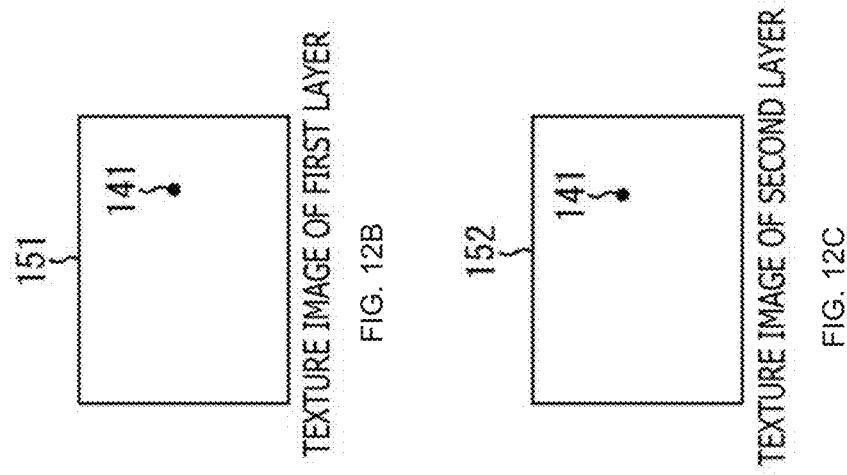

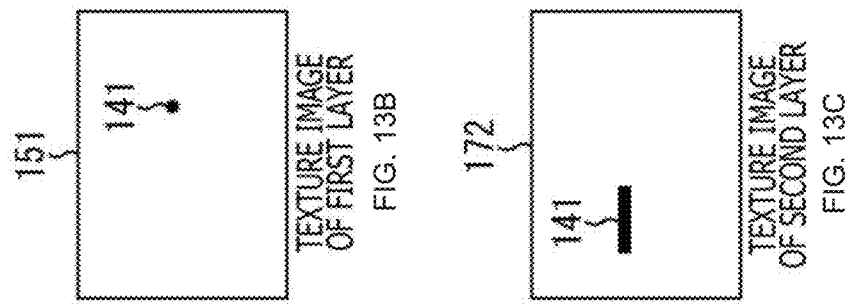
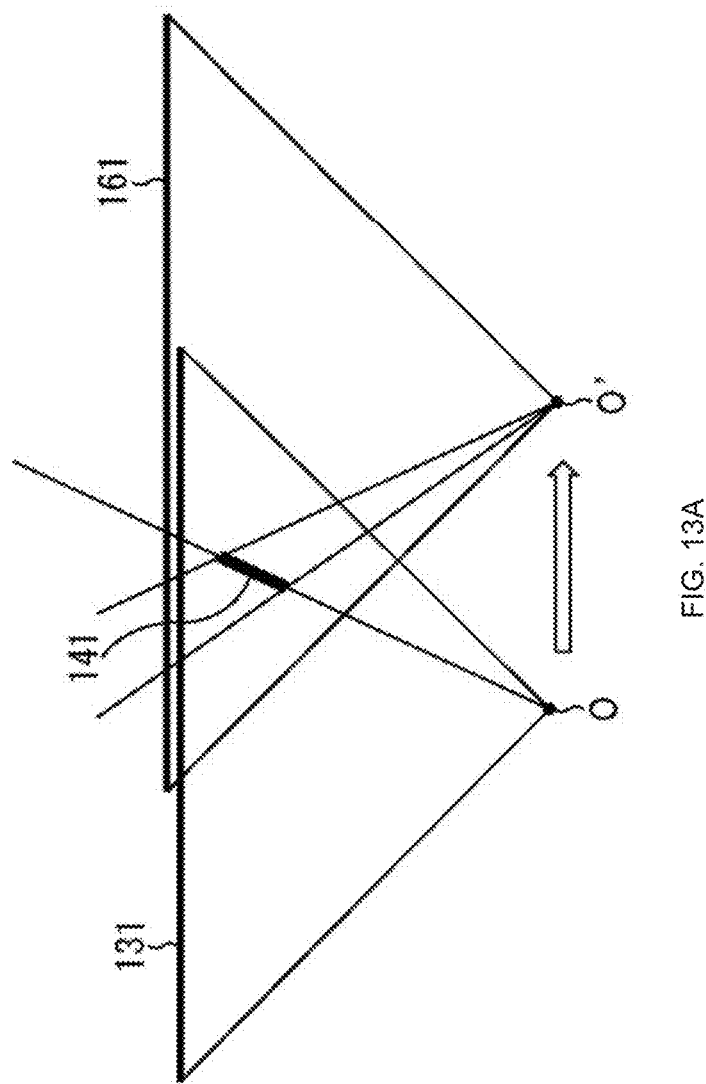

FIG. 15

| FILE NAME | AZIMUTH ANGLE | ELEVATION ANGLE | ROTATION ANGLE | SIGHT LINE VECTOR (X, Y, Z) | | | VIEWPOINT POSITION INFORMATION (X, Y, Z) | | | TRANSVERSE ANGLE OF VIEW | VERTICAL ANGLE OF VIEW | TRANSVERSE PIXEL NUMBER | VERTICAL PIXEL NUMBER |
|---|---|---|---|---|---|---|---|---|---|---|---|---|---|
| posZ2 | 0° | 0° | 0° | 0 | 0 | +1 | +a | 0 | 0 | 100° | 100° | 1024 | 1024 |
| negZ2 | −180° | 0° | 0° | 0 | 0 | −1 | −a | 0 | 0 | 100° | 100° | 1024 | 1024 |
| posX2 | +90° | 0° | 0° | +1 | 0 | 0 | 0 | +a | 0 | 100° | 100° | 1024 | 1024 |
| negX2 | −90° | 0° | 0° | −1 | 0 | 0 | 0 | −a | 0 | 100° | 100° | 1024 | 1024 |
| posY2 | 0° | +90° | 0° | 0 | +1 | 0 | 0 | 0 | +a | 100° | 100° | 1024 | 1024 |
| negY2 | 0° | −90° | 0° | 0 | −1 | 0 | 0 | 0 | −a | 100° | 100° | 1024 | 1024 |

FIG. 17

| FILE NAME | AZIMUTH ANGLE | ELEVATION ANGLE | ROTATION ANGLE | SIGHT LINE VECTOR (X,Y,Z) | | | VIEWPOINT POSITION INFORMATION (X,Y,Z) | | | TRANSVERSE ANGLE OF VIEW | VERTICAL ANGLE OF VIEW | TRANSVERSE PIXEL NUMBER | VERTICAL PIXEL NUMBER |
|---|---|---|---|---|---|---|---|---|---|---|---|---|---|
| posZ2 | 0° | 0° | 0° | 0 | 0 | +1 | +a | −a | 0 | 100° | 100° | 1024 | 1024 |
| negZ2 | −180° | 0° | 0° | 0 | 0 | −1 | −a | +a | 0 | 100° | 100° | 1024 | 1024 |
| posX2 | +90° | 0° | 0° | +1 | 0 | 0 | 0 | +a | −a | 100° | 100° | 1024 | 1024 |
| negX2 | −90° | 0° | 0° | −1 | 0 | 0 | 0 | −a | +a | 100° | 100° | 1024 | 1024 |
| posY2 | 0° | +90° | 0° | 0 | +1 | 0 | −a | 0 | +a | 100° | 100° | 1024 | 1024 |
| negY2 | 0° | −90° | 0° | 0 | −1 | 0 | +a | 0 | −a | 100° | 100° | 1024 | 1024 |

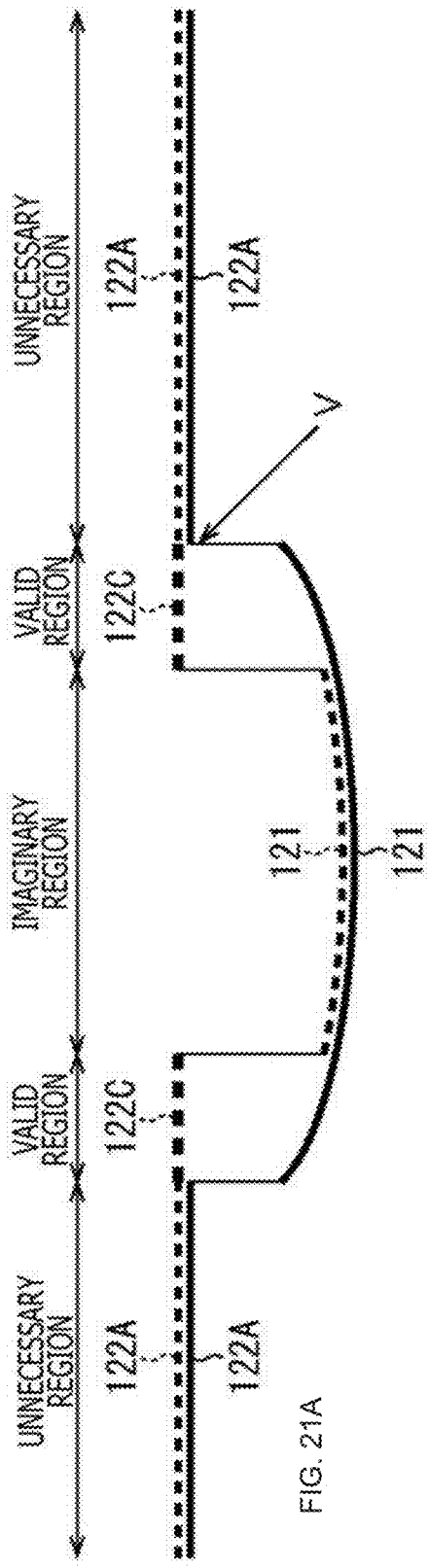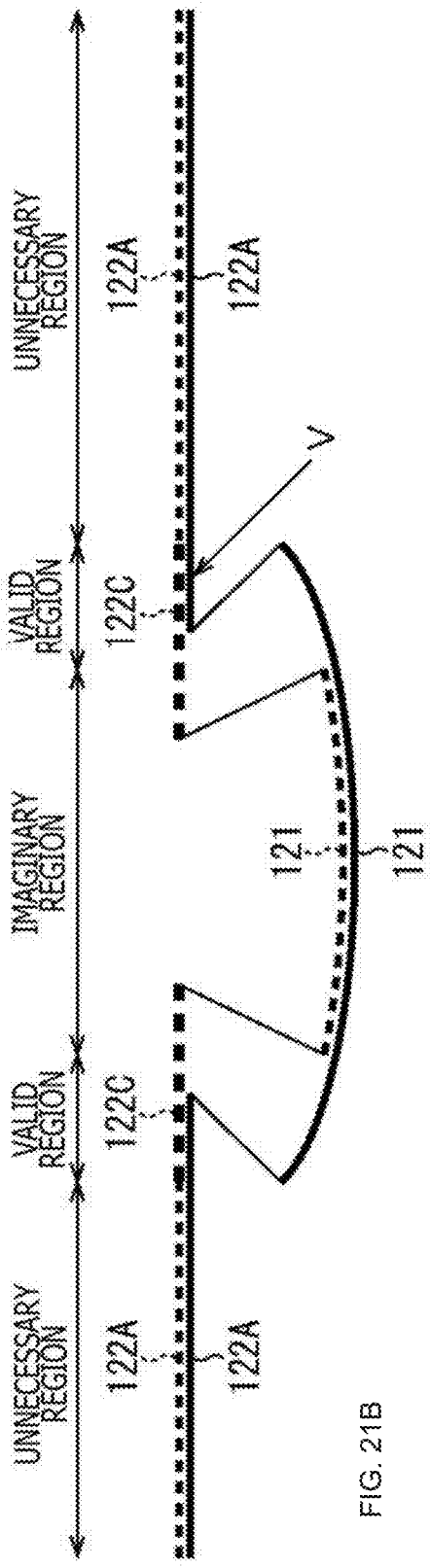

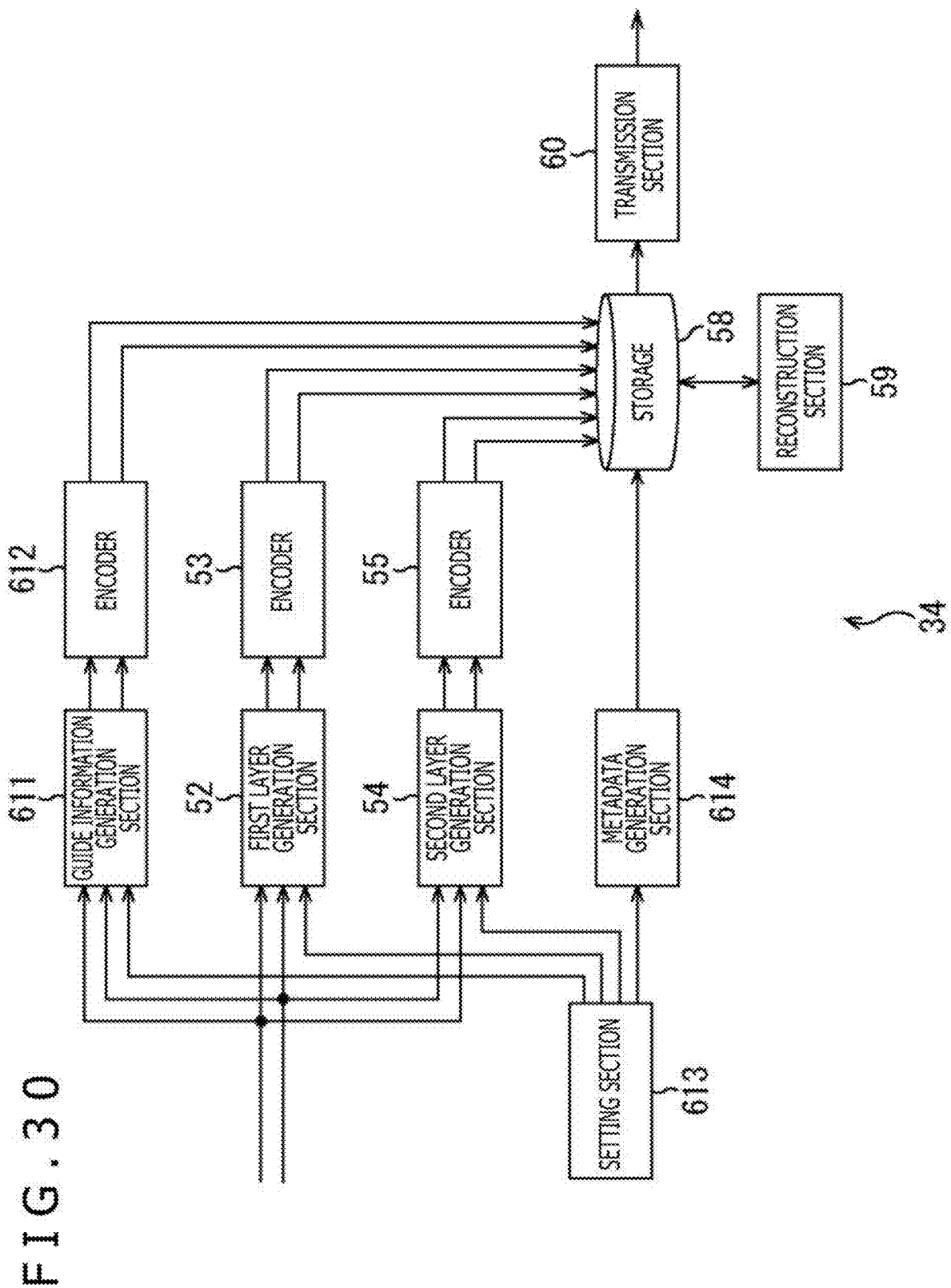

FIG. 32

| FILE NAME | AZIMUTH ANGLE | ELEVATION ANGLE | ROTATION ANGLE | SIGHT LINE VECTOR (x, y, z) | | | VIEWPOINT COORDINATES (x, y, z) | | | TRANSVERSE ANGLE OF VIEW | VERTICAL ANGLE OF VIEW | TRANSVERSE PIXEL NUMBER | VERTICAL PIXEL NUMBER | FLAG | GUIDE ID | CAMERA PARAMETER | REFERENCE GUIDE ID |
|---|---|---|---|---|---|---|---|---|---|---|---|---|---|---|---|---|---|
| posZ | 0° | 0° | 0° | 0 | 0 | +1 | 0 | 0 | 0 | 100° | 100° | 1024 | 1024 | false | — | — | 1 |
| negZ | −180° | 0° | 0° | 0 | 0 | −1 | 0 | 0 | 0 | 100° | 100° | 1024 | 1024 | false | — | — | 2 |
| posX | +90° | 0° | 0° | +1 | 0 | 0 | 0 | 0 | 0 | 100° | 100° | 1024 | 1024 | false | — | — | 3 |
| negX | −90° | 0° | 0° | −1 | 0 | 0 | 0 | 0 | 0 | 100° | 100° | 1024 | 1024 | false | — | — | 4 |
| posY | 0° | +90° | 0° | 0 | +1 | 0 | 0 | 0 | 0 | 100° | 100° | 1024 | 1024 | false | — | — | 5 |
| negY | 0° | −90° | 0° | 0 | −1 | 0 | 0 | 0 | 0 | 100° | 100° | 1024 | 1024 | false | — | — | 6 |
| guid1 | — | — | — | — | — | — | — | — | — | 100° | 100° | 512 | 512 | true | 1 | ARt | — |
| guid2 | — | — | — | — | — | — | — | — | — | 100° | 100° | 512 | 512 | true | 2 | ARt | — |
| guid3 | — | — | — | — | — | — | — | — | — | 100° | 100° | 512 | 512 | true | 3 | ARt | — |
| guid4 | — | — | — | — | — | — | — | — | — | 100° | 100° | 512 | 512 | true | 4 | ARt | — |
| guid5 | — | — | — | — | — | — | — | — | — | 100° | 100° | 512 | 512 | true | 5 | ARt | — |
| guid6 | — | — | — | — | — | — | — | — | — | 100° | 100° | 512 | 512 | true | 6 | ARt | — | p₁: TEXTURE IMAGE OF SECOND LAYER (WITH DEPTH INFORMATION)
p₂: GUIDE IMAGE (WITH DEPTH INFORMATION, WITHOUT DEPTH INFORMATION)
X: SAMPLING POINT IN 3D MODEL COORDINATE SYSTEM
$x_1$: TWO-DIMENSIONAL POSITION OF X ON $p_1$
$x_2$: TWO-DIMENSIONAL POSITION OF X ON $p_2$ $$x_1 = P_1 X \qquad x_2 = P_2 X$$
$$P_1 = A_1 [R_1 t_1] \qquad P_2 = A_2 [R_2 t_2]$$

| | RESOLUTION | FRAME RATE | DEPTH INFORMATION |
|---|---|---|---|
| A | 1920x1080 | 30fps | PRESENT |
| B | 960x540 | 20fps | PRESENT |
| C | 480x270 | 10fps | ABSENT |

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/025722 filed on Jul. 14, 2017, which claims priority benefit of Japanese Patent Application No. JP 2016-149881 filed in the Japan Patent Office on Jul. 29, 2016. Each of the above-referenced applications is hereby incorporated herein by reference in its entirety.

TECHNICAL FIELD

The present disclosure relates to an image processing apparatus and an image processing method, and particularly to an image processing apparatus and an image processing method that make it possible to generate a texture image of high picture quality at a predetermined viewpoint using an omnidirectional image.

BACKGROUND ART

A storage apparatus is available which generates an omnidirectional image in which picked up images over 360 degrees around in a horizontal direction and over 180 degrees around in a vertical direction imaged with a multi camera are mapped to a 2D image (plane image) and encodes and stores the generated omnidirectional image (for example, refer to PTL 1).

Further, a reproduction apparatus is available which decodes an encoded stream of an omnidirectional image stored by a storage apparatus and displays a texture image within a viewing range of a viewer using the omnidirectional image obtained as a result of the decoding. Such a reproduction apparatus as just described displays a texture image within a viewing range of the viewer when the surface of a 3D model such as a sphere, a cube or the like to which the omnidirectional image is pasted is viewed in a sight line direction of the viewer from a viewpoint that is one point in the inside of the 3D model. Consequently, a picked up image within the viewing range of the viewer from a predetermined viewpoint is reproduced.

CITATION LIST

Patent Literature

[PTL 1]
Japanese Patent Laid-Open No. 2006-14174

SUMMARY

Technical Problem

However, in the case where the viewpoint upon generation of an omnidirectional image and the viewpoint upon reproduction are different from each other, an occlusion region of the viewpoint upon generation of the omnidirectional image is included in the generated texture image within the viewing range of the viewer at the viewpoint upon reproduction. Accordingly, the picture quality of the texture image in the viewing range of the viewer at the viewpoint upon reproduction is degraded. The occlusion region is a region of an imaging object in the back hidden by another imaging object in front.

The present disclosure has been made in view of such a situation as described above and makes it possible to generate a texture image of high picture quality at a predetermined viewpoint using an omnidirectional image.

Solution to Problem

An image processing apparatus of a first aspect of the present disclosure includes a reception section configured to receive a texture image and a depth image as well as a guide image to be referred to upon generation of a display image in which the texture image and the depth image are used, and a guide image utilization section configured to compare a pixel value of the display image generated using the texture image and the depth image and a corresponding pixel value of the guide image with each other and execute a process for changing the pixel value in response to a result of the comparison.

The image processing method of the first aspect of the present disclosure is performed by an image processing apparatus and includes the steps of receiving a texture image and a depth image as well as a guide image to be referred to upon generation of a display image in which the texture image and the depth image are used, and comparing a pixel value of the display image generated using the texture image and the depth image and a corresponding pixel value of the guide image with each other and executing a process for changing the pixel value in response to a result of the comparison.

In the first aspect of the present disclosure, a texture image and a depth image as well as a guide image to be referred to upon generation of a display image in which the texture image and the depth image are used are received, and a pixel value of the display image generated using the texture image and the depth image and a corresponding pixel value of the guide image are compared with each other and a process for changing the pixel value in response to a result of the comparison is executed.

An image processing apparatus of a second aspect of the present disclosure includes an image generation section configured to generate a texture image and a depth image as well as a guide image to be referred to upon generation of a display image in which the texture image and the depth image are used.

An image processing method of the second aspect of the present disclosure is performed by an image processing apparatus and includes the step of generating a texture image and a depth image as well as a guide image to be referred to upon generation of a display image in which the texture image and the depth image are used.

In the second aspect of the present disclosure, a texture image and a depth image as well as a guide image to be referred to upon generation of a display image in which the texture image and the depth image are used are generated.

The image processing apparatus may be an independent apparatus or may be an internal block that configures one apparatus.

It is to be noted that the image processing apparatus of the first and second aspects of the present disclosure can be implemented by causing a computer to execute a program.

Further, the program for being executed by a computer in order to implement the image processing apparatus of the first and second aspects of the present disclosure may be provided by transmission through a transmission medium or by recording the program on a recording medium.

Advantageous Effect of Invention

According to the first aspect of the present disclosure, a texture image of high picture quality at a predetermined viewpoint can be generated using an omnidirectional image.

Further, according to the second aspect of the present disclosure, an image can be generated such that a texture image of high picture quality of a predetermined viewpoint can be generated using an omnidirectional image.

It is to be noted that the effects described here are not necessarily restrictive and may be some effects described in the present disclosure.

BRIEF DESCRIPTION OF DRAWINGS

FIG. 9 is a view depicting a configuration example of a table for viewpoint position information and face information of the first layer.

FIG. 10 is a view depicting a position in a depth direction of an imaging object corresponding to a predetermined face of the first layer.

FIG. 11 is a view depicting a configuration example of texture images of the first layer and a second layer.

FIGS. 12A, 12B, and 12C are views illustrating an example of texture images of the first layer and the second layer.

FIGS. 13A, 13B, and 13C are views illustrating another example of texture images of the first layer and the second layer.

FIG. 15 is a view depicting a first configuration example of a table of viewpoint position information and face information of the second layer.

FIG. 17 is a view depicting a second configuration example of a table of viewpoint position information and face information of the second layer.

FIGS. 21A and 21B are views illustrating an example of connection information.

FIG. 30 is a block diagram depicting a configuration example of a high resolution image processing section in a second embodiment.

FIG. 32 is a view depicting an example of metadata generated by a metadata generation section.

DESCRIPTION OF EMBODIMENTS

In the following, a mode for carrying out the present disclosure (hereinafter referred to as embodiment) is described. It is to be noted that the description is given in the following order.

1. First Embodiment: Image Displaying System (FIGS. 1, 2, 3, 4A, 4B, 5A, 5B, 6, 7, 8A, 8B, 9, 10, 11, 12A, 12B, 12C, 13A, 13B, 13C, 14A, 14B, 14, 15, 16A, 16B, 17, 18, 19, 20, 21A, 21B, 22, 23A, 23B, 24A, 24B, 25A, 25B, 26, 27, and 28)

Figure 46:
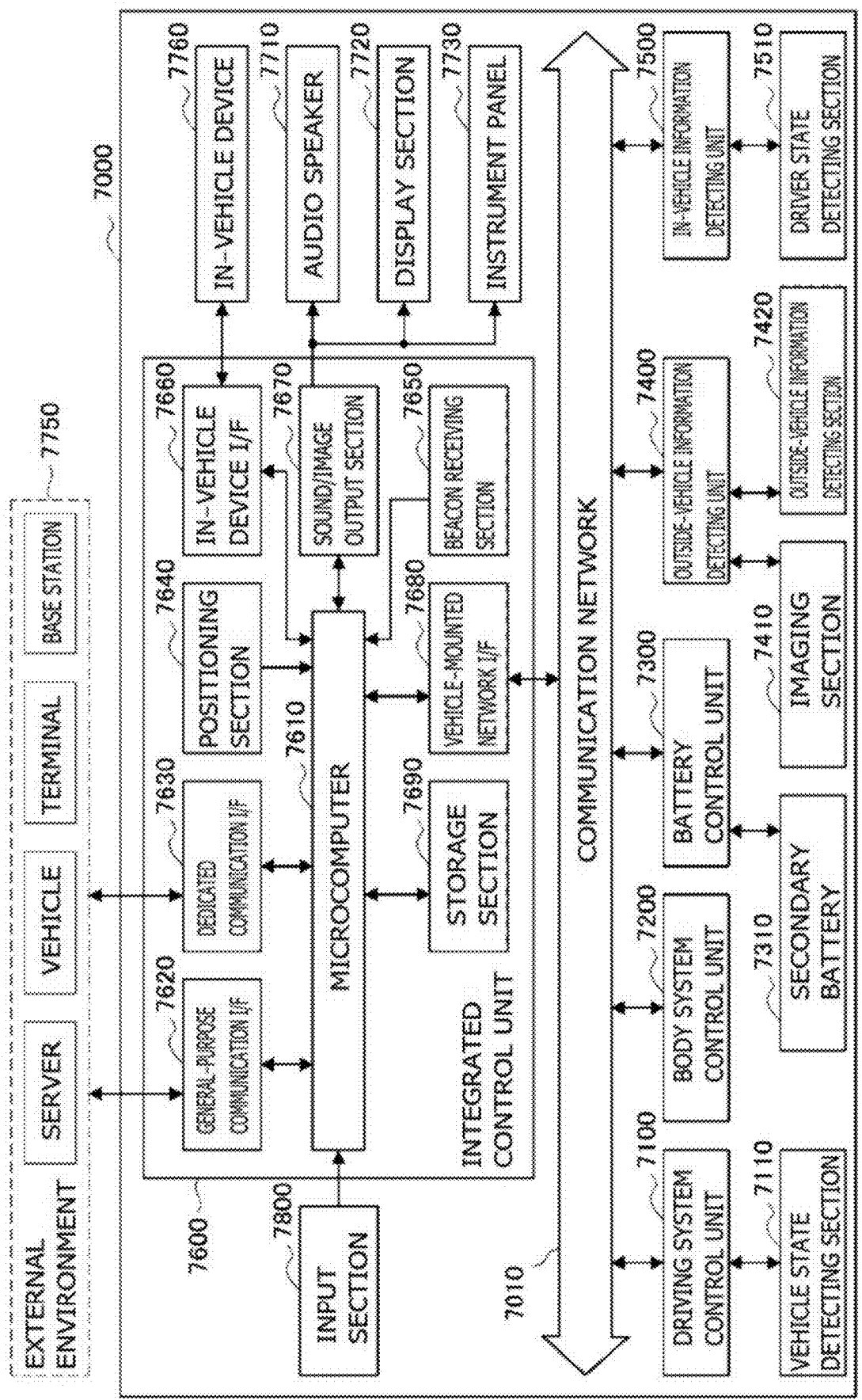
FIG. 46 is a block diagram depicting an example of schematic configuration of a vehicle control system.
Figure 47:
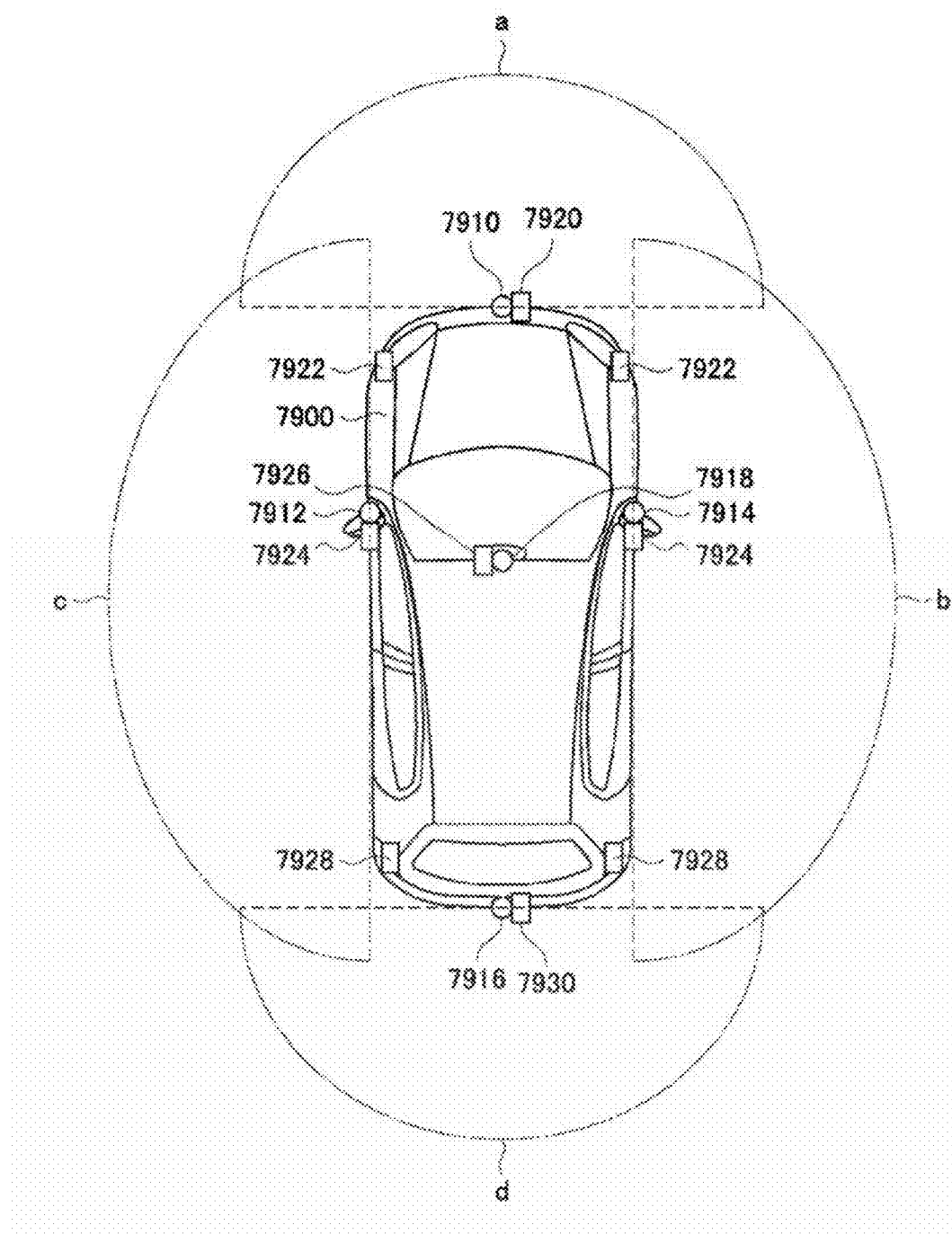
FIG. 47 is a diagram of assistance in explaining an example of installation positions of an outside-vehicle information detecting section and an imaging section.

2. Second Embodiment: Image Displaying System (FIGS. 29, 30, 31A, 31B, 32, 33, 34, 35, 36, 37, 38, 39, 40A, 40B, 41, 42A, and 42B)
3. Third Embodiment: Image Displaying System (FIG. 43)
4. Different Example of Texture Image (FIGS. 44A and 44B)
5. Fourth Embodiment: Computer (FIG. 45)
6. Application Example (FIGS. 46 and 47)

1. First Embodiment (Configuration Example of First Embodiment of Image Displaying System)

Figure 1:
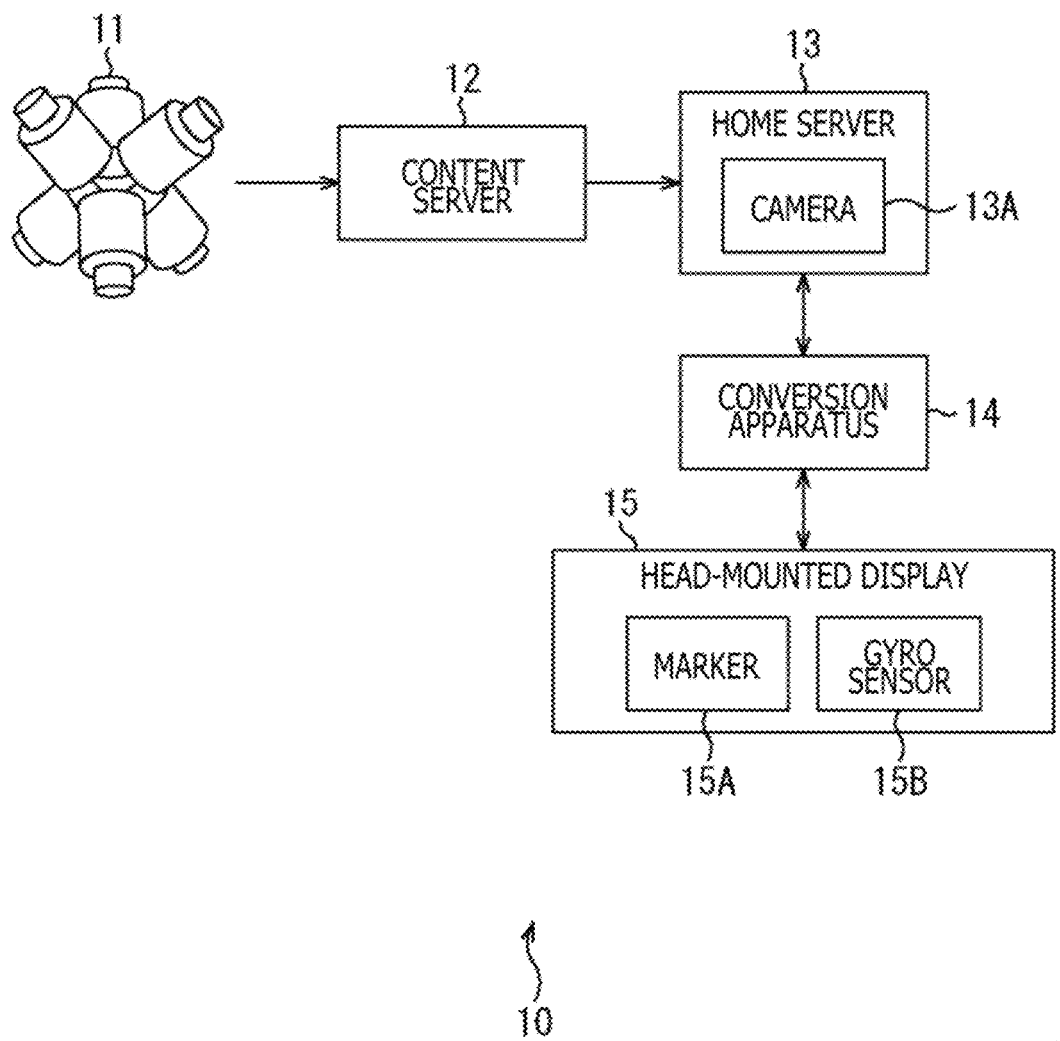
FIG. 1 is a block diagram depicting a configuration example of a first embodiment of an image displaying system to which the present disclosure is applied.

FIG. 1 is a block diagram depicting a configuration example of a first embodiment of an image displaying system to which the present disclosure is applied.

The image displaying system 10 of FIG. 1 includes a multi camera 11, a content server 12, a home server 13, a conversion apparatus 14, and a head mounted display 15. The image displaying system 10 generates an omnidirectional image from picked up images that are YCbCr images (YCbCr images) picked up by the multi camera 11 and displays an image of a viewing range of a viewer from within the omnidirectional image.

In particular, the multi camera 11 of the image displaying system 10 includes a plurality of (in the example of FIG. 1, six) cameras disposed outward such that an imaging range thereof is 360 degrees around in a horizontal direction and 180 degrees around in a vertical direction. Each camera performs imaging to generate a picked up image in a unit of a frame. The multi camera 11 supplies the picked up images of the cameras to the content server 12.

The content server 12 (image processing apparatus) generates a texture image and a depth image of an omnidirectional image of a predetermined viewpoint from picked up images of the cameras supplied from the multi camera 11. In the first embodiment, a depth image is an image, in which a pixel value is given by a reciprocal 1/r of a distance r of a straight line from the predetermined viewpoint to an imaging object on each pixel, the distance r being a value of 8 bits.

The content server 12 reduces the resolution of a texture image and a depth image of an omnidirectional image to generate a low resolution texture image and a low resolution depth image. The content server 12 compression encodes the low resolution texture image and the low resolution depth image by an encoding method such as AVC (Advanced Video Coding), HEVC (High Efficiency Video Coding)/H.265 or the like. The content server 12 stores an encoded stream of the low resolution texture image (hereinafter referred to as low resolution texture stream) and an encoded stream of the low resolution depth image (hereinafter referred to as low resolution depth stream) obtained as a result of the compression encoding.

Further, the content server 12 uses picked up images of the cameras to generate texture images and depth images corresponding to six faces configuring a cube centered at the viewpoint of the omnidirectional image in a hierarchized relationship. In particular, the content server 12 generates texture images and depth images of a first layer and a second layer of the six faces. It is to be noted that the viewpoint of the omnidirectional image and the center of the cube may be different from each other.

The content server 12 compression encodes a first layer image including a texture image and a depth image of the first layer of each face and a second layer image including a texture image and a depth image of the second layer of each face in accordance with an encoding method such as AVC, HEVC or the like for each face, each type of image and each layer. The content server 12 stores an encoded stream of a texture image of the first layer (hereinafter referred to as first layer texture stream), an encoded stream of a depth images of the first layer (hereinafter referred to as first layer depth stream), an encoded stream of a texture image of the second layer (hereinafter referred to as second layer texture stream) and an encoded stream of a depth image of the second layer (hereinafter referred to as second layer depth stream) of each face obtained as a result of the compression encoding. It is to be noted that the encoding method for the first layer images and the second layer images may be the MVC (Multiview Video Coding) method, 3D-HEVC method or the like.

Further, the content server 12 generates and stores information and so forth relating to the faces of the first layer and the second layer as metadata. The content server 12 transmits the low resolution texture stream and the low resolution depth stream, the first layer texture streams, first layer depth streams, second layer texture streams and second layer depth streams of the six faces and the metadata stored therein to the home server 13 through a network not depicted.

It is to be noted that also it is possible for the content server 12 to reconstruct (details are hereinafter described) a first layer texture stream, a first layer depth stream, a second layer texture stream and a second layer depth stream of the six faces. In this case, also it is possible for the content server 12 to transmit the first layer texture streams, first layer depth streams, second layer texture streams and second layer depth streams after the reconstruction and metadata corresponding to them to the home server 13. However, it is assumed that, in the following description, even in the case where reconstruction is performed, the first layer texture streams, first layer depth streams, second layer texture streams and second layer depth streams of the six faces before the reconstruction are transmitted to the content server 12.

The home server 13 (image processing apparatus) receives a low resolution texture stream and a low resolution depth stream, first layer texture streams, first layer depth streams, second layer texture streams and second layer depth streams of the six faces and metadata transmitted thereto from the content server 12.

Further, the home server 13 has a camera 13A built therein and images a marker 15A applied to the head mounted display 15 mounted on the head of a viewer. Then, the home server 13 detects a viewing position on the basis of the picked up image of the marker 15A. Furthermore, the home server 13 receives a detection result of a gyro sensor 15B of the head mounted display 15 from the head mounted display 15 through the conversion apparatus 14. The home server 13 determines a sight line direction of the viewer on the basis of the detection result of the gyro sensor 15B and determines a viewing range of the viewer on the basis of the viewing position and the sight line direction.

The home server 13 has three faces corresponding to the sight line direction of the viewer from the six faces of the first layer. Then, the home server 13 decodes the first layer texture streams, first layer depth streams, second layer texture streams and second layer depth streams corresponding to the selected three faces. Consequently, the home server 13 generates texture images and depth images of the first layer and the second layer corresponding to the selected three faces.

Further, the home server 13 decodes the low resolution texture stream and the low resolution depth stream to generate a low resolution texture image and a low resolution depth image. The home server 13 generates an image of the viewing range of the viewer as a display image using the texture images and the depth images of the first layer and the second layer corresponding to the selected three faces as well as the low resolution texture image and the low resolution depth image. The home server 13 transmits the display image to the conversion apparatus 14 through an HDMI (registered trademark) (High-Definition Multimedia Interface) cable not depicted.

The conversion apparatus 14 converts coordinates on the display image transmitted thereto from the home server 13 into coordinates in the head mounted display 15. The conversion apparatus 14 supplies the display image after the coordinate conversion to the head mounted display 15.

The head mounted display 15 has the marker 15A and the gyro sensor 15B and is mounted on the head of a viewer. The head mounted display 15 displays a display image supplied from the conversion apparatus 14. Further, the gyro sensor 15B built in the head mounted display 15 detects an inclination of the head mounted display 15 and transmits a result of the detection to the home server 13 through the conversion apparatus 14.

(Configuration Example of Content Server)

Figure 2:
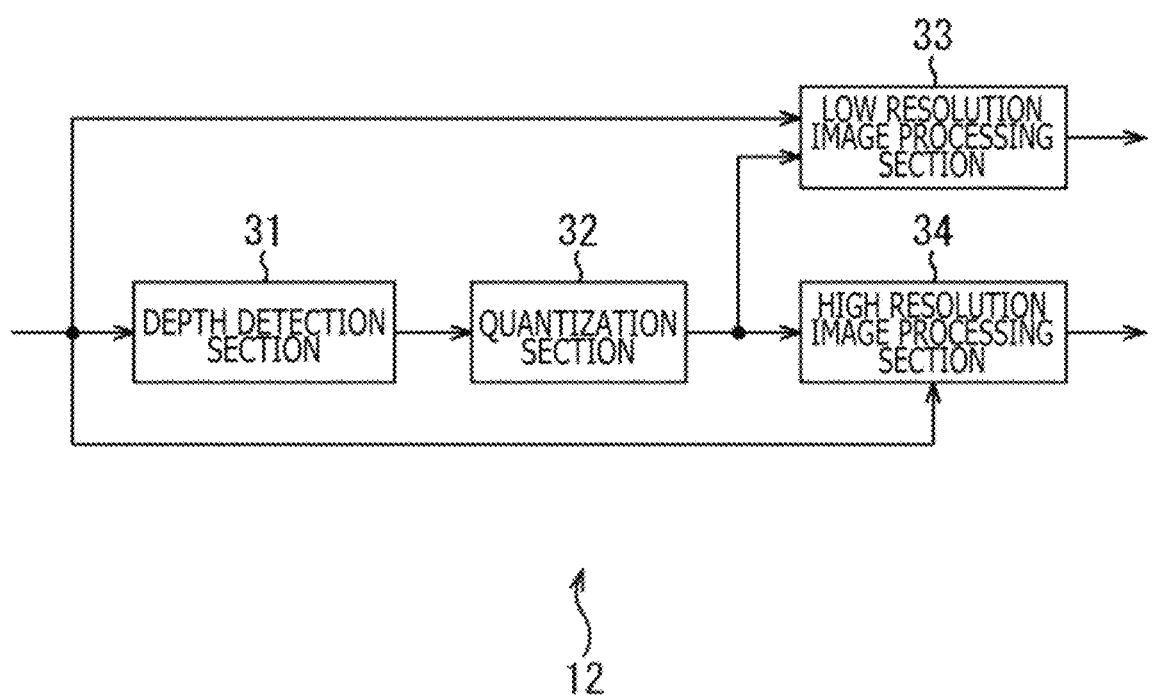
FIG. 2 is a block diagram depicting a configuration example of a content server.

FIG. 2 is a block diagram depicting a configuration example of the content server 12 of FIG. 1.

The content server 12 of FIG. 2 includes a depth detection section 31, a quantization section 32, a low resolution image processing section 33 and a high resolution image processing section 34.

The depth detection section 31 of the content server 12 detects, for each of pixels of picked up images of the cameras supplied from the multi camera 11 of FIG. 1, a reciprocal 1/z of a distance z in the depth direction between a depth plane perpendicular to the depth direction including an imaging object at the pixel and the camera. The depth detection section 31 supplies the reciprocals 1/z of the pixels of the picked up images of the cameras obtained as a result of the detection to the quantization section 32.

The quantization section 32 converts the reciprocal 1/z of each of the pixels of the picked up images of the cameras supplied thereto from the depth detection section 31 into a reciprocal 1/r when a predetermined three-dimensional position in a three-dimensional coordinate system of the multi camera 11 (hereinafter referred to as camera coordinate system) set as a viewpoint in the omnidirectional image is set as a viewpoint. Then, the quantization section 32 performs 8-bit quantization for the reciprocal 1/r in accordance with the following expression (1).

[Math. 1]
$$I_d(r) = \text{round}\left[255\left(\frac{1}{r} - \frac{1}{r_{max}}\right) \bigg/ \left(\frac{1}{r_{min}} - \frac{1}{r_{max}}\right)\right] \quad (1)$$

It is to be noted that $I_d(r)$ is a value of the reciprocal 1/r of the distance r after the 8-bit quantization. $r_{max}$ and $r_{min}$ are a maximum value and a minimum value of the distance r in the picked up images of all cameras, respectively.

The quantization section 32 sets values of the reciprocals 1/r of the pixels of the picked up images of the cameras after the 8-bit quantization as pixel values to generate depth images of the cameras and supplies the depth images to the low resolution image processing section 33 and the high resolution image processing section 34.

The low resolution image processing section 33 performs mapping (perspective projection) of the picked up images of the cameras supplied from the multi camera 11 to a regular octahedron centered at the viewpoint set to a predetermined three-dimensional position in the camera coordinate system to generate a texture image of an omnidirectional image. Further, the low resolution image processing section 33 performs mapping of depth images of the cameras supplied thereto from the quantization section 32 to the regular octahedron similarly to the picked up images to generate a depth image of an omnidirectional image.

The low resolution image processing section 33 reduces the resolution of the texture images and the depth images of the omnidirectional image to generate low resolution texture images and low resolution depth images. The low resolution image processing section 33 compression encodes the low resolution texture images and the low resolution depth images and stores low resolution texture streams and low resolution depth streams obtained as a result of the compression encoding. The low resolution image processing section 33 transmits the low resolution texture streams and the low resolution depth streams stored therein to the home server 13 of FIG. 1.

The high resolution image processing section 34 uses the picked up images of the cameras supplied from the multi camera 11 to generate texture images of the first layer and the second layer corresponding to the six faces configuring a cube having the center same as that of the regular octahedron in the low resolution image processing section 33. The high resolution image processing section 34 uses the depth images of the cameras supplied from the quantization section 32 to generate depth images of the first layer and the second layer corresponding to the six faces similarly to the picked up images.

The high resolution image processing section 34 compression encodes the texture images and the depth images of the first layer and the second layer for each face, each kind of image and each layer. The content server 12 stores first layer texture streams, first layer depth streams, second layer texture streams and second layer depth streams obtained as a result of the compression encoding.

Further, the high resolution image processing section 34 generates and stores metadata. The content server 12 transmits the first layer texture streams, first layer depth streams, second layer texture streams and second layer depth streams of the six faces and the metadata stored therein to the home server 13 through a network not depicted.

(Configuration Example of High Resolution Image Processing Section)

Figure 3:
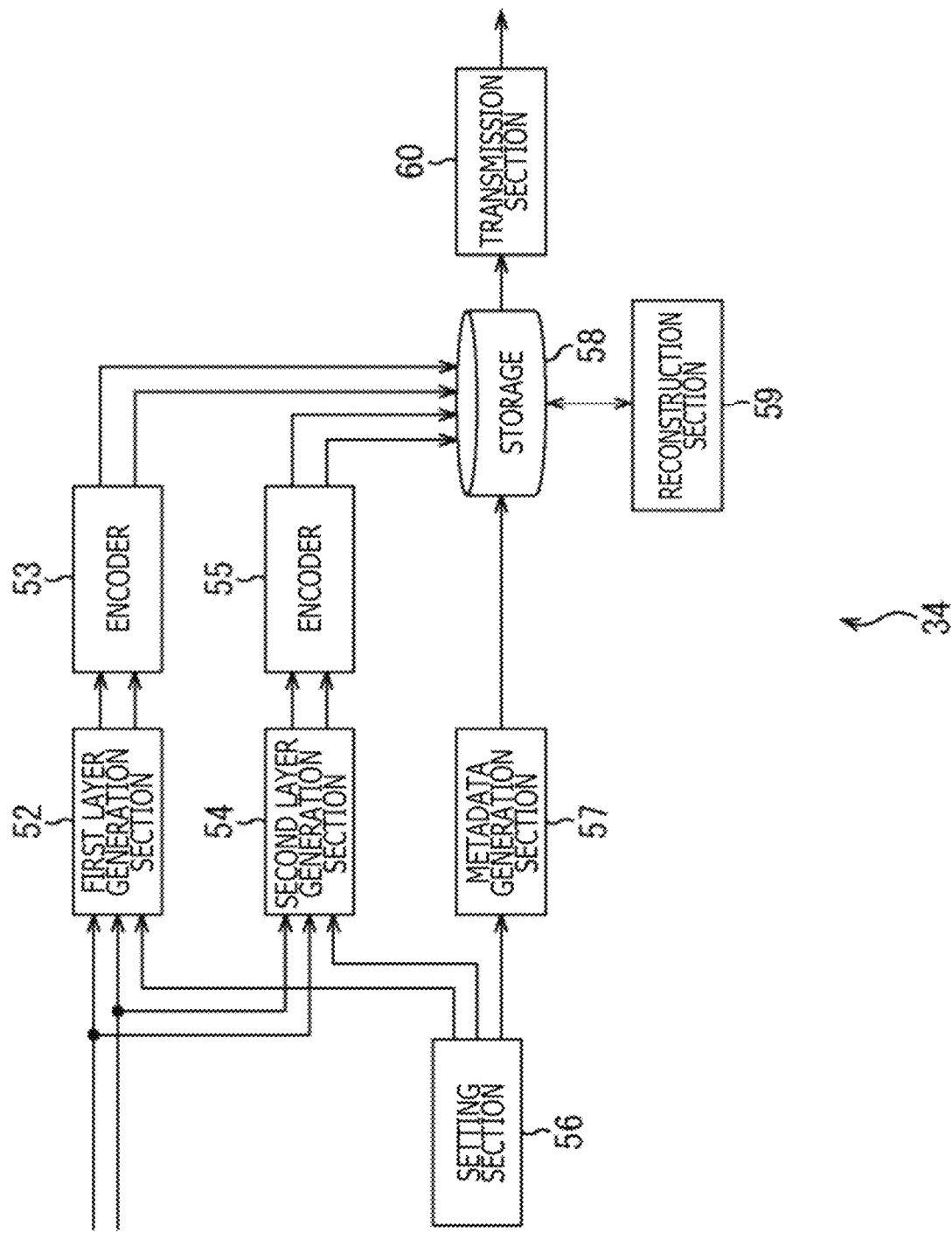
FIG. 3 is a block diagram depicting a configuration example of a high resolution image processing section.

FIG. 3 is a block diagram depicting a configuration example of the high resolution image processing section 34 of FIG. 2.

The high resolution image processing section 34 of FIG. 3 includes a first layer generation section 52, an encoder 53, a second layer generation section 54, another encoder 55, a setting section 56, a metadata generation section 57, a storage 58, a reconstruction section 59 and a transmission section 60.

To the first layer generation section 52, viewpoint position information indicative of the origin as a three-dimensional position of the viewpoint of the first layer in a three-dimensional coordinate system whose origin is given by the viewpoint of the omnidirectional image in the camera coordinate system (hereinafter referred to as 3D model coordinate system) is supplied from the setting section 56. Further, to the first layer generation section 52, face information indicative of three-dimensional positions and sizes in the 3D model coordinate system of six faces individually including the six faces configuring a cube centered at the origin of the 3D model coordinate system is supplied.

The first layer generation section 52 sets the origin indicated by the viewpoint position information to the viewpoint of the first layer (first viewpoint). The first layer generation section 52 (image generation section) performs, setting the viewpoint of the omnidirectional image in the camera coordinate system as the origin, mapping of the picked up images supplied from the multi camera 11 of FIG. 1 individually to the faces of the three-dimensional positions and the sizes indicated by the face information of the six faces from the viewpoint of the first layer. Consequently, the first layer generation section 52 generates texture images of the six faces of the first layer.

Further, the first layer generation section 52 (image generation section) performs, setting the viewpoint of the omnidirectional image in the camera coordinate system as the origin, mapping of the depth images supplied from the quantization section 32 of FIG. 2 individually to the faces of the three-dimensional positions and the sizes indicated by the face information of the six faces from the viewpoint of the first layer. Consequently, the first layer generation section 52 generates depth images of the six faces of the first layer.

Since the viewpoints corresponding to the six faces of the first layer are same as each other, it can be regarded that the texture images of the six faces of the first layer are images obtained by mapping the omnidirectional image mapped to the 3D model centered at the viewpoint of the first layer to the six faces. Similarly, it can be regarded that the depth images of the six faces of the first layer are images obtained by mapping the depth images of the omnidirectional image mapped to the 3D model centered at the viewpoint of the first layer to the six faces. The first layer generation section 52 supplies the texture images and the depth images of the six faces of the first layer to the encoder 53.

The encoder 53 compression encodes the texture images and the depth images of the six faces of the first layer supplied from the first layer generation section 52 for each face and for each kind of image to generate first layer texture streams and first layer depth streams. The encoder 53 supplies the first layer texture streams and the first layer depth streams to the storage 58.

To the second layer generation section 54, viewpoint position information of a viewpoint (second viewpoint), different from the viewpoint of the first layer, of each face of the second layer corresponding to each face of the first layer and face information of each face of the second layer corresponding to each face of the first layer are supplied from the setting section 56. The second layer generation section 54 sets, for each face of the second layer, a three-dimensional position indicated by the viewpoint position information corresponding to the face to a viewpoint of the second layer.

The second layer generation section 54 (image generation section) performs, for each face of the second layer, mapping of an occlusion region at the viewpoint of the first layer from within picked up images supplied from the multi camera 11 from the viewpoint of the second layer corresponding to the face of the second layer, onto the face of the second layer. Consequently, the second layer generation section 54 generates texture images of the six faces of the second layer.

Further, the second layer generation section 54 (image generation section) performs, for each face of the second layer, mapping of an occlusion region at the viewpoint of the first layer from within depth images supplied from the quantization section 32 from the viewpoint of the second layer corresponding to the face of the second layer, onto the face of the second layer. Consequently, the second layer generation section 54 generates depth images of the six faces of the second layer.

In particular, since the positions of the cameras of the multi camera 11 are different from each other, when one three-dimensional position in the camera coordinate system is set as a viewpoint, an occlusion region at the viewpoint is included in the picked up image. However, since the texture images of the first layer are generated by mapping an omnidirectional image at one viewpoint, a picked up image of an occlusion region at the viewpoint is not included in the texture images of the first layer. Therefore, the second layer generation section 54 places the picked up image in the occlusion region as a texture image of the second layer. This similarly applies also the depth images.

The encoder 55 compression encodes the texture images and the depth images of the second layer of the six faces supplied from the second layer generation section 54 for each face and for each kind of image to generate second layer texture streams and second layer depth streams. The encoder 55 supplies the second layer texture streams and the second layer depth streams to the storage 58.

The setting section 56 sets the origin of the 3D model coordinate system as the viewpoint of the first layer. The setting section 56 sets the six faces individually including the six rectangular faces configuring the cube centered at the viewpoint of the first layer as faces of the first layer. Further, the setting section 56 sets, for each face of the first layer, a viewpoint and a rectangular face of the second layer.

The setting section 56 supplies the viewpoint position information of one viewpoint and the face information of the six faces of the first layer to the first layer generation section 52 and the metadata generation section 57. Further, the setting section 56 supplies the viewpoint position information of the six viewpoints and the face information of the six faces of the second layer corresponding to the six faces of the first layer to the second layer generation section 54 and the metadata generation section 57.

The metadata generation section 57 generates a table including the viewpoint position information and the face information of the first layer and the viewpoint position information and the face information of the second layer supplied thereto from the setting section 56 as metadata and supplies the metadata to the storage 58.

The storage 58 stores the first layer texture streams and the first layer depth streams supplied from the encoder 53 and the second layer texture streams and the second layer depth streams supplied from the encoder 55. Further, the storage 58 stores the metadata supplied from the metadata generation section 57.

Further, the storage 58 stores the first layer texture streams, first layer depth streams, second layer texture streams and second layer depth streams and the metadata after reconstruction supplied from the reconstruction section 59.

The reconstruction section 59 reads out and reconstructs the first layer texture streams, first layer depth streams, second layer texture streams and second layer depth streams stored in the storage 58 as occasion demands.

In particular, the reconstruction section 59 uses the first layer texture streams before the reconstruction to change the number or the angle of view of the faces corresponding to the first layer texture streams and uses the first layer depth streams before the reconstruction to change the number or the angle of view of the faces corresponding to the first layer depth streams. For example, the reconstruction section 59 changes the faces of the first layer from six faces individually including six faces configuring a cube into 18 faces including, in addition to the six faces, 12 faces in which normals individually passing the centers of the six faces are lines that pass the midpoints of the 12 sides of the cube and the viewpoint.

As an alternative, the reconstruction section 59 uses the first layer texture streams before the reconstruction to change the distance between (density of) the faces corresponding to the first layer texture streams and uses the first layer depth streams before the reconstruction to change the distance between the faces corresponding to the first layer depth streams. For example, the reconstruction section 59 changes the faces of the first layer from six faces individually including six faces configuring a cube in which the distance between normals passing the center is 90 degrees into 18 faces the centers of which normal lines thereto having a distance of 45 degrees pass.

As the distance between the faces of the first layer decreases, the total data capacity increases because the number of faces increases, and the home server 13 can generate a display image using texture images and depth images corresponding to a plane of the first layer that is closer to the viewing range of the viewer. As a result, high resolution regions generated using texture images and depth images of the first layer or the second layer in the display image increase and the picture quality of the display image is improved.

It is to be noted that the reconstruction section 59 may use first layer texture streams before the reconstruction to change the position of faces corresponding to the first layer texture streams and use first layer depth streams before the reconstruction to change the position of faces corresponding to the first layer depth streams to perform reconstruction. In this case, the reconstruction section 59 performs reconstruction by rotating the cube corresponding to the six faces of the first layer such that, for example, when a main imaging object exists on the boundary of a face of the first layer, the main imaging object exists at a position other than the boundary of the first layer (for example, at the center).

Further, the reconstruction section 59 may use the first layer texture streams before reconstruction to change the inclination of the faces corresponding to the first layer texture streams and may use the first layer depth streams before reconstruction to change the inclination of the faces corresponding to the first layer depth streams to perform reconstruction. In this case, the reconstruction section 59 performs reconstruction, for example, by rotating, when a main imaging object in a texture image of the first layer is inclined, the cube corresponding to the six faces of the first layer such that the inclination disappears.

The reconstruction section 59 sets the viewpoints and the faces of the second layer after reproduction with respect to the faces of the first layer changed in such a manner as described above. Then, the reconstruction section 59 uses the second layer texture streams before reconstruction to change the viewpoints and the faces of the second layer texture streams to viewpoints and faces of the second layer after set reconstruction. Further, the reconstruction section 59 changes the second layer depth streams before reconstruction to change the viewpoints and the faces corresponding to the second layer depth streams to viewpoints and faces of the second layer after set reconstruction.

The reconstruction section 59 supplies the first layer texture streams, first layer depth streams, second layer texture streams and second layer depth streams after the reconstruction to the storage 58. Further, the reconstruction section 59 generates a table that includes the viewpoint position information and the face information of the first layer and the viewpoint position information and the face information of the second layer after the reconstruction as metadata and supplies the metadata to the storage 58.

The transmission section 60 reads out the first layer texture streams, first layer depth streams, second layer texture streams and second layer depth streams of the six faces and the metadata from the storage 58 and transmits them to the home server 13 of FIG. 1.

In this manner, the high resolution image processing section 34 generates a first layer image and a second layer image by perspective projection. Accordingly, the home server 13 can perform ordinary image processing for the first layer image and the second layer image. Further, the high resolution image processing section 34 can transmit the first layer texture streams, first layer depth streams, second layer texture streams and second layer depth streams by an ordinary transmission method for an encoded stream of an image.

Figure 4B:
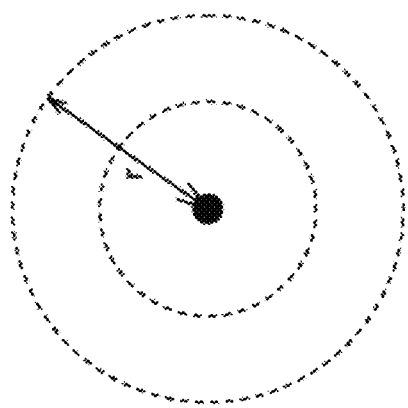
FIGS. 4A and 4B is a are views illustrating a distance z and a distance r.
Figure 4A:
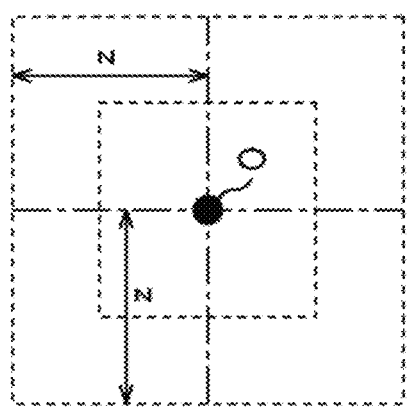
Figure 5B:
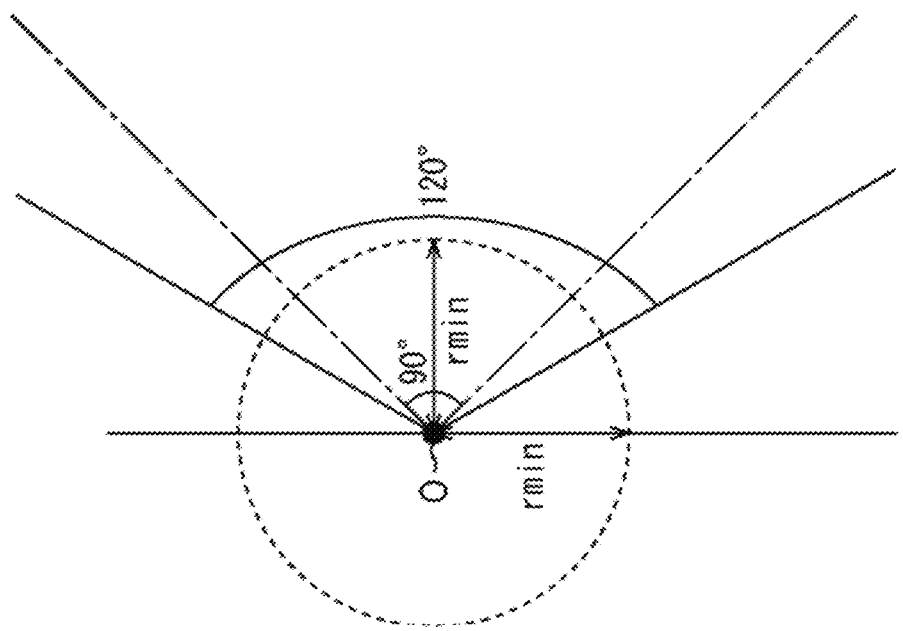
FIGS. 5A and 5B are views illustrating a minimum value zmin and another minimum value rmin.
Figure 5A:
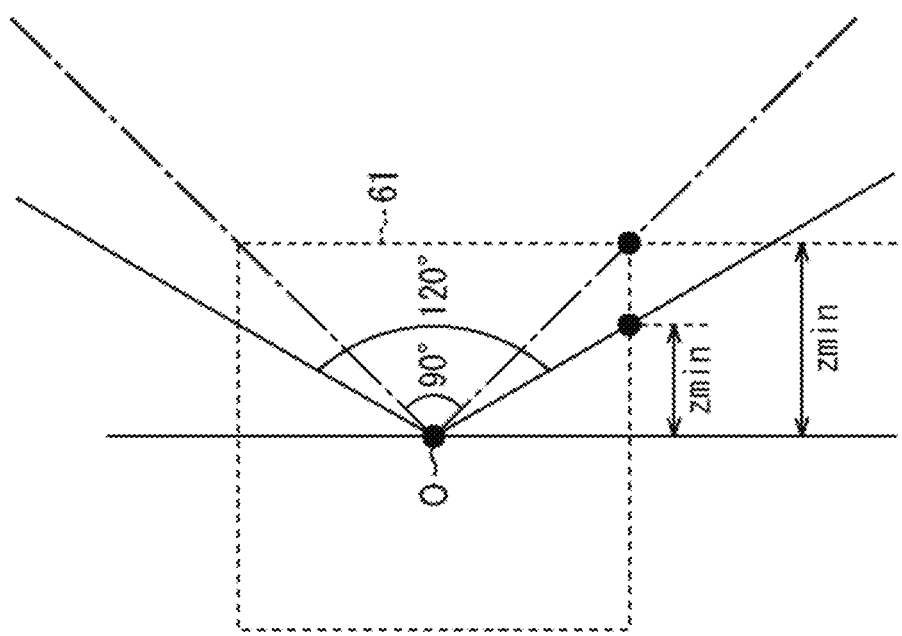

FIGS. 4A and 4B are views illustrating a distance z and a distance r, and FIGS. 5A and 5B are views illustrating a minimum value zmin of the distance z and a minimum value rmin of the distance r.

It is to be noted that FIGS. 4A, 4B, 5A, and 5B are views when a predetermined face of a cube corresponding to the first layer.

The distance z is a distance in the depth direction from a viewpoint to a depth plane perpendicular to the depth direction including an imaging object on each pixel. Further, the depth direction of each face of the first layer is a direction perpendicular to the face of the first layer. Accordingly, each face of the first layer and the depth plane are parallel to each other. Therefore, the shape of equal distance z faces that are depth planes whose distances z to the faces of the first layer are equal to each other is a cubic shape centered at the viewpoint O of the first layer. Accordingly, the shape of the equal distance z plane as viewed from above a predetermined face of the cube corresponding to the first layer is a square as indicated by a broken line in A of FIGS. 4A and 4B.

Therefore, in the case where the angle of view of each face of the first layer is changed, the minimum values zmin of the distance z to all faces vary. For example, as depicted in FIG. 5A, in the case where the angle of view in a transverse direction (upward and downward direction in FIGS. 5A and 5B) of each face of the first layer is changed from 90 degrees to 120 degrees, the texture image of each face after the change includes texture images of two faces that neighbor with the face before the change in the transverse direction and have depth directions different from that of the face. Accordingly, the minimum value zmin in the case where the angle of view in the transverse direction of each face of the first layer is 120 degrees is a minimum value of the distance z in the depth direction between the depth plane and the viewpoint O including the position of the equal distance z face 61 of the minimum value zmin in the case where the angle of view in the transverse direction of each face of the first layer included in the angle of view and corresponding to two faces neighboring in the transverse direction is 90 degrees. The description just described in regard to the minimum value zmin similarly applies also to the maximum value zmax of the distance z.

Figure 6:
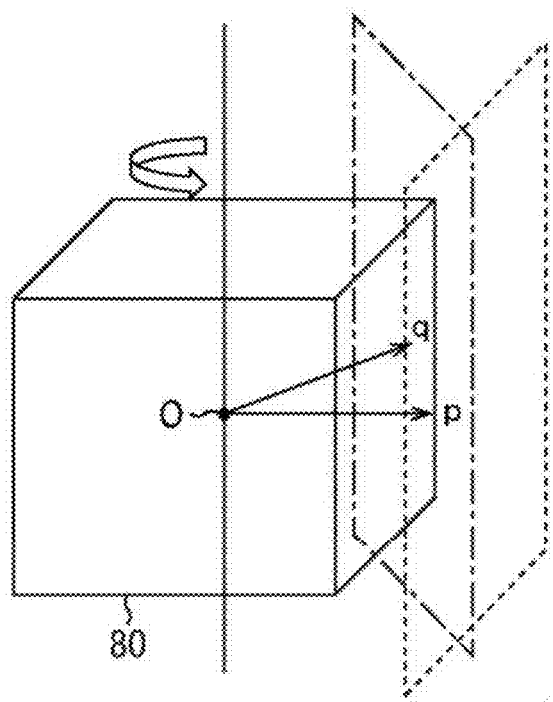
FIG. 6 is a view illustrating a variation of a depth direction.

Further, in the case where a cube 80 corresponding to the first layer is rotated around an axis provided by a line passing the viewpoint O to change the position of each phase of the first layer as depicted in FIG. 6, the depth direction p of the face before the change and the depth direction q of the face are different from each other. Accordingly, the minimum value z min and the maximum value z max of the distance z vary. It is to be noted that, in FIG. 6, a broken line indicates the equal distance z face of the face before the change, and a dash-dotted line indicates an equal distance z face of the face after the change.

Further, though not depicted, also in the case where the number of or the distance between the faces of the first layer is to be changed, since the depth direction varies similarly as in the case where the position of each phase of the first layer is changed, the minimum value z min and the maximum value z max vary.

As described above, in the case where the angle of view, position, number or distance of the first layer is changed, the minimum value z min and the maximum value z max of the distance z vary. Accordingly, if the reciprocal 1/z of the distance z is used as the y value (luminance value) of each pixel of a depth image of the first layer, then it is necessary upon reconstruction by the reconstruction section 59 to redo 8-bit quantization of the depth image.

In contrast, the distance r is a linear distance from the viewpoint to an imaging object in each pixel. Further, the direction of a linear line from the viewpoint O of each face of the first layer to an imaging object is, irrespective of the face, a radial direction of a circle centered at the viewpoint O. Accordingly, the shape of the equal distance r face to which the distances r from the faces of the first layer are equal to each other is a spherical shape centered at the viewpoint O of the first layer. Therefore, the shape when the equal distance r face is viewed from above a predetermined face of the cube corresponding to the first layer is a circular shape as indicated by a broken line in FIG. 4B.

As described above, since the directions of linear lines from the viewpoints O of the faces of the first layer to an imaging object are equal irrespective of the faces, even in the case where the angle of view of each face of the first layer is changed, the minimum values rmin of the distance r to all faces are not changed as depicted in FIG. 5B.

For example, the directions of liner lines from the viewpoints O of the faces of the first layer regarding two faces neighboring in the transverse direction (upward and downward directions in FIGS. 5A and 5B) with the faces before the change to an imaging object are equal to each other. Accordingly, as depicted in FIG. 5B, the angle of view in the transverse direction between the faces of the first layer is changed from 90 degrees to 120 degrees, and even in the case where the texture image of each face after the change includes texture images of two faces neighboring in the transverse direction with the faces before the change, the minimum value rmin does not change. The description just described in regard to the minimum value rmin similarly applies also to the maximum value rmax of the distance r.

Further, though not depicted, even in the case where the position, number or distance of the faces of the first layer is changed, since the direction of a linear line from the viewpoint O of each face of the first layer to an imaging object does not change similarly as in the case where the angle of view of each face of the first layer is changed, the minimum value r min and the maximum value r max do not vary.

Accordingly, the quantization section 32 of FIG. 2 can reduce, by using not the reciprocal 1/z but a quantization value of the reciprocal 1/r as the y value of each pixel of the depth images of the first layer, the process for redoing 8-bit quantization of the depth images upon reconstruction by the reconstruction section 59.

It is to be noted that, while, in the foregoing description, the low resolution texture stream and the low resolution depth stream are not reconstructed, they may otherwise be reconstructed. Also in this case, since the y value of each pixel of the low resolution depth image is a quantization value of the reciprocal 1/r, the process for redoing 8-bit quantization of the low resolution depth image upon reconstruction can be reduced similarly as upon reconstruction of the depth image of the first layer.

(Example of Position on Sphere of Each Pixel of Depth Image of Six Faces of First Layer)

Figure 7:
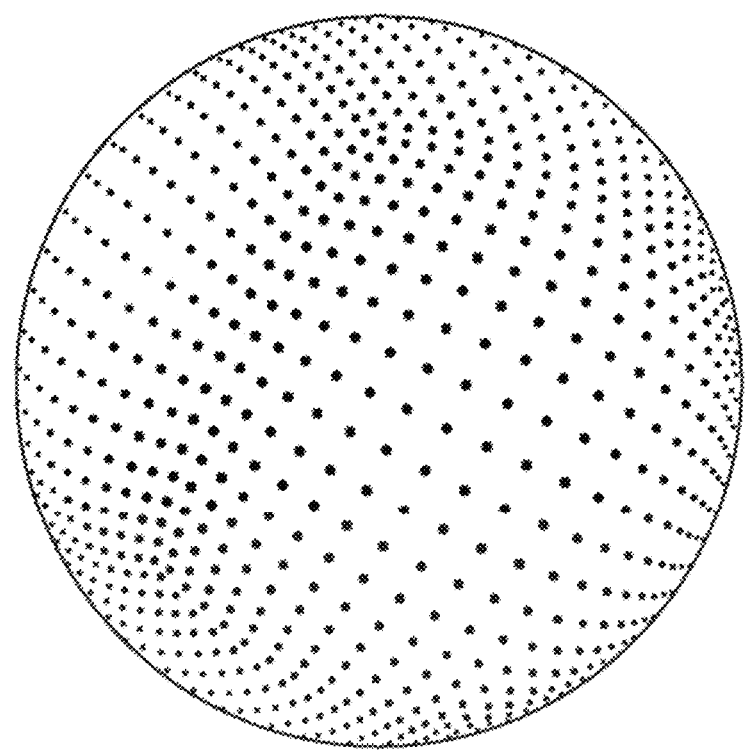
FIG. 7 is a view depicting an example of a position of each pixel on a sphere when depth images of six faces of a first layer are mapped on the sphere.

FIG. 7 is a view depicting an example of the position of each pixel on a sphere when depth images of the six faces of the first layer are mapped to the sphere.

It is to be noted that, in FIG. 7, the position of each pixel on a sphere when depth images of the six faces of the first layer are mapped to the sphere is represented by a point.

The distances between positions on the depth image of the pixels of the depth images of the faces of the first layer are equal to each other. However, as depicted in FIG. 7, the distances between the positions on the sphere of the pixels when the depth images of the six faces of the first layer are mapped to the sphere are not equal distances. In other words, the density of positions of the pixels on the sphere when the depth images of the six faces of the first layer are mapped to the sphere is not fixed.

(Example of Faces of First Layer)

Figure 8B:
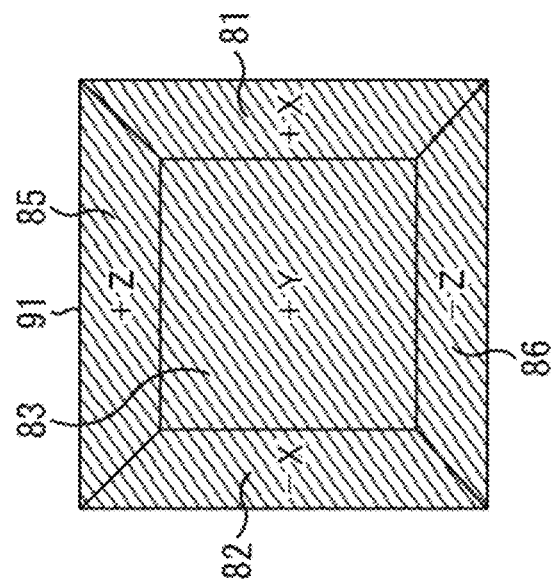
FIGS. 8A and 8B are views depicting an example of faces of the first layer.
Figure 8A:
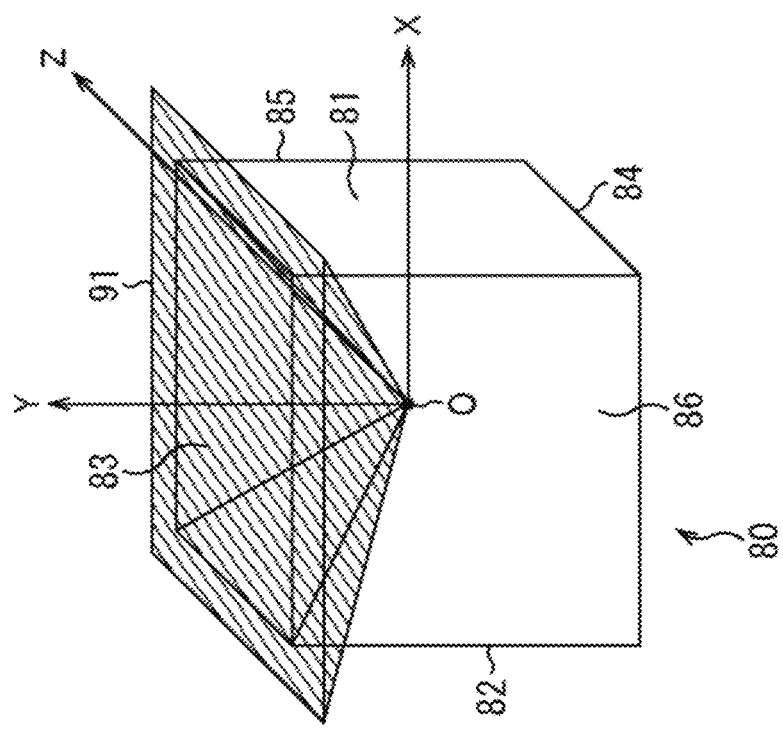

FIGS. 8A and 8B are views depicting an example of faces of the first layer.

It is to be noted that, in the following description, three axes orthogonal to each other from among six axes that pass the viewpoint O of the first layer and the centers of six faces 81 to 86 that configure a cube 80 corresponding to the first layer are referred to as X axis, Y axis and Z axis. Further, the face 81 that satisfies X=R when the distances between the viewpoint O and the six faces 81 to 86 are represented by R is suitably referred to as +X face 81, and the face 82 that satisfies X=−R is suitably referred to as −X face 82. Similarly, the face 83 that satisfies Y=R, face 84 that satisfies Y=−r, the face 85 that satisfies Z=R and face 86 that satisfies Z=−R are suitably referred to as +Y face 83, −Y face 84, +Z face 85 and −Z face 86, respectively.

Further, FIG. 8A is a perspective view of the cube 80 of the first layer, and FIG. 8B is a view when the cube 80 of the first layer is viewed in the negative direction of the Y axis.

As depicted in FIG. 8A, one face 91 of the first layer is a face including the +Y face 83 from among the six faces 81 to 86 configuring the cube 80 centered at the viewpoint O. More particularly, the face 91 is a face that is set to a position same as that of the +Y face 83 and has angles of view in the transverse direction and the vertical direction that are greater than 90 degrees that is an angle of view of the +Y face 83 but is smaller than 180 degrees.

Accordingly, as depicted in FIG. 8B, the texture image of the face 91 includes not only a texture image mapped to the +Y face 83 but also part of texture images mapped to the +X face 81, −X face 82, +Z face 85 and −Z face 86 neighboring with the +Y face 83. The description just given in regard to the texture images similarly applies also to the depth images of the face 91.

While only one face 91 of the first layer is depicted in FIGS. 8A and 8B, also the other five faces are faces that are set to positions same as those of the +X face 81, −X face 82, −Y face 84, +Z face 85 and −Z face 86 and have angles of view in the transverse direction and the vertical direction that are greater than 90 degrees but smaller than 180 degrees similarly to the face 91.

As described above, since the six faces of the first layer are configured so as to individually include the six faces 81 to 86 configuring a cube, an omnidirectional image is mapped to one of the six faces of the first layer without fail. Accordingly, if the home server 13 uses three faces neighboring with each other from among the six faces of the first layer, then it can generate a display image in an arbitrary direction over 360 degrees around in the horizontal direction and 180 degrees around in the vertical direction with the viewpoint O set as a viewing position.

(Configuration Example of Table of Viewpoint Position Information and Face Information of First Layer)

FIG. 9 is a view depicting a configuration example of a table of viewpoint position information and face information of the first layer from among metadata generated by the metadata generation section 57 of FIG. 3.

In the example of FIG. 9, from within face information, information indicative of a three-dimensional position of a face in the 3D model coordinate system is an azimuth angle, an elevation angle, a rotation angle and a sight line vector, and information indicative of a size is a transverse angle of view and a vertical angle of view.

The azimuth angle is an angle in an XZ plane direction defined by a line interconnecting a viewpoint and the center of each face and the Z axis, and the elevation angle is an angle defined by the line interconnecting the viewpoint and the center of each face and the XZ plane. Here, in the azimuth angle, the clockwise direction is positive direction, and in the elevation angle, the counterclockwise direction is a positive direction. A line when a line extending in the Z-axis direction from the viewpoint is horizontally rotated by the azimuth angle on the XZ plane and then is rotated upwardly or downwardly by the elevation angle in the Y-axis direction is a normal that passes the center of the face.

The rotation angle is an angle in the rotation direction of each face when a line interconnecting the viewpoint and the center of the face is taken as an axis. Here, in the rotation angle, the clockwise direction is a positive direction. The sight line vector is a vector that is directed to the center of each face from a starting point given by the viewpoint and has a length of 1, namely, a normal vector that passes the center of each face. The transverse angle of view is an angle defined by two lines interconnecting two end portions in the transverse direction of each face and the viewpoint, and the vertical angle of view is an angle defined by two lines interconnecting two end portions in the vertical direction of each face and the viewpoint.

As depicted in FIG. 9, in the table of viewpoint position information and face information of the first layer, the first layer texture streams of each face and a common portion of file names of files in which the first layer depth streams are placed are registered in the storage 58 of FIG. 3.

In particular, in the example of FIG. 9, the file names of the first layer texture streams of the faces including the +Z face 85, −Z face 86, +X face 81, −X face 82, +Y face 83 and −Y face 84 are posZ_texture, negZ_texture, posX_texture, negX_texture, posY_texture and negY_texture, respectively. Further, the file names of the first depth streams of the faces including the +Z face 85, −Z face 86, +X face 81, −X face 82, +Y face 83 and −Y face 84 are posZ_depth, negZ_depth, posX_depth, negX_depth, posY_depth and negY_depth, respectively. Accordingly, in the table of FIG. 9, posZ, negZ, posX, negX, posY and negY are registered as the common portions of the file names of the faces of the first layer are registered.

Further, in the table of viewpoint position information and face information of the first layer, in an associated relationship with a common portion of a file name, face information, viewpoint position information, and a transverse pixel number and a vertical pixel number of a texture image and a depth image of the face corresponding to the common portion of the file name are registered.

In particular, the angles in the XZ plane direction defined by lines individually interconnecting the center of the faces of the first layer including the +Z face 85, −Z face 86, +X face 81, −X face 82, +Y face 83 and −Y face 84 and the viewpoint O and the Z axis are 0 degrees, −180 degrees, 90 degrees, −90 degrees, 0 degrees and 0 degrees, respectively, and the angles with respect to the XZ plane are 0 degrees, 0 degrees, 0 degrees, 0 degrees, 90 degrees and −90 degrees, respectively. Accordingly, the azimuth angles "0 degrees," "−180 degrees," "90 degrees," "−90 degrees," "0 degrees" and "0 degrees" are registered and the elevation angles "0 degrees," "0 degrees," "0 degrees," "0 degrees," "90 degrees" and "−90 degrees" are registered in an associated relationship with the common portions "posZ," "negZ," "posX," "negX," "posY" and "negY" of the file names, respectively.

Further, in the example of FIG. 9, the rotation angles of all faces of the first layer are 0 degrees. Accordingly, the rotation angle "0 degrees" is registered in an associated relationship with the common portions "posZ," "negZ," "posX," "negX," "posY" and "negY" of the file names. Further, the coordinates (0, 0, 0) of the origin as viewpoint position information is registered in an associated relationship with the common portions "posZ," "negZ," "posX," "negX," "posY" and "negY" of the file names.

Further, the sight line vectors of the faces of the first layer individually including the +Z face 85, −Z face 86, +X face 81, −X face 82, +Y face 83 and −Y face 84 from the viewpoint O are (0, 0, 1), (0, 0, −1), (1, 0, 0), (−1, 0, 0), (0, 1, 0) and (0, −1, 0). Accordingly, the sight line vectors (0, 0, 1), (0, 0, −1), (1, 0, 0), (−1, 0, 0), (0, 1, 0) and (0, −1, 0) are registered in an associated relationship with the common portions "posZ," "negZ," "posX," "negX," "posY" and "negY" of the file names, respectively.

Furthermore, in the example of FIG. 9, the transverse angles of view and the vertical angles of view of all faces of the first layer are 100 degrees greater than 90 degrees, and the transverse pixel number that is the number of pixels in the transverse direction and the vertical pixel number that is the number of pixels in the vertical direction of the texture images and the depth images are 1024. Accordingly, the transverse angle of view "100 degrees," vertical angle of view "100 degrees," transverse pixel number "1024" and vertical pixel number "1024" are registered in an associated relationship with the common portions "posZ," "negZ," "posX," "negX," "posY" and "negY" of the file names, respectively.

(Description of Hierarchization)

FIG. 10 is a view depicting a position in the depth direction of an imaging object corresponding to a predetermined face of the first layer, and FIG. 11 is a view depicting a configuration example of the texture images of the first layer and the second layer of the imaging object of FIG. 10 in the case where the viewpoints of the first layer and the second layer are same.

It is to be noted that FIG. 10 is a view of the viewpoint O of the first layer and an imaging object as viewed from above, and the upward and downward direction of FIG. 10 is a depth direction of a predetermined plane of the first layer including the imaging object in the angle of view. Further, in FIG. 11, the leftward and rightward direction and the upward and downward direction represent the transverse direction and the depth direction of the texture image, respectively. The upward direction in FIGS. 10 and 11 is this side, and the downward direction is the deep side.

In the example of FIGS. 10 and 11, a middle foreground 111 and a background 112 behind the foreground are imaging objects included in a predetermined angle of view of the first layer. In this instance, as depicted in FIG. 11, the texture image of a predetermined face of the first layer includes a picked up image 121 of the foreground 111 and a picked up image 122A in a region 112A of the background 112 that is not hidden by the foreground 111.

On the other hand, the texture image of a face of the second layer corresponding to the predetermined face of the first layer includes, as a valid region, a picked up image 122C in an imaged occlusion region 112C imaged by the multi camera 11 from within an occlusion region 112B of the background 112 shielded by the foreground 111 as depicted in FIG. 11.

Although anything may be placed in a region other than the valid region from within the texture image of the face of the second layer, if a special value such as an invalid value or the like is placed, then the value of the special value varies through compression encoding, resulting in difficulty in reproduction of the special value by decoding by the home server 13.

Accordingly, the region other than the valid region of the texture image of the face of the second layer is divided into an unnecessary region (background region) corresponding to the region 112A, and an imaginary region corresponding to a region other than the imaged occlusion region 112C from within the occlusion region 112B.

Then, in the unnecessary region corresponding to the region 112A in which an occlusion region does not exist, either a picked up image 122A is disposed similarly as in the first layer or a flat image whose edge portion is not steep is disposed. In the case where the picked up image 122A is disposed in the unnecessary region, since the texture images in the first layer and the second layer in the unnecessary region become same, in the case where the texture image of the first layer is compression encoded by an MVC method, a 3D-HEVC method or the like by referring to the texture image of the second layer, the compression ratio can be improved. Further, in the case where a flat image is displayed in the unnecessary region, the compression ratio of the second layer image can be improved in comparison with that in an alternative case in which an image having a steep edge portion is disposed. It is to be noted that the picked up image 122A may be disposed in part of the unnecessary region while a flat image is disposed in the other part.

Further, the imaginary region is a region in which, although an occlusion region exists, imaging is not performed by the multi camera 11 and that corresponds to a region other than the imaged occlusion region 112C from within the occlusion region 112B. Accordingly, in the imaginary region, an inpainted image inferred (inpainted) using the picked up image 122C of the imaged occlusion region 112C is disposed or the picked up image 121 is disposed similarly as in the first layer.

It is to be noted that, for the inpainting, an image picked up in the past may be used. Where the content server 12 performs inpainting, the home server 13 can treat the imaginary region equivalently to the valid region. Further, where the content server 12 performs inpainting before reproduction, also inpainting that is high in processing load and requires much time can be performed.

Further, in the case the picked up image 121 is disposed in the imaginary region, also when imaginary regions are scattered or inpainting is difficult, an imaginary region can be generated readily. An inpainting image may be disposed at part of an imaginary region while the picked up image 121 is disposed at the other part.

It is to be noted that, since the configuration of the depth images of the first layer and the second layer are similar to the configuration of the texture images of the first layer and the second layer except that the picked up image is replaced to the depth image, description of the same is omitted. Further, in the following, a case is described in which a picked up image or a depth image similar to that of the first layer is placed in an unnecessary region and an imaginary region of the second layer.

(Description of Viewpoint of First Layer and Second Layer)

FIGS. 12A, 12B, and 12C are views illustrating texture images of the first layer and the second layer corresponding to a predetermined face of the first layer in the case where the viewpoints of the first layer and the second layer are same. FIGS. 13A, 13B, and 13C are views illustrating texture images of the first layer and the second layer corresponding to a predetermined face of the first layer in the case where viewpoints of the first layer and the second layer are different from each other.

FIG. 12A and FIG. 13A are views of the viewpoint O of the first layer and an imaging object as viewed from above, and the upward and downward direction in FIG. 12A and FIG. 13A is the depth direction of the predetermine face of the first layer including the imaging object in the angle of view.

As depicted in FIG. 12A, in the case where the viewpoint of the second layer is the viewpoint O of the first layer, a bar-like imaging object 141 extends to the viewpoint O in the angle of view of a predetermined face 131 of the first layer forms a point in both a texture image 151 of the first layer and a texture image 152 of the second layer.

In particular, since the directions from the viewpoints O of the first layer and the second layer toward the face 131 are same, the imaging object 141 is degenerated to one point in both the texture image 151 of the first layer and the texture image 152 of the second layer. Accordingly, in the texture image 151 and the texture image 152, the length of the imaging object 141 extending in a direction toward the viewpoint O cannot be represented.

In contrast, in the case where the viewpoint of the second layer is the viewpoint O that is different from the viewpoint O of the first layer, the imaging object 141 included in the angle of view of the face 131 of the first layer and a face 161 of the second layer becomes a straight line in a texture image 172 of the second layer.

In particular, the direction from the viewpoint O of the first layer toward the face 131 and the direction from a viewpoint O' of the second layer toward the face 161 are different from each other. Accordingly, even if the imaging object 141 is degenerated to one point in the texture image 151 of the first layer, the imaging object 141 is not degenerated into one point in the texture image 172 of the second layer. Therefore, in the texture image 172, the length of the imaging object 141 extending in a direction toward the viewpoint O can be represented.

From the foregoing, in the content server 12, the viewpoints of the first layer and the second layer are set so as to be different from each other.

(First Example of Viewpoint of Second Layer)

Figure 14B:
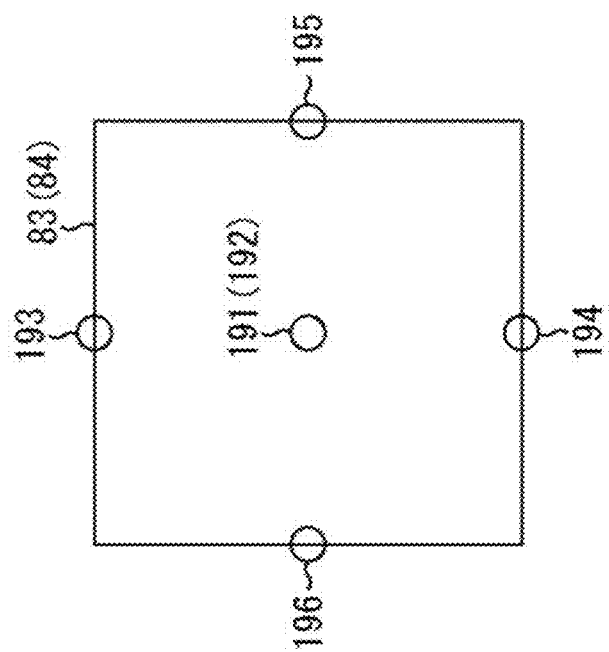
FIGS. 14A and 14B are views depicting a first example of viewpoints of the second layer.
Figure 14A:
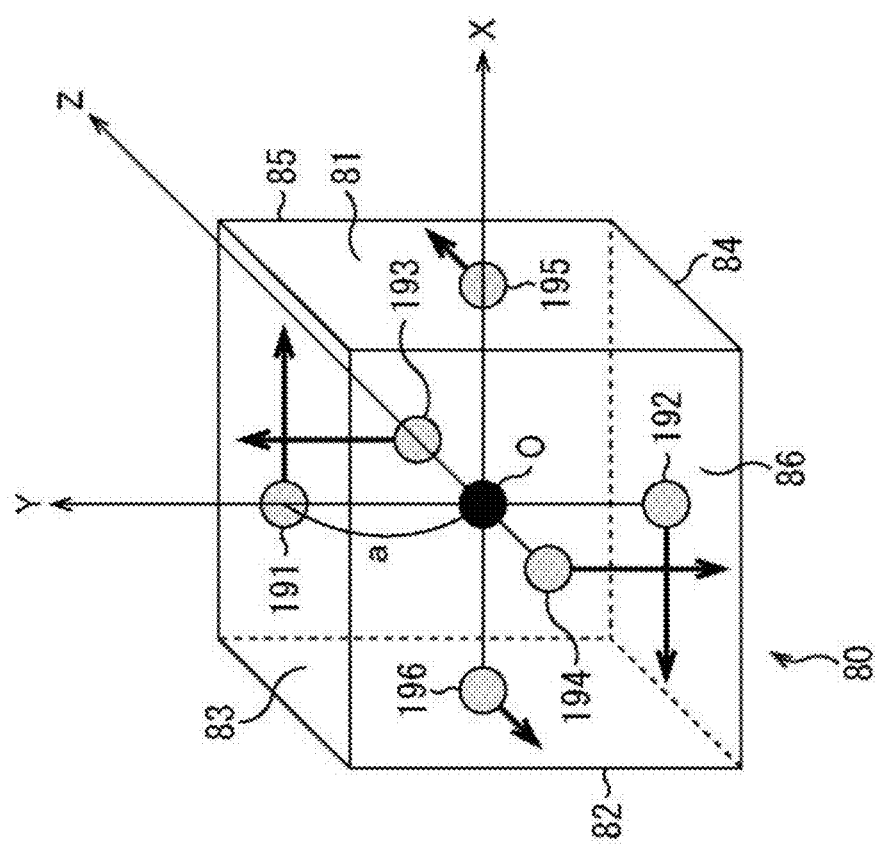

FIGS. 14A and 14B are views depicting a first example of the viewpoint of the second layer.

FIG. 14A is a perspective view of a cube 80 of the first layer, and FIG. 14B is a view of the cube 80 as viewed in the negative direction of the Y axis. This similarly applies also to FIGS. 16A and 16B.

In the example of FIGS. 14A and 14B, a viewpoint 191 of a face of the second layer corresponding to a face that includes the +X face 81 of the first layer is set to a position moved by a length a equal to one half the length of each side of the cube 80 in the positive direction of the Y axis from the viewpoint O of the first layer. As indicated by an arrow mark applied to the viewpoint 191 in FIGS. 14A and 14B, the sight line vector of the face of the second layer corresponding to the face including the +X face 81 of the first layer is (1, 0, 0) similarly as in the first layer.

A viewpoint 192 of the face of the second layer corresponding to the face including the −X face 82 of the first layer is set to a position moved by the length a in the negative direction of the Y axis from the viewpoint O. As indicated by an arrow mark applied to the viewpoint 192 in FIGS. 14A and 14B, the sight line vector of the face of the second layer corresponding to the face including the −X face 82 of the first layer is (−1, 0, 0) similarly to the first layer.

Further, a viewpoint 193 of a face of the second layer corresponding to the face 91 including the +Y face 83 of the first layer and a viewpoint 194 of a face of the second layer corresponding to a face including the −Y face 84 are set to positions moved by the length a in the positive direction and the negative direction of the Z axis from the viewpoint O, respectively. As indicated by arrow marks applied to the viewpoint 193 and the viewpoint 194 in FIGS. 14A and 14B, a sight line vector of the face of the second layer corresponding to the face 91 of the first layer and a sight line vector of the second layer corresponding to the face including the −Y face 84 are (0, 1, 0) and (0, −1, 0) similarly as in the first layer, respectively.

Further, a viewpoint 195 of a face of the second layer corresponding to the face including the +Z face 85 of the first layer and a viewpoint 196 of a face of the second layer corresponding to the face including the −Z face 86 are set to positions moved by the length a in the positive direction and the negative direction of the X axis from the viewpoint O of the first layer, respectively. As indicated by arrow marks applied to the viewpoint 195 and the viewpoint 196 in FIGS. 14A and 14B, a sight line vector of the face of the second layer corresponding to the +Z face 85 of the first layer and a sight line vector of the face of the second layer corresponding to the face including the −Z face 86 are (0, 0, 1) and (0, 0, −1) similarly as in the first layer, respectively.

In this manner, in the example of FIGS. 14A and 14B, the viewpoints 191 to 196 of the faces of the second layer are set to positions moved by the length a in one direction perpendicular to the sight line vectors from the viewpoints O of the first layer. Further, the sight line vectors of the faces of the second layer are same as the sight line vectors of the corresponding faces of the first layer. Furthermore, the displacement direction of the viewpoints 191 to 196 of the faces of the second layer with respect to the viewpoint O differs for each face.

It is to be noted that the distance between the viewpoints 191 to 196 of the faces of the second layer and the viewpoint O in the X-axis direction, Y-axis direction or Z-axis direction is not limited to the length a equal to one half the length of each side of the cube 80.

(First Configuration Example of Table of Viewpoint Position Information and Face Information of Second Layer)

FIG. 15 is a view depicting a configuration example of a table of viewpoint position information and face information of the second layer from within metadata generated by the metadata generation section 57 of FIG. 3 in the case where the viewpoints 191 to 196 of FIGS. 14A and 14B are set as viewpoints of the faces of the second layer.

The table of FIG. 15 is same as the table of FIG. 9 except a common portion of file names and viewpoint position information.

In particular, in the example of FIG. 15, the file names of the texture images of the faces of the second layer corresponding to the faces of the first layer including the +Z face 85, −Z face 86, +X face 81, −X face 82, +Y face 83 and −Y face 84 are posZ2_texture, negZ2_texture, posX2_texture, negX2_texture, posY2_texture and negY2_texture, respectively. Further, the file names of the depth images of the faces of the second layer corresponding to the faces of the first layer including the +Z face 85, −Z face 86, +X face 81, −X face 82, +Y face 83 and −Y face 84 are posZ2_depth, negZ2_depth, posX2_depth, negX2_depth, posY2_depth and negZ2_depth, respectively. Accordingly, in the table of FIG. 15, "posZ2," "negZ2," "posX2," "negX2," "posY2" and "negY2" are registered as the common portions of the file names of the faces of the second layer.

Further, coordinates (a, 0, 0), (−a, 0, 0), (0, a, 0), (0, −a, 0), (0, 0, a) and (0, 0, −a) of the viewpoints 191 to 196 when the viewpoint O is determined as the origin are registered in an associated relationship with the common portions "posZ2," "negZ2," "posX2," "negX2," "posY2" and "negY2" of the file names, respectively.

(Second Example of Viewpoints of Second Layer)

Figure 16B:
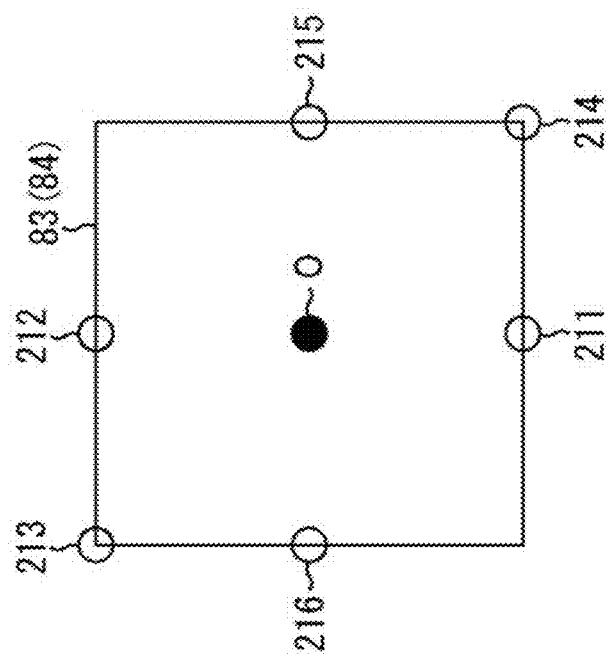
FIGS. 16A and 16B are views depicting a second example of viewpoints of the second layer.
Figure 16A:
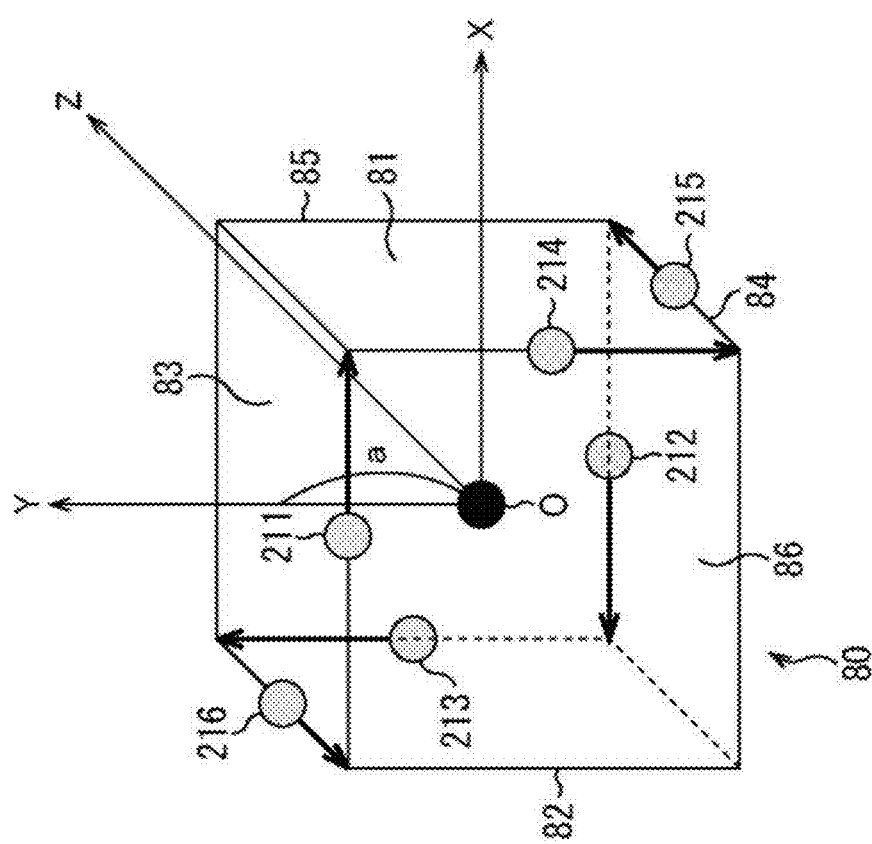

FIGS. 16A and 16B are views depicting a second example of viewpoints of the second layer.

In the example of FIGS. 16A and 16B, a viewpoint 211 of a face of the second layer corresponding to a face that includes the +X face 81 of the first layer and a viewpoint 212 of a face of the second layer corresponding to a face that includes the −X face 82 of the first layer are respectively set to a position moved by the length a in the positive direction of the Y axis and the negative direction of the Z axis from the viewpoint O of the first layer and a position moved by the length a in the negative direction of the Y axis and the positive direction of the Z axis from the viewpoint O of the first layer. As indicated by an arrow mark applied to the viewpoint 211 and the viewpoint 212 in FIGS. 16A and 16B, the sight line vector of the face of the second layer corresponding to the face including the +X face 81 of the first layer and the sight line vector of a face of the second layer corresponding to the face including the −X face 82 of the first layer are (1, 0, 0) and (−1, 0, 0) similarly as in the first layer.

A viewpoint 213 of a face of the second layer corresponding to the face 91 including the +Y face 83 of the first layer and a viewpoint 214 of the face of the second layer corresponding to the face including the −Y face 84 are set to positions moved by the length a in the negative direction of the X axis and the positive direction of the Z axis and in the positive direction of X axis and the negative direction of the Z axis from the viewpoint O, respectively. As indicated by arrow marks applied to the viewpoint 213 and the viewpoint 214 in FIGS. 16A and 16B, the sight line vector of the face of the second layer corresponding to the face 91 of the first layer and the sight line vector of the face of the second layer corresponding to the face including the −Y face 84 are (0, 1, 0) and (0, −1, 0) similarly to the first layer, similarly.

Further, a viewpoint 215 of a face of the second layer corresponding to a face including the +Z face 85 and a viewpoint 216 of a face of the second layer corresponding to a face including the −Z face 86 of the first layer are set to a position moved by the length a in the positive direction of the X axis and the negative direction of the Y axis and a position moved by the length a in the negative direction of the X axis and the positive direction of the Y axis from the viewpoint O, respectively. As indicated by arrow marks applied to the viewpoint 215 and the viewpoint 216 in FIGS. 16A and 16B, a sight line vector of the face of the second layer corresponding to a face including the +Z face 85 of the first layer and a sight line vector of the second layer corresponding to the face including the −Z face 86 are (0, 0, 1) and (0, 0, −1) similarly as in the first layer, respectively.

In this manner, in the example of FIGS. 16A and 16B, the viewpoints 211 to 216 of the faces of the second layer are set to positions moved by the length a in two directions perpendicular to the sight line vectors from the viewpoints O of the first layer. Further, the sight line vectors of the faces of the second layer are same as the sight line vectors of the corresponding faces of the first layer. Furthermore, the displacement directions of the viewpoints 211 to 216 of the faces of the second layer with respect to the viewpoint O differ among different faces. Further, the viewpoints 211 to 216 are in a symmetrical relationship with respect to the viewpoint O.

It is to be noted that the distance between the viewpoints 199 to 196 of the faces of the second layer and the viewpoint O in two directions of the X-axis direction, Y-axis direction and Z-axis direction is not limited to the length a that is equal to one half the length of each side of the cube 80.

(Second Configuration Example of Table of Viewpoint Position Information and Face Information of Second Layer)

FIG. 17 is a view depicting a configuration example of a table of viewpoint position information and face information of the second layer from within metadata generated by the metadata generation section 57 of FIG. 3 in the case where the viewpoints 211 to 216 of FIGS. 16A and 16B are set as viewpoints of the faces of the second layer.

The table of FIG. 17 is same as the table of FIG. 15 except viewpoint position information.

In particular, in the table of FIG. 17, coordinates (a, −a, 0), (−a, a, 0), (0, a, −a), (0, −a, a), (−a, 0, a) and (a, 0, −a) of the viewpoints 211 to 216 when the viewpoint O is determined as the origin are registered in an associated relationship with the common portions "posZ2," "negZ2," "posX2," "negX2," "posY2" and "negY2" of the file names, respectively.

(Description of Processing of Content Server)

Figure 18:
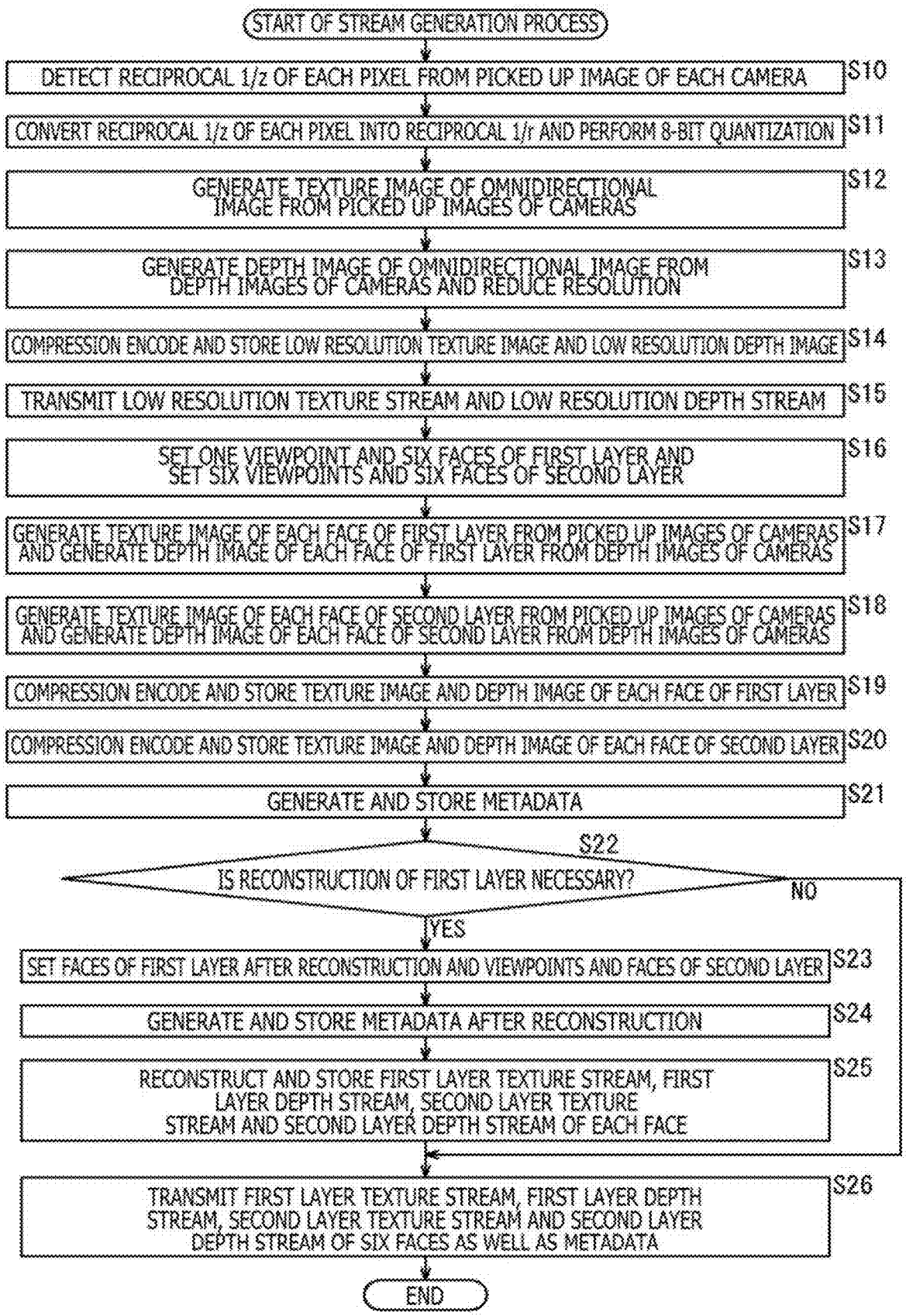
FIG. 18 is a flow chart illustrating a stream generation process.

FIG. 18 is a flow chart illustrating a stream generation process of the content server 12 of FIG. 2. This stream generation process is started when picked up images of the cameras are supplied from the multi camera 11 of FIG. 1.

At step S10 of FIG. 18, the depth detection section 31 of the content server 12 detects a reciprocal 1/z of each pixel of a picked up image of each camera from a picked up image of each camera supplied from the multi camera 11 and supplies such reciprocals 1/z to the quantization section 32.

At step S11, the quantization section 32 converts the reciprocals 1/z of the pixel of the picked up images of the cameras into reciprocals 1/r when a predetermined three-dimensional position in the camera coordinate system, which is a viewpoint in the omnidirectional image, is set as the viewpoint and performs 8-bit quantization for the reciprocals 1/r. The quantization section 32 determines the values of the 8-bit quantization of the reciprocals 1/r of the pixels of the picked up images of the cameras as pixel values to generate depth images of the cameras and supplies the depth images to the low resolution image processing section 33 and the high resolution image processing section 34.

At step S12, the low resolution image processing section 33 uses a predetermined three-dimensional position in the camera coordinate system as a viewpoint to generate a texture image of an omnidirectional image from the picked up images of the cameras supplied from the multi camera 11 to reduce the resolution.

At step S13, the low resolution image processing section 33 generates a depth image of an omnidirectional image similar to the texture image of the omnidirectional image from the depth images of the cameras supplied from the quantization section 32 to reduce the resolution.

At step S14, the low resolution image processing section 33 compression encodes and stores the low resolution texture image generated by the process at step S12 and the low resolution depth image generated by the process at step S13.

At step S15, the low resolution image processing section 33 transmits the low resolution texture stream and the low resolution depth stream stored therein to the home server 13 of FIG. 1.

At step S16, the setting section 56 (FIG. 3) of the high resolution image processing section 34 sets the origin of the 3D model coordinate system as one viewpoint common in the first layer and sets six faces including the six faces configuring a cube centered at the viewpoint of the first layer as faces of the first layer. Further, the setting section 56 sets six viewpoints and six faces of the second layer corresponding to the faces of the first layer. The setting section 56 supplies the viewpoint position information of the one viewpoint of the first layer and the face information of the six faces to the first layer generation section 52 and the metadata generation section 57. Further, the setting section 56 supplies the viewpoint position information of the six viewpoints and the face information of the six faces of the second layer to the second layer generation section 54 and the metadata generation section 57.

At step S17, the first layer generation section 52 generates, setting the viewpoint of the omnidirectional image in the camera coordinate system to the origin and setting the origin indicated by the viewpoint position information of the first layer as a viewpoint, texture images of the faces corresponding to the face information of the first layer from the picked up images of the cameras. Further, the first layer generation section 52 generates depth images of the faces corresponding to the face information of the first layer from the depth images of the cameras similarly to the texture images.

At step S18, the second layer generation section 54 generates, for each of the faces corresponding to the face information of the second layer, texture images from the picked up images of the cameras setting the viewpoint of the omnidirectional image in the camera coordinate system as an origin and setting a three-dimensional position indicated by the viewpoint position information of the second layer as a viewpoint. Further, the second layer generation section 54 generates, for each of the faces corresponding to the face information of the second layer, depth images of the second layer from the depth images of the cameras similarly to the texture images.

At step S19, the encoder 53 compression encodes the texture images and the depth images of the faces of the first layer supplied from the first layer generation section 52 for each face and for each kind of image and stores resulting images to the storage 58 so as to be stored.

At step S20, the encoder 55 compression encodes the texture images and the depth images of the faces of the second layer supplied from the second layer generation section 54 for each face and for each kind of image and stores resulting images to the storage 58 so as to be stored.

At step S21, the metadata generation section 57 generates a table including the viewpoint position information and the face information of the first layer and the viewpoint position information and the face information of the second layer supplied from the setting section 56 as metadata and supplies and stores the metadata to and into the storage 58.

At step S22, the reconstruction section 59 decides whether or not it is necessary to reconstruct texture images and depth images of the first layer. For example, in the case where an instruction to change the number of, angle of view, distance between, position of or inclination of the faces of the first layer is issued from the user, the reconstruction section 59 decides that it is necessary to reconstruct the texture images and the depth images of the first layer.

In the case where it is decided at step S22 that it is necessary to reconstruct texture images and depth images of the first layer, the processing advances to step S23. At step S23, the reconstruction section 59 sets faces of the first layer after reconstruction and viewpoints and faces of the second layer corresponding to the faces of the first layer after reconstruction.

At step S24, the reconstruction section 59 generates a table including the viewpoint position information and the face information of the first layer and the viewpoint position information and the face information of the second layer after the reconstruction as metadata and supplies the metadata to the storage 58.

At step S25, the reconstruction section 59 reconstructs the first layer texture streams of the faces stored in the storage 58 into texture streams of the faces of the first layer after reconstruction set at step S23 and supplies the resulting texture streams to the storage 58 so as to be stored. Further, the reconstruction section 59 reconstructs the first layer depth streams stored in the storage 58 into first layer depth streams of the faces of the first layer after reconstruction set at step S23 and supplies the resulting depth streams to the storage 58 so as to be stored.

Further, the reconstruction section 59 reconstructs the second layer texture streams of the faces stored in the storage 58 into second layer texture streams of the viewpoints and the faces of the second layer after reconstruction set at step S23 and supplies the resulting texture streams to the storage 58 so as to be stored. The reconstruction section 59 reconstructs the second layer depth streams stored in the storage 58 into second layer depth streams of the viewpoints and the faces of the second layer after reconstruction set at step S23 and supplies the resulting depth streams to the storage 58 so as to be stored. Then, the processing advances to step S26.

On the other hand, in the case where it is decided at step S22 that it is not necessary to reconstruct the texture images and the depth images of the first layer, the processing advances to step S26.

At step S26, the transmission section 60 reads out the first layer texture streams, first layer depth streams, second layer texture streams and second layer depth streams of the six faces before reconstruction and the metadata from the storage 58 and transmits the read out streams and metadata to the home server 13.

The content server 12 generates texture images and depth images in an occlusion region at the viewpoint of the first layer as texture images and depth images of the second layer, respectively, in such a manner as described above. Accordingly, in the case where the viewing position is different from the viewpoint O, the home server 13 can generate an occlusion region of the viewpoint O included in the display image by using the texture images and the depth images of the second layer. Therefore, the home server 13 can generate a display image of high picture quality.

Further, the content server 12 sets the viewpoint of the second layer to a three-dimensional position different from the viewpoint O of the first layer. Accordingly, in the second layer, it is possible to represent the length of an imaging object, which extends to the viewpoint O, in the direction in which it extends to the viewpoint O.

Furthermore, the content server 12 sets the y value of each pixel of the depth images as a value obtained by 8-bit quantization of the reciprocal $1/r$. Accordingly, it is not necessary for the content server 12 to redo 8-bit quantization of a depth image upon reconstruction.

(Configuration Example of Home Server)

Figure 19:
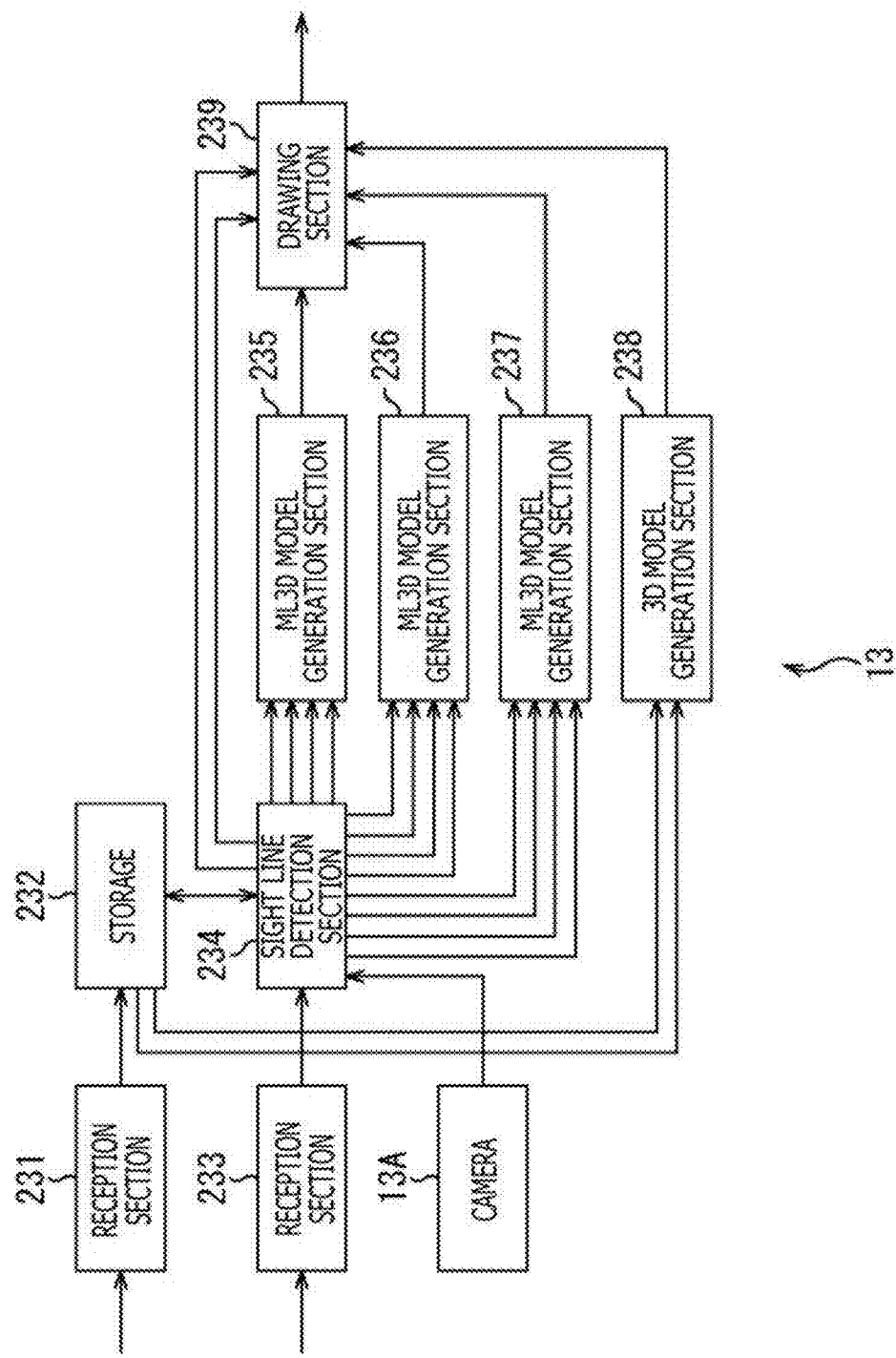
FIG. 19 is a block diagram depicting a configuration example of a home server.

FIG. 19 is a block diagram depicting a configuration example of the home server 13 of FIG. 1.

The home server 13 of FIG. 19 includes a camera 13A, a reception section 231, a storage 232, another reception section 233, a sight line detection section 234, an ML3D model generation section 235, another ML3D model generation section 236, a further ML3D model generation section 237, a 3D model generation section 238 and a drawing section 239.

The reception section 231 of the home server 13 receives low resolution texture stream and low resolution depth stream, first layer texture streams, first layer depth streams, second layer texture streams and second layer depth streams of the six faces and metadata transmitted thereto from the content server 12 and supplies them to the storage 232.

The storage 232 stores the low resolution texture stream and low resolution depth stream, the first layer texture streams, first layer depth streams, second layer texture streams and second layer depth streams of the six faces and the metadata supplied from the reception section 231.

The reception section 233 receives a detection result of the gyro sensor 15B of FIG. 1 from the head mounted display 15 and supplies the detection result to the sight line detection section 234.

The sight line detection section 234 determines a sight line direction of the viewer in the 3D model coordinate system on the basis of a detection result of the gyro sensor 15B supplied from the reception section 233. Further, the sight line detection section 234 acquires a picked up image of the marker 15A from the camera 13A and detects a viewing position in the 3D model coordinate system on the basis of the picked up image.

The sight line detection section 234 reads out the table of the first layer from within the metadata from the storage 232. The sight line detection section 234 determines, on the basis of the viewing position and the sight line direction in the 3D model coordinate system and the table of the first layer, three faces corresponding to the sight line vector closest to the sight line extending in the sight line direction from the viewing position from among the six faces as selection faces. In particular, the sight line detection section 234 selects a face including one of the +X face 81 and the −X face 82, a face including one of the +Y face 83 and the −Y face 84 and a face including one of the +Z face 85 and the −Z face 86 as the selection faces.

Since the selection faces are determined in such a manner as described above, the ratio of the high resolution region in the display image generated using the texture images and the depth images of the first layer and the second layer corresponding to the selection faces by the drawing section 239 hereinafter described is highest. Further, since the three selection faces are determined, the ratio of the high resolution region in the display image in the case where the sight line is directed to the proximity of a vertex of the cube 80 can be increased in comparison with that in an alternative case in which one selection face is selected.

The sight line detection section 234 reads out the first layer texture streams, first layer depth streams, second layer texture streams and second layer depth streams corresponding to the three selection faces from the storage 232. The sight line detection section 234 supplies the read out first layer texture streams, first layer depth streams, second layer texture streams and second layer depth streams for each face to the ML3D model generation sections 235 to 237. Further, the sight line detection section 234 reads out the low resolution texture stream and the low resolution depth stream from the storage 232 and supplies them to the 3D model generation section 238.

Further, the sight line detection section 234 determines the viewing range of the viewer in the 3D model coordinate system on the basis of the viewing position and the sight line direction in the 3D model coordinate system. The sight line detection section 234 supplies the viewing range and the viewing position of the viewer to the drawing section 239. The sight line detection section 234 supplies the three selection faces and the viewpoint position information and the face information of the three faces of the second layer corresponding to the three selection faces to the drawing section 239.

The ML3D model generation sections 235 to 237 individually use the first layer texture streams and the first layer depth streams to generate three-dimensional data including three-dimensional positions (u, v, z) and connection information in the texture image coordinate system of sampling points corresponding to the pixels of the texture image of the first layer and RGB values as color information. It is to be noted that the connection information of each sampling point is information representative of connection between the sampling point (vertex) and a different sampling point. The texture image coordinate system is a coordinate system having a u axis given by the transverse direction, a v axis given by the vertical direction and a z axis in the depth direction of the texture image.

Further, the ML3D model generation sections 235 to 237 use the second layer texture streams and the second layer depth streams supplied from the sight line detection section 234 to generate three-dimensional data of a sampling point corresponding to each pixel of the texture image of the second layer. The ML3D model generation sections 235 to 237 supply the three-dimensional data of the first layer and the second layer to the drawing section 239.

The 3D model generation section 238 decodes the low resolution texture stream and the low resolution depth stream supplied from the sight line detection section 234 to generate a low resolution texture image and a low resolution depth image. The 3D model generation section 238 converts YCbCr values as a pixel value of each pixel of the low resolution texture image into RGB values to make RGB values of the sampling point corresponding to each pixel. Further, the 3D model generation section 238 performs 8-bit dequantization for the pixel value of each pixel of the low resolution depth image and obtains a reciprocal 1/r. Then, the 3D model generation section 238 calculates, on the basis of such reciprocals 1/r of the pixels of the low resolution depth image, a three-dimensional position (u, v, z) of each pixel as a three-dimensional position (u, v, z) of a sampling point corresponding to the pixel.

Further, the 3D model generation section 238 generates, on the basis of the three-dimensional positions (u, v, z) of the sampling points, connection information of the sampling points such that every three neighboring sampling points are connected to each other. The 3D model generation section 238 supplies the three-dimensional positions (u, v, z) of the sampling points, connection information and RGB values as three-dimensional data of the low resolution texture images to the drawing section 239.

The drawing section 239 performs triangle patch drawing (point cloud drawing) of the low resolution texture image in the 3D model coordinate system on the basis of the three-dimensional data of the low resolution texture image supplied from the 3D model generation section 238. Thereafter, the drawing section 239 performs, on the basis of the three-dimensional data of the first layer and the second layer supplied from the ML3D model generation sections 235 to 237 and the viewpoint position information and the face information supplied from the sight line detection section 234, triangle patch drawing of the texture images of the first layer and the second layer in the 3D model coordinate system.

In particular, the viewpoint of the low resolution texture image is the origin of the 3D model coordinate system, and the position and the size of each of the faces of a regular octahedron as a 3D model are determined in advance. Accordingly, the drawing section 239 can calculate internal parameters and external parameters of the cameras corresponding to the faces of the regular octahedron. Therefore, the drawing section 239 can use the internal parameters and the external parameters to recognize, from the three-dimensional positions (u, v, z) of the sampling points of the low resolution texture image, the position (u, v) on the screen and the three-dimensional position (X, Y, Z) in the 3D model coordinate system of each sampling point. As a result, the positions (u, v) on the screen and three-dimensional positions (X, Y, Z), connection information and RGB values of the sampling points of the low resolution texture image can be used to perform triangle patch drawing.

Further, the drawing section 239 can calculate internal parameters and external parameters of the cameras corresponding to the faces of the first layer and the second layer on the basis of the viewpoint position information and the face information of the first layer and the second layer. Accordingly, the drawing section 239 can use the internal parameters and the external parameters to recognize the position (u, v) on the screen and the three-dimensional position (X, Y, Z) of the sampling points from the three-dimensional positions (u, v, z) of the sampling points of the first layer and the second layer. As a result, the drawing section 239 can use the positions (u, v) on the screen and three-dimensional positions (X, Y, Z), connection information and RGB values of the sampling points of the first layer and the second layer to perform triangle patch drawing.

The drawing section 239 (image generation section) generates a display image by perspectively projecting (mapping) triangle patches drawn in the 3D model coordinate system within the viewing range from the viewpoint given as the viewing position supplied from the sight line detection section 234. The drawing section 239 transmits the display image to the conversion apparatus 14 of FIG. 1.

(Configuration Example of ML3D Model Generation Section)

Figure 20:
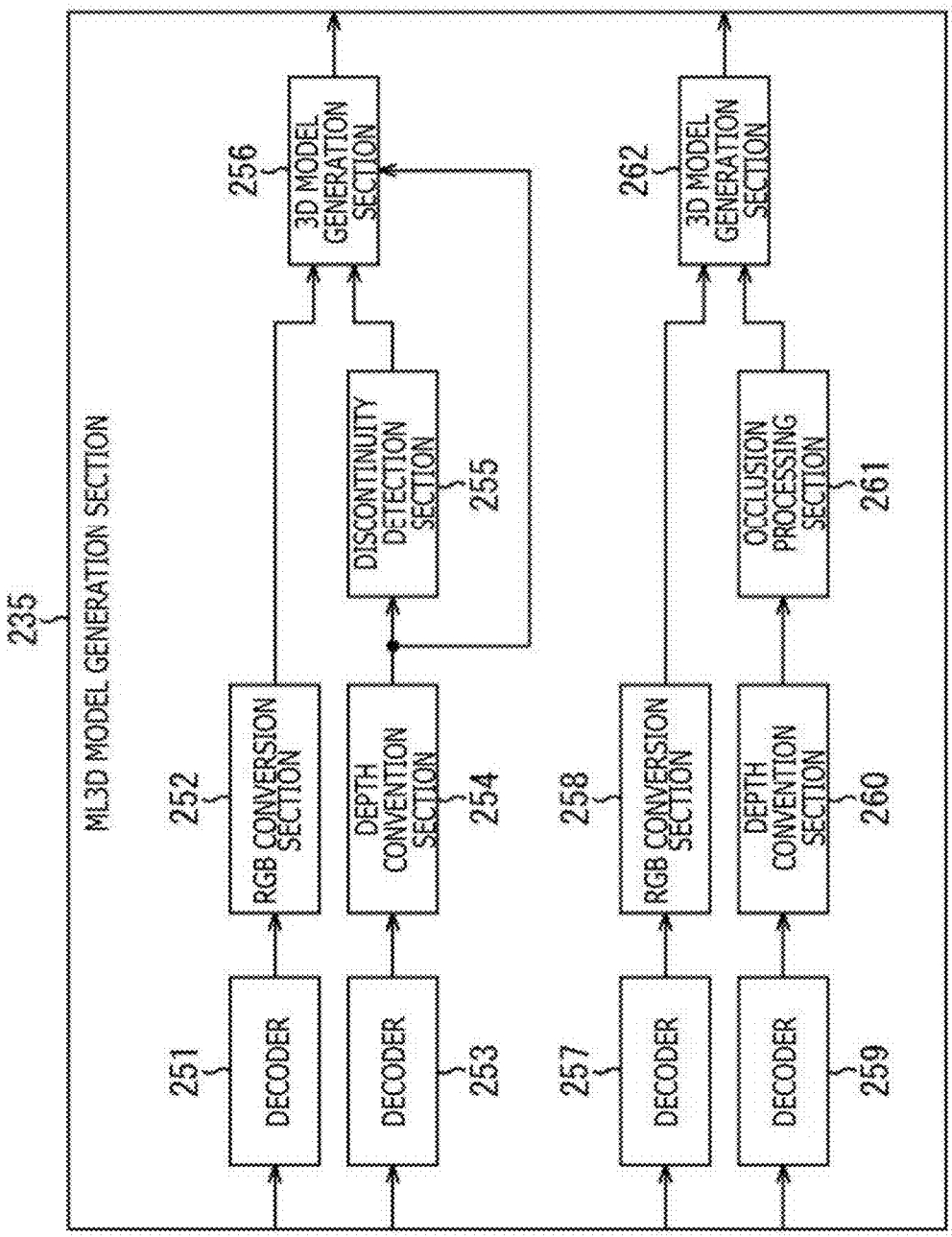
FIG. 20 is a block diagram depicting a configuration example of an ML3D model generation section.

FIG. 20 is a block diagram depicting a configuration example of the ML3D model generation section 235 of FIG. 19.

The ML3D model generation section 235 of FIG. 20 includes a decoder 251, an RGB conversion section 252, another decoder 253, a depth conversion section 254, a discontinuity detection section 255, a 3D model generation section 256, a further decoder 257, another RGB conversion section 258, a still further decoder 259, another depth conversion section 260, an occlusion processing section 261 and a 3D model generation section 262.

The decoder 251 of the ML3D model generation section 235 decodes first layer texture streams supplied from the sight line detection section 234 of FIG. 19 to generate a texture image of the first layer. The decoder 251 supplies the texture image of the first layer to the RGB conversion section 252.

The RGB conversion section 252 converts YCbCr values as pixel values of the pixels of the texture images of the first layer into RGB values to obtain RGB values of sampling points corresponding to the pixels. Then, the RGB conversion section 252 supplies the RGB values of the sampling points to the 3D model generation section 256.

The decoder 253 decodes the first layer depth streams supplied from the sight line detection section 234 to generate a depth image of the first layer. The decoder 253 supplies the depth image of the first layer to the depth conversion section 254.

The depth conversion section 254 performs 8-bit dequantization for pixel values of the pixels of the depth images of the first layer supplied from the decoder 253 to obtain reciprocals $1/r$. Then, the depth conversion section 254 calculates, on the basis of the reciprocals $1/r$ of the pixels of the depth images of the first layer, three-dimensional positions (u, v, z) of the pixels as three-dimensional positions (u, v, z) of sampling points corresponding to the pixels. The depth conversion section 254 supplies the three-dimensional positions (u, v, z) of the sampling points to the discontinuity detection section 255 and the 3D model generation section 256.

The discontinuity detection section 255 detects, on the basis of the three-dimensional positions (u, v, z) of the sampling points supplied from the depth conversion section 254, discontinuity pixels that are pixels corresponding to sampling points at each of which the difference of the z coordinate from a neighboring sampling point is equal to or greater than a threshold value from among pixels of the depth image of the first layer. The discontinuity detection section 255 supplies the three-dimensional positions (u, v, z) of the sampling points corresponding to the discontinuity pixels to the 3D model generation section 256.

The 3D model generation section 256 (connection information generation section) generates connection information of the sampling points on the basis of the three-dimensional positions (u, v, z) of the sampling points supplied from the depth conversion section 254 such that every three neighboring sampling points from among the sampling points are connected to each other. In particular, the 3D model generation section 256 generates, for each sampling point, connection information representative of connection between three vertices of a triangle patch that includes the sampling point as a vertex. Then, the 3D model generation section 256 deletes, on the basis of the three-dimensional positions (u, v, z) of the sampling points corresponding to the discontinuity pixels supplied from the discontinuity detection section 255, the connection information representative of connection of the sampling points corresponding to the discontinuity pixels from within the generated connection information of the sampling points.

The 3D model generation section 256 generates three-dimensional positions (u, v, z), RGB values and connection information after the deletion of the sampling points of the first layer as three-dimensional data of the first layer and supplies the three-dimensional data to the drawing section 239 of FIG. 19.

Processing of the decoder 257, RGB conversion section 258, decoder 259 and depth conversion section 260 is similar to that of the decoder 251, RGB conversion section 252, decoder 253 and depth conversion section 254 except that the layer of the processing target changes from the first layer to the second layer, and therefore, description of the same is omitted.

The occlusion processing section 261 detects discontinuity pixels from among pixels of the depth image of the second layer on the basis of the three-dimensional positions (u, v, z) of the sampling points supplied from the depth conversion section 260. The occlusion processing section 261 performs an occlusion process for correcting the three-dimensional positions (u, v, z) of the sampling points corresponding to the discontinuity pixels on the basis of the three-dimensional positions (u, v, z) of the sampling points of the second layer.

In particular, the occlusion processing section 261 corrects the two-dimensional position (u, v) of each sampling point corresponding to a discontinuity pixel to a two-dimensional position (u, v) of a sampling point neighboring on the near side with the sampling point. The occlusion processing section 261 supplies the three-dimensional positions (u, v, z) after the occlusion process of the sampling points of the second layer to the 3D model generation section 262.

The 3D model generation section 262 generates, for each sampling point, connection information representative of connection to two sampling points neighboring with the sampling point on the basis of the three-dimensional positions (u, v, z) of the sampling points supplied from the occlusion processing section 261. The 3D model generation section 262 generates three-dimensional positions (u, v, z) and connection information of the sampling points and RGB values supplied from the RGB conversion section 258 as three-dimensional data of the second layer. The 3D model generation section 256 supplies the three-dimensional data of the second layer to the drawing section 239 of FIG. 19.

It is to be noted that, though not depicted, the ML3D model generation section 236 and the ML3D model generation section 237 are configured similarly to the ML3D model generation section 235 of FIG. 20.

(Description of Effect of Deletion of Connection Information and Occlusion Process)

Figure 22:
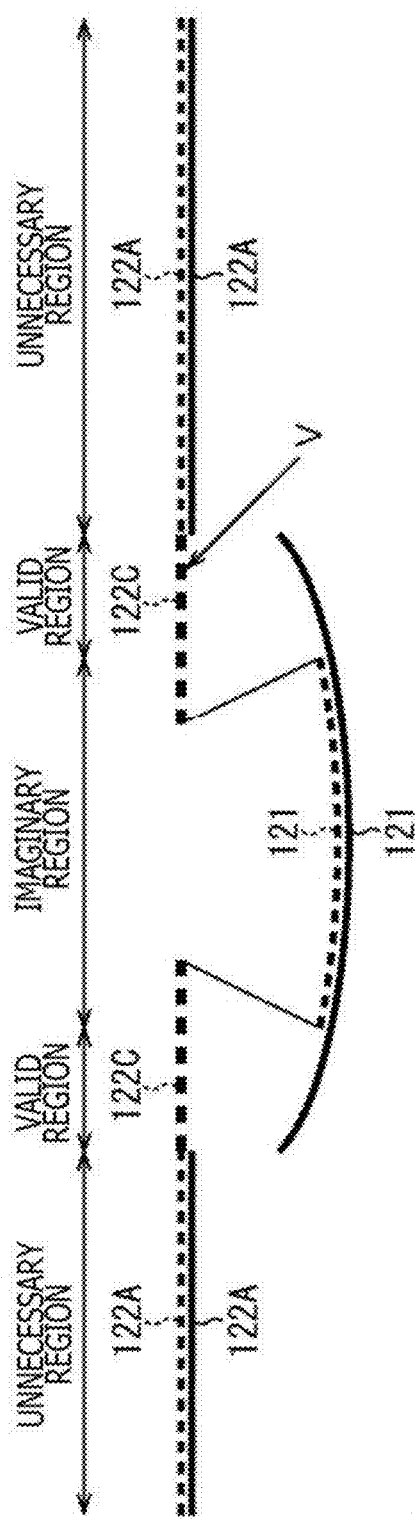
FIG. 22 is a view illustrating another example of connection information.

FIGS. 21A and 21B views illustrating connection information in the case where connection information representative of connection to a sampling point corresponding to a discontinuity pixel in connection information of the first layer is not deleted, and FIG. 22 is a view illustrating connection information in the case where such connection information is deleted.

Referring to FIGS. 21A 21B and 22, the leftward and rightward direction represents the transverse direction of a texture image and the upward and downward direction represents a depth direction of the texture image. The upward direction in FIGS. 21A 21B and 22 is the near side, and the downward direction is the deep side. Further, in FIGS. 21A 21B and 22, a solid line represents three-dimensional positions (u, v, z) of sampling points of the first layer, and a broken line represents three-dimensional positions (u, v, z) of sampling points of the second layer. Further, in the examples of FIGS. 21A 21B and 22, the foreground 111 and the background 112 of FIG. 10 are imaging objects.

In the case where an occlusion process is not performed in none of the first layer and the second layer, three-dimensional positions of sampling points corresponding to discontinuity pixels on the boundaries of a picked up image 121 of a foreground 111 and a picked up image 122A of a region 112A of a background 112 of the first layer as depicted in FIG. 21A.

Further, in the case where connection information representative of connection to sampling points corresponding to discontinuity pixels in both the first layer and the second layer, the sampling points corresponding to the discontinuity pixels of the first layer and the second layer are connected to two neighboring sampling points as depicted in FIG. 21A.

Accordingly, a triangle patch having vertices at a sampling point corresponding to a discontinuity pixel of the first layer and two neighboring sampling points is generated, and the picked up image 122C in the valid region is filled by the triangle patch. Therefore, in the case where a display image including the imaged occlusion region 112C corresponding to a sight line V directed from a right lower portion to a left upper portion in the figure is to be generated, the valid region of the second layer in which the picked up image 122C of the imaged occlusion region 112C is disposed cannot be used.

On the other hand, in the case where connection information representative of connection to a sampling point corresponding to a discontinuity pixel is not deleted but an occlusion process is performed in both the first layer and the second layer, as depicted in FIG. 21B, the two-dimensional position of a sampling point corresponding to a discontinuity pixel in the first layer and the second layer is corrected to a two-dimensional position of a sampling point neighboring on the near side with the sampling point.

Accordingly, in the case where a display image corresponding to the sight line V is to be generated, the picked up image 122A of the region 112A of the first layer can be used as the display image of the imaged occlusion region 112C. As a result, the picture quality of the display image is improved.

However, a sampling point corresponding to a discontinuity pixel of the first layer after the occlusion process is connected to two neighboring sampling points and a triangle patch is generated. Accordingly, similarly as in the case of FIG. 21A, in the case where a display image corresponding to the sight line V is to be generated, the valid region of the second layer in which the picked up image 122C of the imaged occlusion region 112C is disposed cannot be used.

In contrast, the 3D model generation section 256 deletes connection information representative of connection to discontinuity pixels of the first layer as depicted in FIG. 22. Accordingly, a triangle patch having a vertex at the sampling point corresponding to the discontinuity pixel of the first layer is not generated. Therefore, in the case where a display image corresponding to the sight line V is to be generated, a valid region of the second layer in which a picked up image 122C of an imaged occlusion region 112C is disposed can be used. Since, in the second layer, deletion of connection information is not performed, a triangle patch of the second layer exists without fail in a region in which a triangle patch of the first layer does not exist.

Further, the occlusion processing section 261 performs an occlusion process for the second layer. Accordingly, as depicted in FIG. 22, the two-dimensional position of a sampling point on the depth side from between sampling points corresponding to a discontinuity pixel on the boundary between an valid region and a imaginary region of the second layer is connected to the two-dimensional position of the sampling point neighboring on the near side with the sampling point on the depth side. Accordingly, in the second layer, an occlusion region is reduced. Therefore, the picture quality of the second layer that is used when a display image corresponding to the sight line V is to be generated is improved, and as a result, the picture quality of the display image is improved.

(Description of Effect of Angle of View of Face of First Layer)

FIGS. 23A, 23B, 24A, and 24B are views illustrating sampling points in the case where the angle of view of each face of the first layer is 90 degrees and 100 degrees, respectively.

In the examples of FIGS. 23A, 23B, 24A, and 24B, it is assumed that, for the convenience of description, the resolutions of a texture image and a depth image of the first layer in the case where the angle of view of each face of the first layer is 90 degrees and 100 degrees are 4×4 pixels and 6×6 pixels, respectively.

Figure 23B:
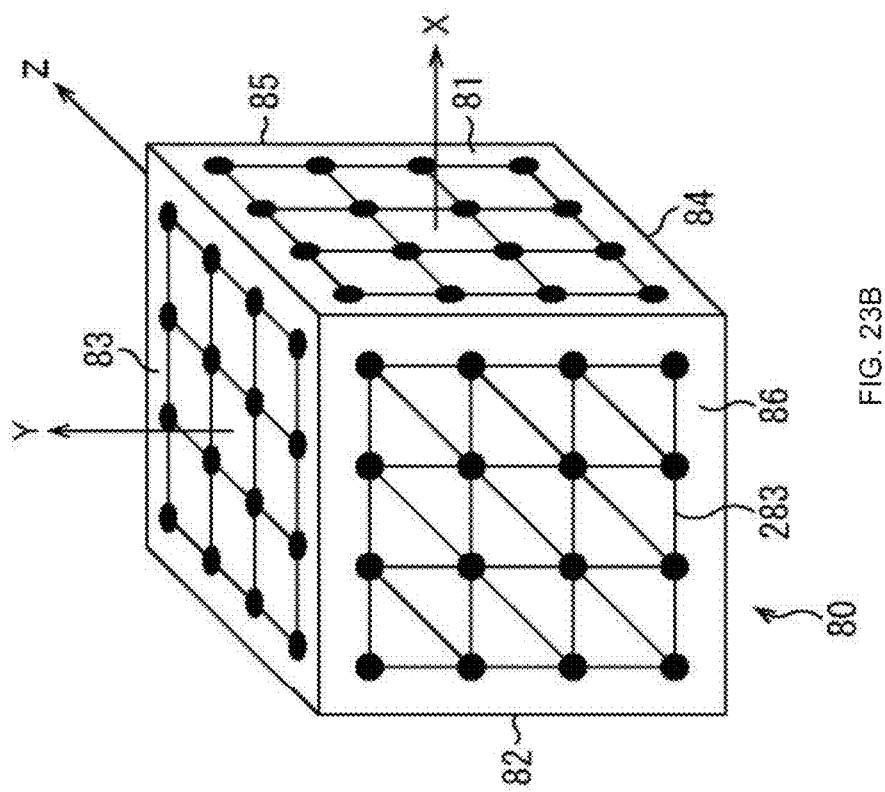
FIGS. 23A and 23B are views illustrating an example of sampling points.

As depicted in FIG. 23B, in the case where the angle of view of each face of the first layer is 90 degrees, the six faces of the first layer are six faces 81 to 86 configuring a cube 80.

Figure 23A:
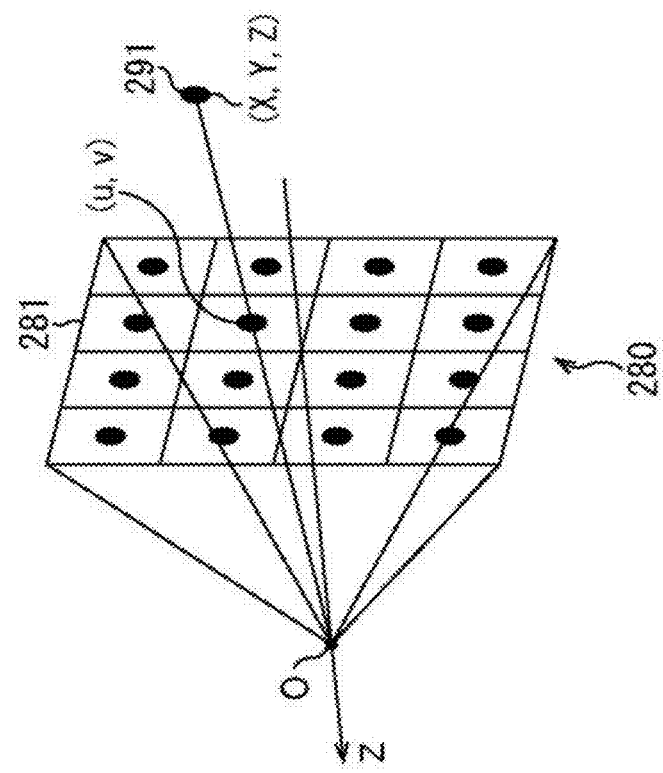

However, as depicted in FIG. 23A, the position (u, v) of a sampling point 291 on a texture image 280 of the −Z face 86 of the first layer, namely, the position at which a line directed from the viewpoint O in the 3D model coordinate system toward the sampling point 291 crosses with the −Z face 86 is the center of each pixel 281. Also the positions (u, v) of sampling points of the other faces 81 to 85 are centers of pixels similarly as in the −Z face 86.

Accordingly, the sizes in the u direction and the v direction of a region 283 on the faces 81 to 86 of all triangle patches configured by connection of every three sampling points neighboring with each other from among the sampling points each indicated by a dark round mark in FIG. 23B are smaller by sizes of one half of a pixel in comparison with the faces 81 to 86. Therefore, triangle patches corresponding to the boundaries of the faces 81 to 86 are not generated, and as a result, it becomes difficult to generate a display image of a sight line passing the boundary between the faces 81 to 86 in high picture quality.

Figure 24B:
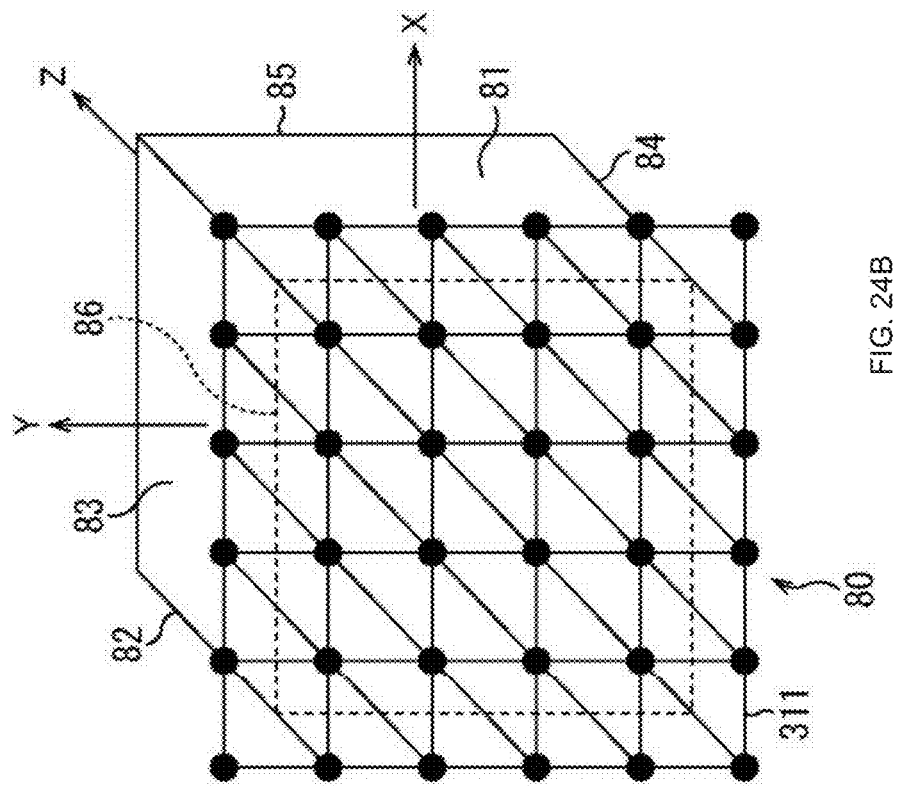
FIGS. 24A and 24B are views illustrating another example of sampling points.
Figure 24A:
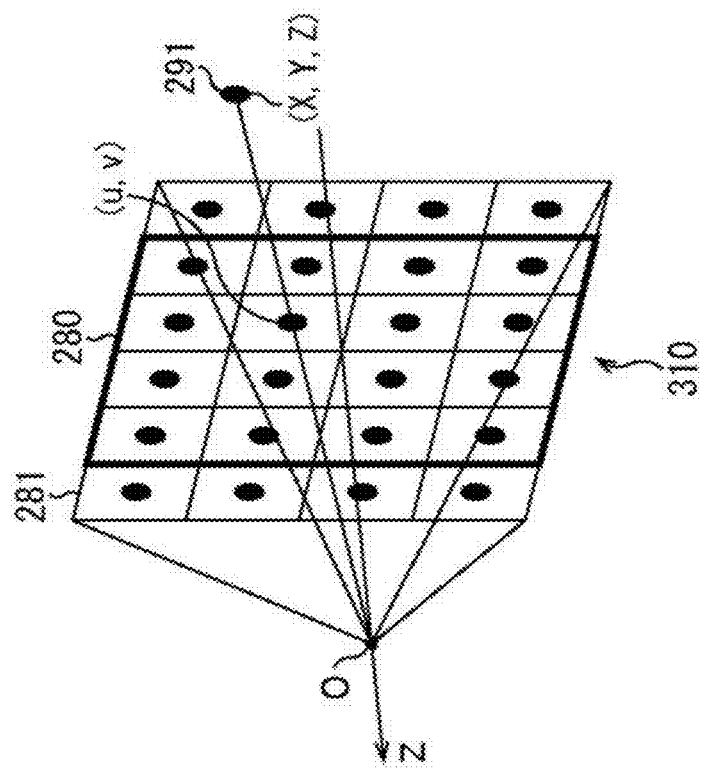

In contrast, in the case where the angle of view of each face of the first layer is 100 degrees, the size of a texture image 310 of the faces of the first layer including the −Z face 86 becomes 6×6 pixels greater than the size of the texture image 280 of FIGS. 23A and 23B as depicted in FIG. 24A. Also the size of the texture image of each face of the first layer including the other faces 81 to 85 becomes 6×6 pixels similarly.

Accordingly, as depicted in FIG. 24B, the sizes in the u direction and the v direction of a region 311 on the −Z face 86 of all triangle patches configured by connection of every three neighboring sampling points from among the sampling points each indicated by a dark round mark in the figure are greater by a size of one half of a pixel in comparison with that of the −Z face 86. Though not depicted, also the sizes in the u direction and the v direction of a region of a triangle patch of each face of the first layer including the other faces 81 to 85 are greater by a size of one half of a pixel in comparison with those of the faces 81 to 85 similarly to the region 311. Accordingly, a triangle patch corresponding to the boundary of each of the faces 81 to 86 is generated, and as a result, a display image of an arbitrary sight line including a sight line passing the boundary of each of the faces 81 to 86 can be generated with high picture quality.

Although an effect in the case where the angle of view of each face of the first layer is 100 degrees is described with reference to FIGS. 23A, 23B, 24A, and 24B, if the angle of view of each face of the first layer is greater than 90 degrees, then a similar effect is produced even in the case where the angle of view is not 100 degrees.

(Description of Effect of Angle of View of Face of Second Layer)

Figure 25B:
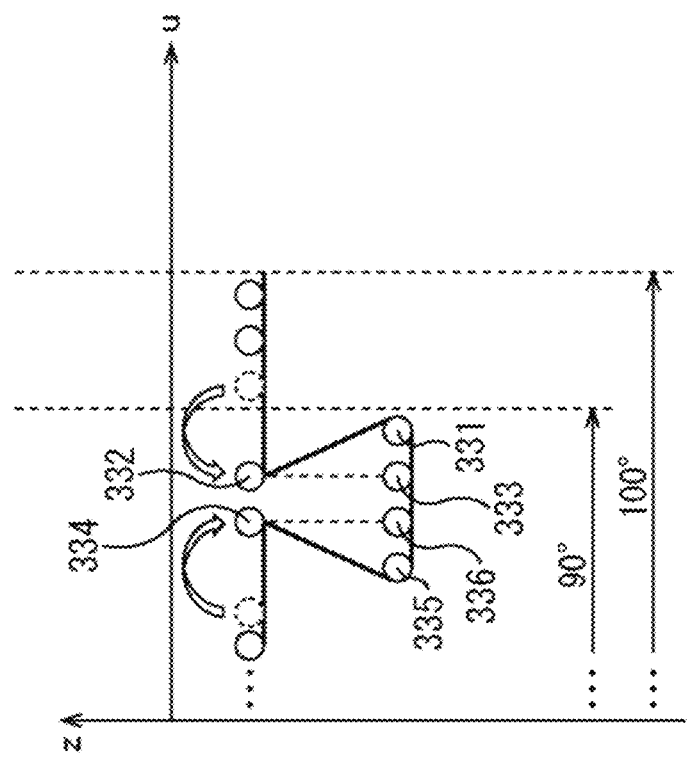
FIGS. 25A and 25B are views illustrating an occlusion process.
Figure 25A:
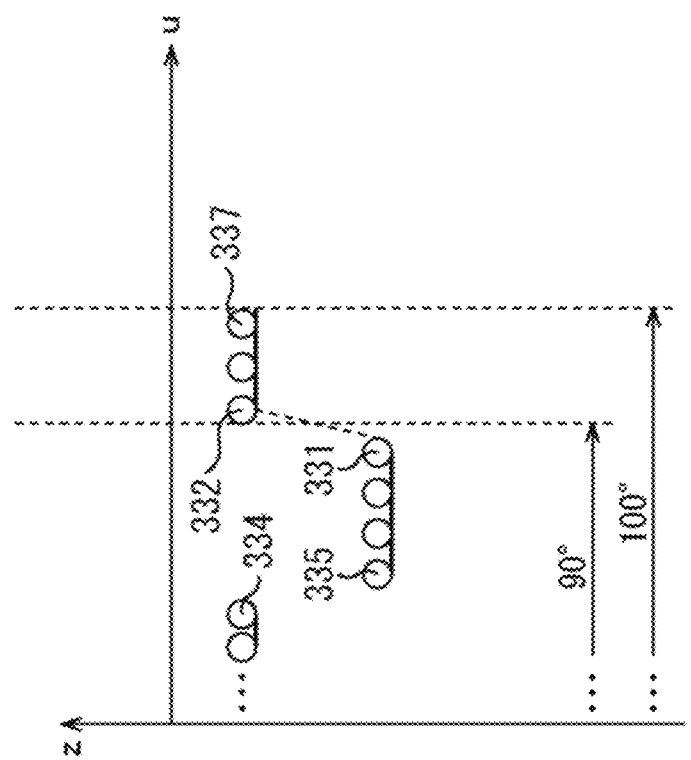

FIGS. 25A and 25B are views illustrating an occlusion process in the case where the angle of view of each face of the second layer is 90 degrees and 100 degrees.

Referring to FIGS. 25A and 25B, the axis of abscissa represents a u axis and the axis of ordinate represents a z axis. Further, a round mark represents a sampling point. Furthermore, in the example of FIGS. 25A and 25B, the z coordinates of the position in the depth direction increases toward the deep side.

In the case where the angle of view of each face of the second layer is 90 degrees, sampling points are mapped only to one of the faces of the second layer. Accordingly, as depicted in FIG. 25A, a sampling point 332 neighboring with a sampling point 331 that is mapped to an end portion in the u direction of the face of a processing target is not mapped to the face of the processing target, and upon occlusion process of the face of the processing target, the position of the sampling point 332 on the z axis is unknown.

Therefore, even in the case where the difference between the z coordinates of the sampling point 331 and the sampling point 332 is equal to or greater than the threshold value, a pixel corresponding to the sampling point 331 is not detected as a discontinuity pixel. Similarly, also in the case where a face to which the sampling point 332 is mapped is the face of the processing target, a pixel corresponding to the sampling point 332 is not detected as a discontinuity pixel. Accordingly, an occlusion process cannot be performed for the sampling point 331 and the sampling point 332. In other words, in order to perform an occlusion process for the sampling point 331 and the sampling point 332, it is necessary to use, in addition to a depth image of the face of the processing target, also a depth image of a face neighboring with the face of the processing target.

In contrast, in the case where the angle of view of each face of the second layer is 100 degrees, at an end portion of each face, a sampling point that is mapped to a region other than an end portion of a face neighboring with the face is mapped in an overlapping relationship as a margin. For example, at an end portion of the face of the processing target to which the sampling point 331 is mapped, the sampling point 332 that is mapped in a region other than an end portion of a face neighboring with the face of the processing target is mapped.

Accordingly, in the case where the difference between the z coordinates of the sampling point 331 and the sampling point 332 is equal to or greater than the threshold value, pixels corresponding to the sampling point 331 and the sampling point 332 are detected as discontinuity pixels. Therefore, an occlusion process can be performed for the sampling point 331 and the sampling point 332 as depicted in FIG. 25B. As a result, the u coordinate of the sampling point 332 corresponding to a discontinuity pixel is corrected to the u coordinate of a sampling point 333 in the proximity of and on the nearer side than the sampling point 332 (which has a smaller z coordinate).

It is to be noted that, since, in the example of FIGS. 25A and 25B, the difference of the z coordinate between a sampling point 334 and a sampling point 335 mapped to a region other than an end portion of the face of the processing target is equal to or greater than the threshold value, also pixels corresponding to the sampling point 334 and the sampling point 335 are detected as discontinuity pixels. As a result, as depicted in FIG. 25B, the u coordinate of the sampling point 334 is connected to the u coordinate of a sampling point 336 in the proximity of and on the nearer side than the sampling point 334.

Further, a sampling point 337 at an end portion of the face of the processing target, which has the greatest u coordinate, is mapped to a region other than an end portion of a face neighboring with the face of the processing target. Accordingly, in the case where this face is set as a face of a processing target, it is decided whether or not a pixel corresponding to the sampling point 337 is a discontinuity pixel, and when it is decided that the pixel is a discontinuity pixel, an occlusion process for the sampling point 337 can be performed.

As described above, in the case where the angle of view of each face of the second layer is 100 degrees, it is possible to use only a sampling point of each face to perform an occlusion process also for the sampling point 331 mapped to an end portion of a region other than an end portion of each face. As a result, an occlusion region of the second layer is reduced, and the picture quality of the display image can be improved.

While an effect in the case where the angle of view of each face of the second layer is 100 degrees is described with reference to FIGS. 25A and 25B, if the angle of view of each face of the second layer is greater than 90 degrees, then even if the angle of view is not 100 degrees, a similar effect is generated.

It is to be noted that the ML3D model generation sections 235 to 237 may perform image processing such as a filter process using peripheral pixels or the like for a texture image or a depth image obtained as a result of decoding. In this case, since the angle of view of each face of the first layer and the second layer is greater than 90 degrees, an effect that, also at an end portion of a region other than an end portion of each face, image processing can be performed similarly to an occlusion process.

(Description of Processing of Home Server)

Figure 26:
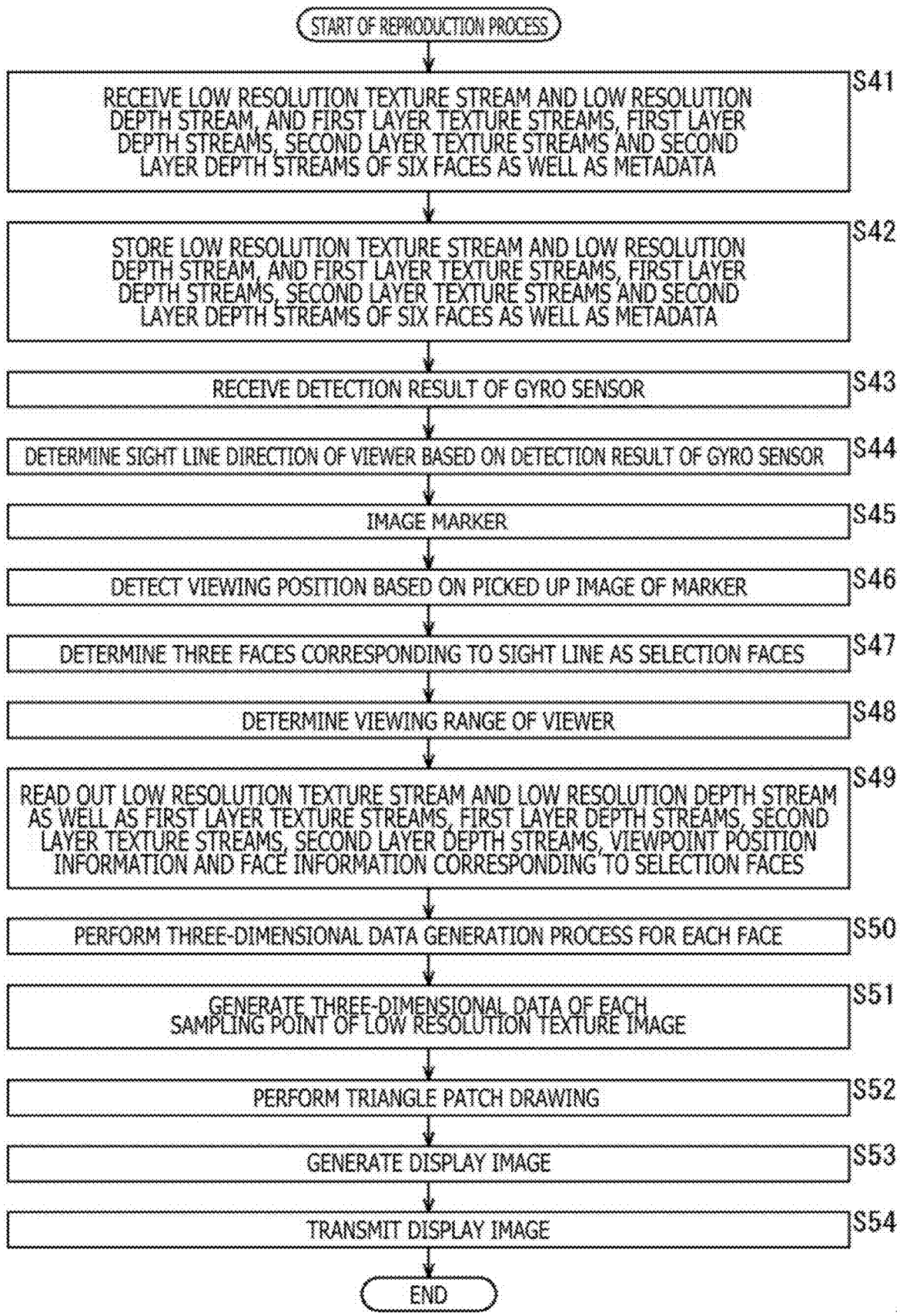
FIG. 26 is a flow chart illustrating a reproduction process.

FIG. 26 is a flow chart illustrating a reproduction process of the home server 13 of FIG. 19. This reproduction process is started when a low resolution texture stream and a low resolution depth stream, first layer texture streams, first layer depth streams, second layer texture streams and second layer depth streams of six faces and metadata are transmitted, for example, from the content server 12 to the home server 13.

At step S41 of FIG. 26, the reception section 231 of the home server 13 receives a low resolution texture stream and a low resolution depth stream, and first layer texture streams, first layer depth streams, second layer texture streams and second layer depth streams of six faces and metadata transmitted from the content server 12 and supplies them to the storage 232.

At step S42, the storage 232 stores the low resolution texture stream and low resolution depth stream, and the first layer texture streams, first layer depth streams, second layer texture streams and second layer depth streams of the six faces and the metadata.

At step S43, the reception section 233 receives a result of the detection of the gyro sensor 15B of FIG. 1 from the head mounted display 15 and supplies the same to the sight line detection section 234.

At step S44, the sight line detection section 234 determines a sight line direction of the viewer in the 3D model coordinate system on the basis of the detection result of the gyro sensor 15B supplied from the reception section 233. At step S45, the camera 13A images the marker 15A applied to the head mounted display 15 and supplies a picked up image obtained as a result of the imaging to the sight line detection section 234.

At step S46, the sight line detection section 234 detects a viewing position in the 3D model coordinate system on the basis of the picked up image of the marker 15A supplied from the camera 13A and supplies the viewing position to the drawing section 239.

At step S47, the sight line detection section 234 determines three faces corresponding to sight line vectors closest to the sight line from among the six faces as selection faces on the basis of the table of the first layer from within the metadata stored in the storage 232 and the viewing position and the sight line direction in the 3D model coordinate system.

At step S48, the sight line detection section 234 determines a viewing range of the viewer in the 3D model coordinate system on the basis of the viewing position and the sight line direction in the 3D model coordinate system, and supplies the viewing range to the drawing section 239.

At step S49, the sight line detection section 234 reads out the low resolution texture stream and the low resolution depth stream from the storage 232 and supplies them to the 3D model generation section 238. Further, the sight line detection section 234 reads out first layer texture streams, first layer depth streams, second layer texture streams and second layer depth streams corresponding to the three selection faces from the storage 232. The sight line detection section 234 supplies the read out first layer texture streams, first layer depth streams, second layer texture streams and second layer depth streams for each face to the ML3D model generation sections 235 to 237. Further, the sight line detection section 234 reads out the viewpoint position information and the face information corresponding to the three selection faces from the storage 232 and supplies them to the drawing section 239.

At step S50, the ML3D model generation sections 235 to 237 perform, for each face, a three-dimensional data generation process for generating three-dimensional data of the sampling points of the first layer and the second layer. Details of the three-dimensional data generation process are hereinafter described with reference to FIG. 27.

At step S51, the 3D model generation section 238 generates three-dimensional data of the sampling points of the low resolution texture image from the low resolution texture stream and the low resolution depth stream supplied from the sight line detection section 234 and supplies the three-dimensional data to the drawing section 239.

At step S52, the drawing section 239 performs, on the basis of the three-dimensional data of the low resolution texture image supplied from the 3D model generation section 238, triangle patch drawing of the low resolution texture image in the 3D model coordinate system. Thereafter, the drawing section 239 performs, on the basis of the three-dimensional data of the first layer and the second layer supplied from the ML3D model generation sections 235 to 237 and the viewpoint position information and the face information supplied from the sight line detection section 234, triangle patch drawing of texture images of the first layer and the second layer in the 3D model coordinate system.

At step S53, the drawing section 239 generates a display image by perspectively projecting the triangle patch drawn in the 3D model coordinate system to the viewing range with respect to the viewpoint given as the viewing position supplied from the sight line detection section 234. At step S54, the drawing section 239 transmits the display image to the conversion apparatus 14 of FIG. 1.

Figure 27:
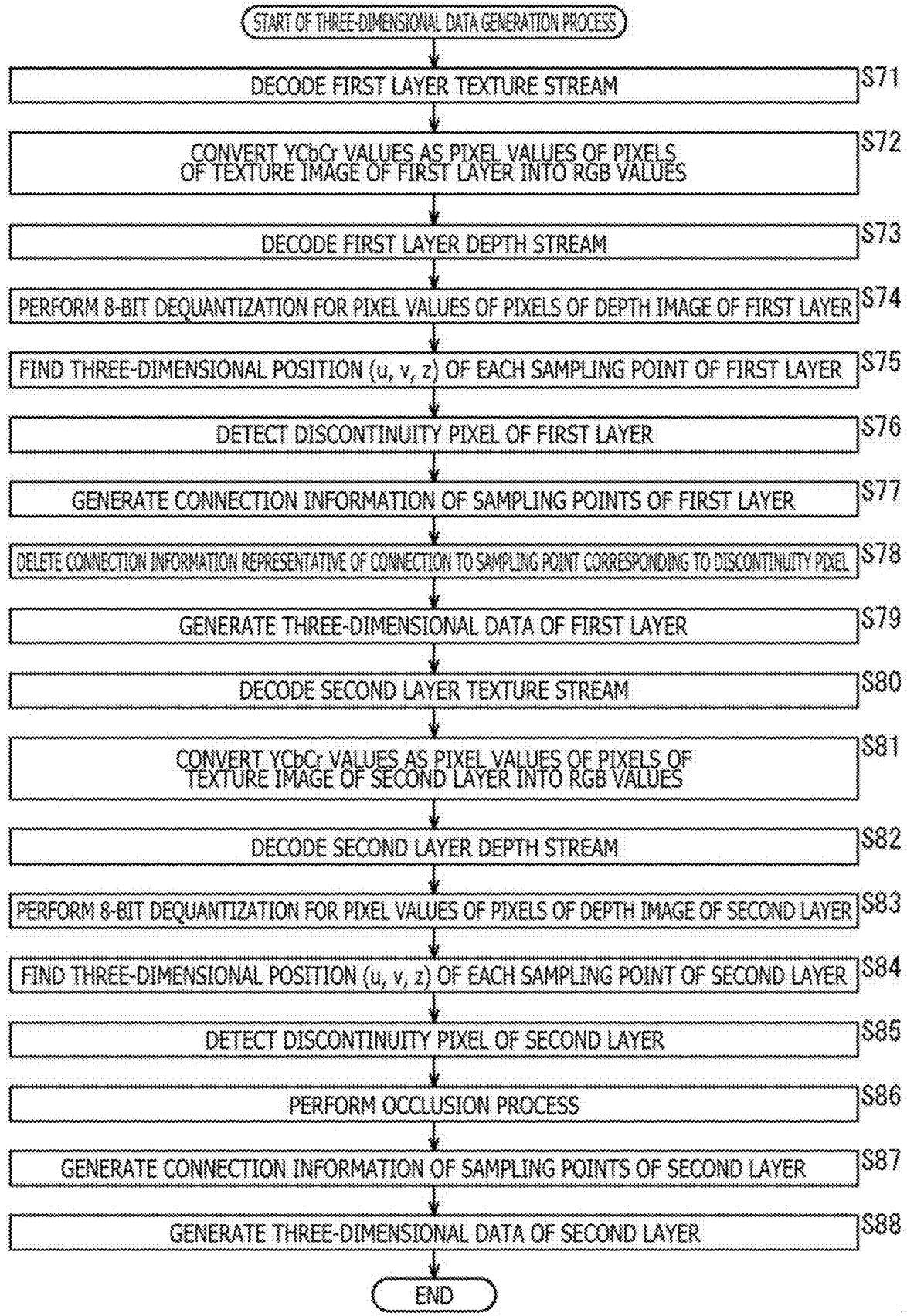
FIG. 27 is a flow chart illustrating details of a three-dimensional data generation process.

FIG. 27 is a flow chart illustrating details of the three-dimensional data generation process performed by the ML3D model generation section 235 at step S50 of FIG. 26.

At step S71 of FIG. 27, the decoder 251 (FIG. 20) of the ML3D model generation section 235 decodes first layer texture streams supplied from the sight line detection section 234 of FIG. 19 to generate a texture image of the first layer. The decoder 251 supplies the texture image of the first layer to the RGB conversion section 252.

At step S72, the RGB conversion section 252 converts YCbCr values as pixel values of the pixels of the texture image of the first layer into RGB values and determines them as RGB values of sampling points corresponding to the pixels. Then, the RGB conversion section 252 supplies the RGB values of the sampling points to the 3D model generation section 256.

At step S73, the decoder 253 decodes the first layer depth streams supplied from the sight line detection section 234 to generate a depth image of the first layer. The decoder 253 supplies the depth image of the first layer to the depth conversion section 254.

At step S74, the depth conversion section 254 performs 8-bit dequantization for the pixel value of each pixel of the depth image of the first layer supplied from the decoder 253 and obtains a reciprocal 1/r of each pixel of the depth image of the first layer.

At step S75, the depth conversion section 254 calculates the three-dimensional position (u, v, z) of each pixel of the depth image of the first layer on the basis of the reciprocal 1/r of each pixel of the depth image of the first layer as a three-dimensional position (u, v, z) of a sampling point corresponding to the pixel. The depth conversion section 254 supplies the three-dimensional positions (u, v, z) of the sampling points to the discontinuity detection section 255 and the 3D model generation section 256.

At step S76, the discontinuity detection section 255 detects discontinuity pixels from among the pixels of the depth images of the first layer on the basis of the three-dimensional positions (u, v, z) of the sampling points supplied from the depth conversion section 254. The discontinuity detection section 255 supplies the three-dimensional positions (u, v, z) of the sampling points corresponding to the discontinuity pixels to the 3D model generation section 256.

At step S77, the 3D model generation section 256 generates, on the basis of the three-dimensional positions (u, v, z) of the sampling points supplied from the depth conversion section 254, connection information of the sampling points of the first layer such that every three neighboring sampling points from among the sampling points are connected to each other.

At step S78, the 3D model generation section 256 deletes, on the basis of the three-dimensional positions (u, v, z) of the sampling points corresponding to the discontinuity pixels supplied from the discontinuity detection section 255, connection information representative of connection to the sampling points corresponding to the discontinuity pixels from within the connection information of the sampling points generated at step S77.

At step S79, the 3D model generation section 256 generates three-dimensional positions (u, v, z) of the sampling points of the first layer, RGB values and connection information after the deletion by the process at step S78 as three-dimensional data of the first layer. The 3D model generation section 256 supplies the three-dimensional data of the first layer to the drawing section 239 of FIG. 19.

At step S80, the decoder 257 decodes the second layer texture streams supplied from the sight line detection section 234 to generate a texture image of the second layer. The decoder 257 supplies the texture image of the second layer to the RGB conversion section 258.

At step S81, the RGB conversion section 258 converts the YCbCr values as pixel values of the pixels of the texture images of the second layer into RGB values and determines them as RGB values of the sampling points corresponding to the pixels. Then, the RGB conversion section 258 supplies the RGB values of the sampling points to the 3D model generation section 262.

At step S82, the decoder 259 decodes the second layer depth streams supplied from the sight line detection section 234 to generate a depth image of the second layer. The decoder 259 supplies the depth image of the second layer to the depth conversion section 260.

At step S83, the depth conversion section 260 performs 8-bit dequantization for the pixel values of the pixels of the depth images of the second layer supplied from the decoder 259 and obtains reciprocals 1/r of the pixels of the depth images of the second layer.

At step S84, the depth conversion section 260 calculates, on the basis of the reciprocals 1/r of the pixels of the depth images of the second layer, three-dimensional positions (u, v, z) of the pixels of the depth images of the second layer as three-dimensional positions (u, v, z) of sampling points corresponding to the pixels. The depth conversion section 260 supplies the three-dimensional positions (u, v, z) of the sampling points to the occlusion processing section 261 and the 3D model generation section 262.

At step S85, the occlusion processing section 261 detects, on the basis of the three-dimensional positions (u, v, z) of the sampling points supplied from the depth conversion section 260, discontinuity pixels among the pixels of the depth image of the second layer.

At step S86, the occlusion processing section 261 performs, on the basis of the three-dimensional positions (u, v, z) of the sampling points of the second layer, an occlusion process for correcting the three-dimensional positions (u, v, z) of the sampling points corresponding to the discontinuity pixels. The occlusion processing section 261 supplies the three-dimensional positions (u, v, z) after the occlusion process of the sampling points of the second layer to the 3D model generation section 262.

At step S87, the 3D model generation section 262 generates, on the basis of three-dimensional positions (u, v, z) of the sampling points supplied from the occlusion processing section 261, connection information of the sampling points of the second layer such that every three neighboring sampling points among the sampling points are connected to each other.

At step S88, the 3D model generation section 262 generates the three-dimensional positions (u, v, z) and the connection information of the sampling points and the RGB values supplied from the RGB conversion section 258 as three-dimensional data of the second layer. The 3D model generation section 262 supplies the three-dimensional data of the second layer to the drawing section 239 of FIG. 19.

It is to be noted that the three-dimensional data generation processes performed by the ML3D model generation section 236 and the ML3D model generation section 237 are performed similarly to the three-dimensional data process of FIG. 27.

The home server 13 generates a display image using the first layer and the second layer as described above. Accordingly, in the case where the viewing position is different from the viewpoint O, an occlusion region of the viewpoint O included in the display image can be generated using the second layer. Accordingly, a display image of high picture quality can be generated.

Further, the home server 13 generates a display image using not only a texture image but also a depth image. Accordingly, through the triangle patch drawing, it is possible to map a texture image to a triangle patch of a three-dimensional shape according to an imaging object and generate a display image using the triangle patch. Therefore, in comparison with an alternative case in which a display image is generated by mapping a texture image to a predetermined face using only a texture image, a display image of higher picture quality can be generated.

Furthermore, a texture image and a depth image of the first layer are a texture image and a depth image obtained by mapping a texture image and a depth image of an omnidirectional image, respectively. Accordingly, a reproduction apparatus that reproduces only a texture image and a depth image obtained by mapping a texture image and a depth image of an omnidirectional image to a predetermined face can reproduce the texture image and the depth image of the first layer.

In particular, the format of texture images and depth images of the first layer and the second layer generated by the content server 12 has compatibility with the format of a texture image and a depth image obtained by mapping a texture image and a depth image of an omnidirectional image. Further, the reproduction method by the home server 13 has compatibility with the reproduction method of a reproduction apparatus that reproduces only a texture image and a depth image obtained by mapping a texture image and a depth image of an omnidirectional image to a predetermined face.

It is to be noted that the home server 13 may generate a display image using only a texture image and a depth image of the first layer. In this case, for the first layer, an occlusion process is performed in place of deletion of connection information.

Further, while, in the foregoing description, the 3D model generation section 256 deletes connection information representative of connection to a sampling point corresponding to a discontinuity pixel detected by the discontinuity detection section 255, connection information may otherwise be deleted on the basis of triangle patch validity information (details are hereinafter described) transmitted from the content server 12. In this case, the discontinuity detection section 255 is not provided.

(Description of Triangle Patch Validity Information)

Figure 28:
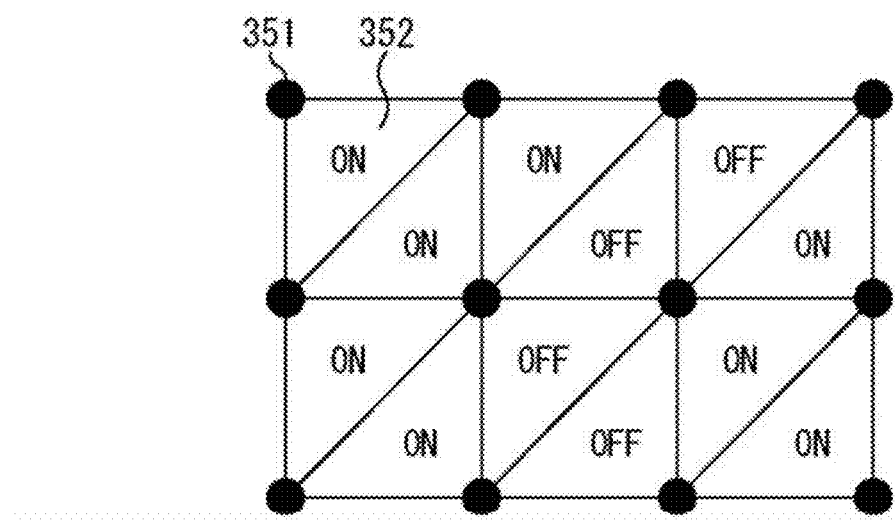
FIG. 28 is a view illustrating triangle patch validity information.

FIG. 28 is a view illustrating triangle patch validity information transmitted from the content server 12 in such a case as just described.

In the example of FIG. 28, the number of sampling points 351 of the first layer is 12. Accordingly, the number of triangle patches 352 each of which has vertices at three neighboring sampling points 351 is 12.

In this case, the content server 12 detects discontinuity pixels similarly to the discontinuity detection section 255. Then, the content server 12 sets a triangle patch 352 having a vertex at a sampling point corresponding to each discontinuity pixel as invalid (OFF) and sets each triangle patch 352 that does not include a sampling point corresponding to any discontinuity pixel as valid (ON).

The content server 12 (generation section) generates triangle patch validity information indicating that each triangle patch 352 is valid or invalid and places the triangle patch validity information into metadata.

The 3D model generation section 256 of the home server 13 deletes, on the basis of the triangle patch validity information, connection information representative of connection between sampling points that configure the vertices of each invalid triangle patch. As a result, any triangle patch whose triangle patch validity information indicates invalid is not drawn.

It is to be noted that triangle patches are generated by two for each sampling point except sampling points at the right end and the lower end. Further, the triangle patch validity information is information of 1 bit indicating that the triangle patch is valid or invalid. Accordingly, if the pixel number in the horizontal direction of a texture image of the first layer is represented by width and the pixel number in the vertical direction is represented by height, the bit number of triangle patch validity information of all triangle patches is (width−1)*(height−1)*2 bits.

The triangle patch validity information is transmitted in a lossless compression state or a non-compression state from the content server 12 to the home server 13. It is to be noted that the triangle patch validity information may be disposed as Cb and Cr values of a depth image.

2. Second Embodiment

Now, a second embodiment of an image displaying system is described.

It is to be noted that, in the description of the second embodiment, description of elements overlapping with those of the first embodiment described above is suitably omitted and only different elements are described.

In the first embodiment, the content server 12 generates first layer texture streams obtained by compression encoding texture images of a first layer and first layer depth streams obtained by compression encoding depth images of the first layer, and supplies them to the home server 13.

Further, the content server 12 generates second layer texture streams obtained by compression encoding texture images of a second layer and second layer depth streams obtained by compression encoding depth images of the second layer, and supplies them to the home server 13.

Accordingly, while the content server 12 transmits texture images and depth images for each layer, the second embodiment described below is directed to a configuration that makes it possible for the content server 12 to add and transmit a guide image that is used as a guide when an image from a predetermined viewpoint is displayed separately from texture images and depth images of the layers.

It is to be noted that, in any of the first and second embodiments, streams obtained by encoding texture images, depth images and a guide image can be transmitted, for example, by the MPEG-DASH (Moving Picture Experts Group Dynamic Adaptive Streaming over HTTP standard) method.

A guide image to be added in the second embodiment is described with reference to FIG. 29.

As described hereinabove with reference to FIGS. 10 and 11, a texture image of a predetermined face of the first layer includes a picked up image 121 of the foreground and a picked up image 122A in a region that is not hidden by the foreground from within the background with reference to the origin in a 3D model coordinate system.

The texture image of a face of the second layer corresponding to the first layer includes a picked up image 122C of a valid region picked up by the multi camera 11 from within an occlusion region 112B blocked by the foreground.

Here, in the case where the viewpoint of a viewer (viewing position and sight line direction) is changed to a viewpoint 601, a display image viewed from the viewpoint 601 includes an imaginary region within which a picked up image does not exist even if the picked up image 122C of the valid region of the second layer from within the occlusion region 112B is used.

Although an image for which inpainting has been performed, for example, by expanding pixel values in the valid region is disposed in the imaginary region, it is unknown whether or not the inpainting image is an actually correct image.

Figure 29:
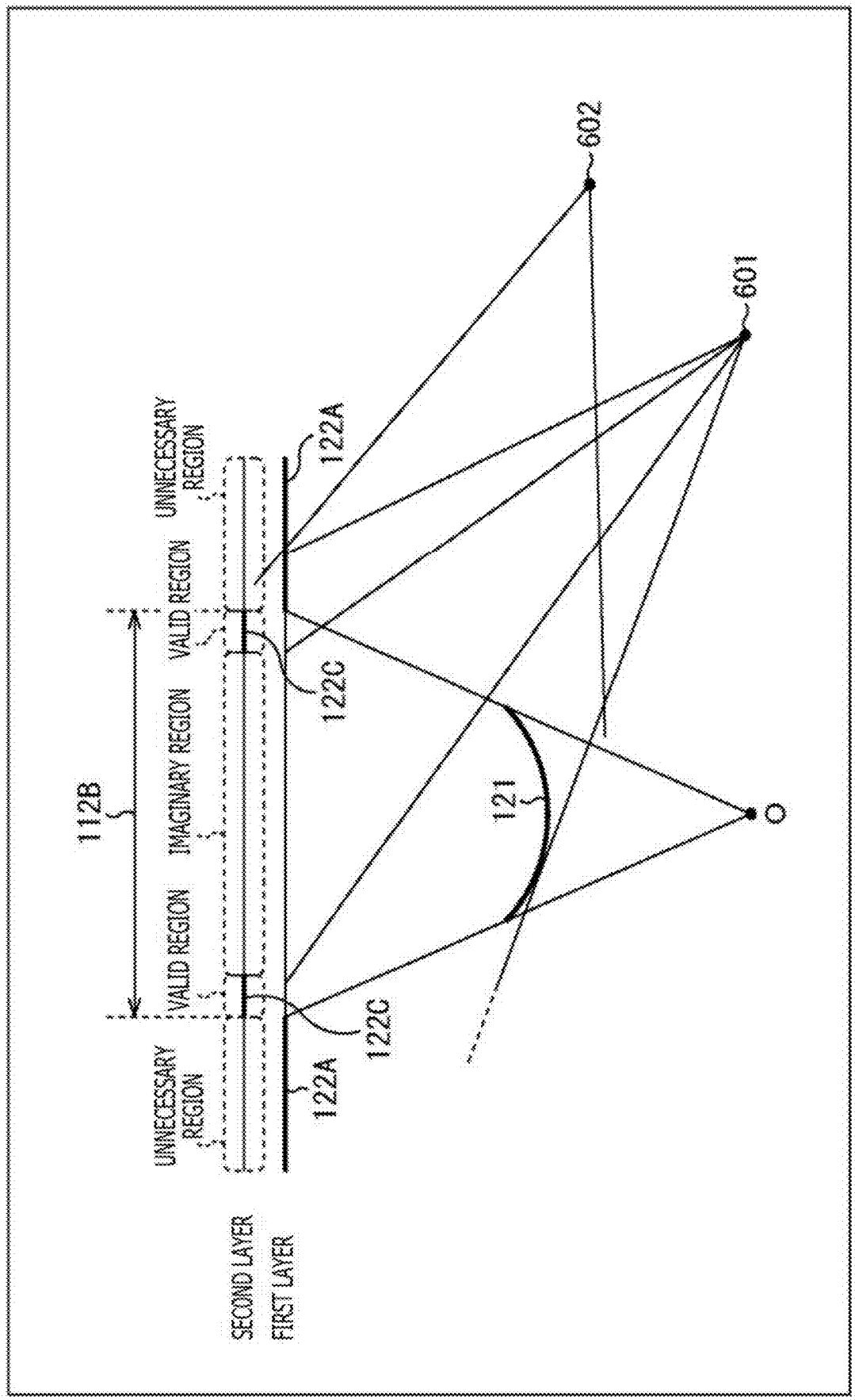
FIG. 29 is a view illustrating a guide image.

Therefore, for example, as depicted in FIG. 29, if an image obtained when an imaging object is imaged from a viewpoint 602 different from the viewpoint of the first layer and the second layer is acquired as a guide image and transmitted, then a correct image within the imaginary region (hereinafter referred to sometimes as correct answer image) can be had, and enhancement of the picture quality when a display image at an arbitrary viewpoint is generated on the reproduction side can be expected.

It is to be noted that, since the guide image is an image that is used to the last as a reference when a display image is to be generated, the guide image may not necessarily have picture quality same as that of the texture images of the first layer and the second layer. For example, the guide image may be an image of a resolution decreased from that of the texture image of the first layer or may be an image having a frame rate lower than that of the texture image of the first layer. Further, while the guide image may include a depth image (depth information) similarly as in the first layer and the second layer, the guide image may be a 2D image that does not include a depth image.

(Configuration Example of High Resolution Image Processing section)

FIG. 30 is a block diagram depicting a configuration example of the high resolution image processing section 34 in the second embodiment.

In FIG. 30, elements corresponding to those of the configuration of the high resolution image processing section 34 in the first embodiment depicted in FIG. 3 are denoted by like reference characters, and description of them is omitted suitably.

In comparison with the first embodiment depicted in FIG. 3, in the high resolution image processing section 34 of the second embodiment, a guide information generation section 611 and an encoder 612 are newly added and the setting section 56 and the metadata generation section 57 of FIG. 3 are replaced by a setting section 613 and a metadata generation section 614, respectively.

The guide information generation section 611 generates a guide image as guide information under the control of the setting section 56 and supplies the generated guide image to the encoder 612. In the case where the guide image is generated so as to have a resolution lower than that of the texture image of the first layer or have a lower frame rate, the guide information generation section 611 can also perform a resolution conversion process or a frame rate conversion process.

For example, a picked up image (texture image) itself imaged by each camera of the multi camera 11 can be used as the guide image. In particular, the texture images of the six faces generated by the first layer generation section 52 are not images themselves imaged by six cameras 11a to 11f depicted in FIG. 31A but are images at the same viewpoint setting the origin O of the 3D model coordinate system as a viewpoint. On the other hand, actual images obtained by actually imaging at the positions (viewpoints) by the cameras 11a to 11f can be used as a guide image.

Figure 31B:
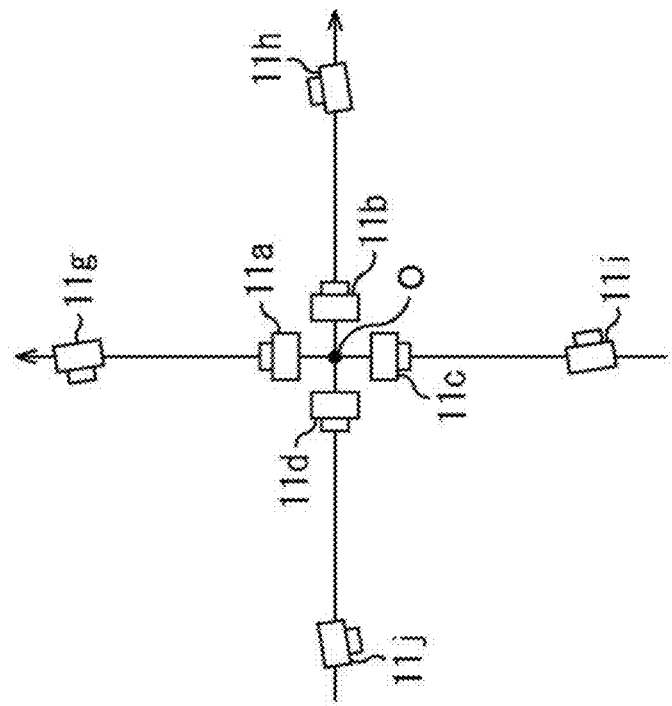
FIGS. 31A and 31B are views illustrating a camera that acquires a guide image.
Figure 31A:
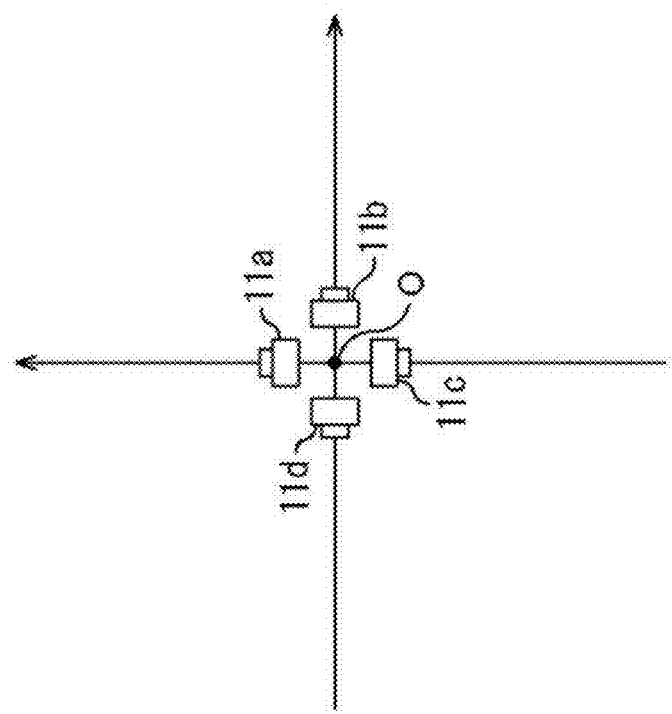

It is to be noted that, in FIG. 31A, only the four cameras 11a to 11d disposed on the same plane are depicted from among the six cameras 11a to 11f configuring the multi camera 11 and the cameras 11e and 11f disposed in the vertical direction with respect to the four cameras 11a to 11d are omitted.

As an alternative, the guide image may be an actual image obtained by actual imaging by cameras 11g to 11j installed at predetermined positions as guide cameras separately from the cameras 11a to 11f of the multi camera 11 as depicted in FIG. 31B. In the case where the guide cameras for a guide image are provided separately from the multi camera 11 in this manner, the resolution or the frame rate can be set in advance so as to be different between images picked up by the cameras of the multi camera 11 and images picked up by the guide cameras.

The guide information generation section 611 may generate not only a guide image having a YCbCr value in a two-dimensional direction but also a depth image in which a distance z in the depth direction is used as a pixel value and may supply the generated images as guide information to the encoder 612. In this case, similarly to the depth images of the first layer and so forth, depth images generated by the depth detection section 31 and the quantization section 32 and corresponding to the guide images are supplied to the guide information generation section 611.

It is to be noted that the second embodiment is described assuming that the guide images are actual images imaged by the cameras of the multi camera 11. Accordingly, the guide information generation section 611 generates six guide images corresponding to the six faces of the first layer.

The encoder 612 performs compression encoding for the six guide images supplied from the guide information generation section 611 to generate six guide streams. The encoder 612 supplies the six generated guide streams to the storage 58.

Further, in the case where also depth images corresponding to guide images are generated as the guide information, the encoder 612 performs compression encoding for the six depth images supplied from the guide information generation section 611 to generate six guide depth streams. The encoder 612 supplies the six generated guide depth streams to the storage 58.

The setting section 613 issues an instruction to generate guide information to the guide information generation section 611. Further, the setting section 613 supplies information relating to the guide images (hereinafter referred to as guide image information) to the metadata generation section 614 in addition to viewpoint position information and face information of the first layer and the second layer. In regard to other matters, the setting section 613 performs processes similar to those of the setting section 56 of the first embodiment.

The metadata generation section 614 generates and supplies metadata to the storage 58 similarly as in the first embodiment. However, a table as the metadata generated in the second embodiment is a table in which the guide image information is added to the viewpoint position information and the face information of the first embodiment.

Where the texture images, depth images and guide images are transmitted, for example, by the MPEG-DASH method, the metadata can be transmitted as an MPD (Media Presentation Description) file that is a management file.

As described above, in the high resolution image processing section 34, the first layer generation section 52 generates texture images and depth images of six faces of the first layer; the second layer generation section 54 generates texture images and depth images of faces of the second layer corresponding to the faces of the first layer; and the guide information generation section 611 generates guide images to be referred to upon generation of a display image using the texture images and the depth images of the first layer and the second layer. Accordingly, the high resolution image processing section 34 functions as an image generation section configured to generate texture images and depth images of the first layer and the second layer and guide images.

FIG. 32 is a view depicting a configuration example of a table of viewpoint position information and face information of the first layer from within metadata generated by the metadata generation section 614.

In other words, the table of FIG. 32 corresponds to the table relating to the first layer depicted in FIG. 9, and the difference between the table of FIG. 9 and the table of FIG. 32 corresponds to guide image information.

In the table of FIG. 32, rows of common portions "guid1" to "guid6" of file names of files into which guide streams and guide depth streams of six guide images are to be stored are added.

Further, as items of the table, "flag" indicative of whether or not the information is guide information, "guide ID" for identifying the guide information, "camera parameter" that is a camera parameter of a camera by which the guide image is picked up and "reference guide ID" indicative of guide information to be referred to are added.

Since information of the rows having common portions "posZ," "negZ," "posX," "negX," "posY" and "negY" of file names is information relating to the first layer, "flag" indicative of whether or not the information is guide information in all rows indicates "false." Further, reference guide IDs "1," "2," "3," "4," "5" and "6" are registered correspondingly to the common portions "posZ," "negZ," "posX," "negX," "posY" and "negY" of the file names, respectively.

Further, a transverse angle of view "100 degrees," a vertical angle of view "100 degrees," a transverse pixel number "1024" and a vertical pixel number "1024" of the guide images are registered correspondingly to the common portions "guid1" to "guid6" of the file names.

Since information of the rows having the common portions "guid1" to "guid6" of the file names is guide information, "true" indicating that the "flag" is guide information is registered, and "1," "2," "3," "4," "5" and "6" are allocated as "guide ID."

Further, correspondingly to the common portions "guid1" to "guid6" of the file names, an internal parameter A and an external parameter Rt that represents rotation and translation as "camera parameter" of the cameras by which the guide images are imaged are registered. The camera parameters ARt of the rows have values different from each other.

It is to be noted that, in the case where an azimuth angle, an elevation angle and a rotation angle are registered in the common portions "guid1" to "guid6" of the file names, the parameter R representing rotation from within the external parameter Rt can be omitted.

In the case where viewpoint coordinates are registered in the common portions "guid1" to "guid6" of the file names, the parameter t representing translation from within the external parameter Rt can be omitted.

In the case where the angles of view (transverse angle of view and vertical angle of view) and pixel numbers (transverse pixel number and vertical pixel number) are registered in the common portions "guid1" to "guid6" of the file names, the internal parameter A can be omitted.

A relationship of the angle of view and the pixel number to the internal parameter A is described with reference to FIG. 33.

Figure 33:
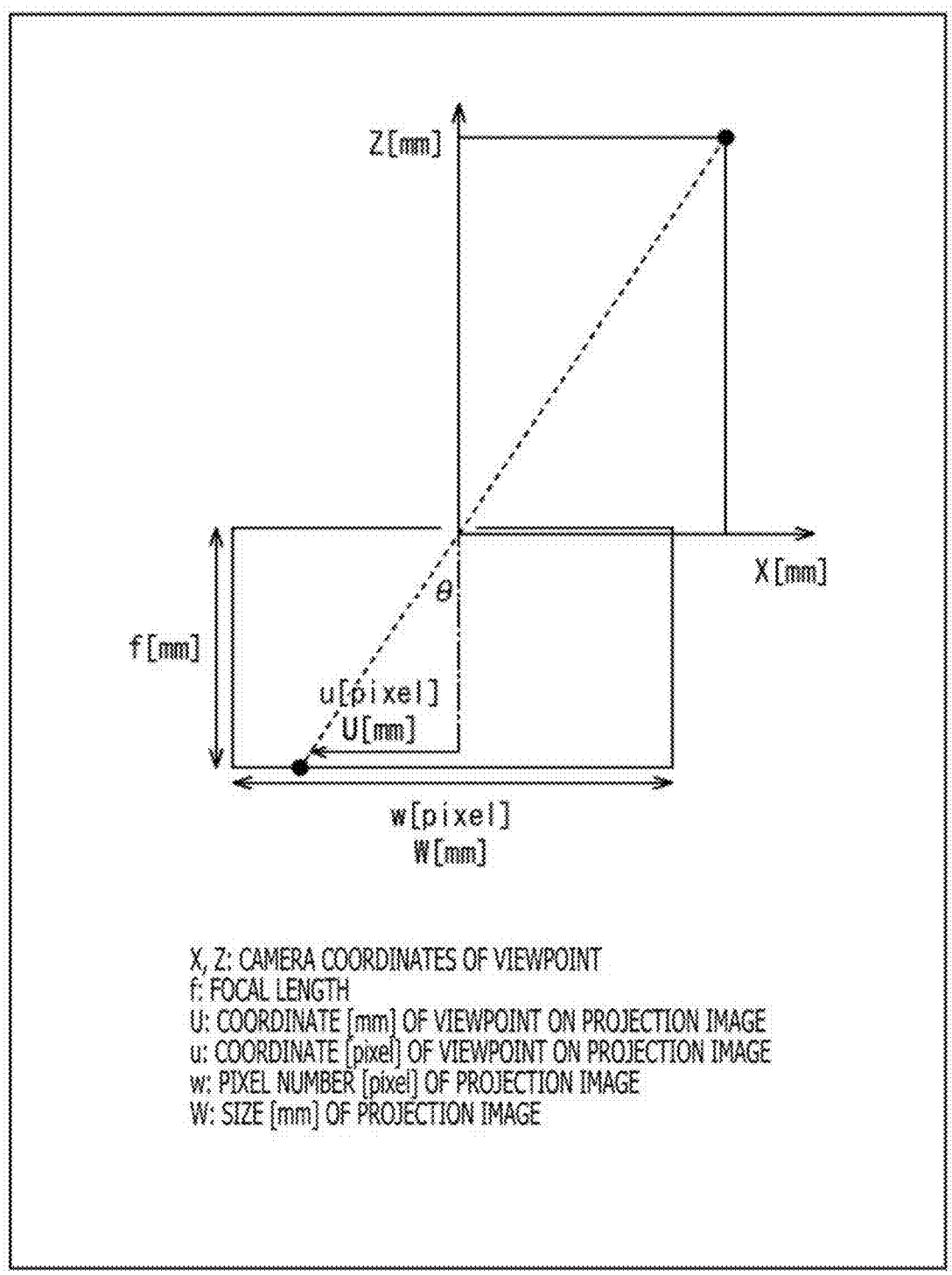
FIG. 33 is a view illustrating a relationship of an angle of view and a pixel number to an internal parameter.

FIG. 33 depicts a common pinhole camera model of the perspective projection conversion type. It is to be noted that, in FIG. 33, the XZ plane is depicted with the Y coordinate omitted.

In the pinhole camera model, a predetermined three-dimensional viewpoint (X, Z) is perspectively projected to a position spaced by U [mm] from the center of a projection image of a size W [mm] spaced by a focal length f [mm]. The position spaced by U [mm] of the projection image of the size W [mm] corresponds to a position spaced, in representation by pixels, by u [pixel] from the center of the projection image of a pixel number w [pixel]. The pixel number w [pixel] of the projection image corresponds to the pixel number of the guide image, and the angle θ represented by tan θ=W/(2f) corresponds to ½ the transverse angle of view of the guide image.

In such a pinhole camera model as just described, the relationship between a predetermined three-dimensional viewpoint (X, Z) and a corresponding point (U, f) on the projection image is represented by the following expression (2).

[Math. 2]

$$U = f \frac{X}{Z} \quad (2)$$

The coordinate u of the viewpoint on the projection image in a pixel unit is represented by the following expression (3) from a coordinate U at the viewpoint in a millimeter unit on the projection image and the ratio between the size W [mm] and the pixel number w [pixel] of the projection image.

[Math. 3]

$$u = \frac{w}{W} U = w \frac{f}{W} \frac{X}{Z} \quad (3)$$

Substituting tan θ=W/(2f) into the expression (3), the following expression (4) is obtained.

[Math. 4]

$$u = \frac{w}{2\tan\theta} \frac{X}{Z} = f_x \frac{X}{Z} \quad (4)$$

After all, since the internal parameter A can be represented by the following expression (5), if the angle of view and the pixel number of the guide image are turned out, then the internal parameter A can be determined.

[Math. 5]

$$A = \begin{bmatrix} \frac{w}{2\tan\theta} & 0 & w/2 \\ 0 & \frac{h}{2\tan\theta} & h/2 \\ 0 & 0 & 1 \end{bmatrix} \quad (5)$$

$$f_x = \frac{w}{2\tan\theta}, f_y = \frac{h}{2\tan\theta}$$

(Description of Stream Generation Process)

Now, a stream generation process by the content server 12 in the second embodiment is described with reference to a flow chart of FIG. 34.

Figure 34:
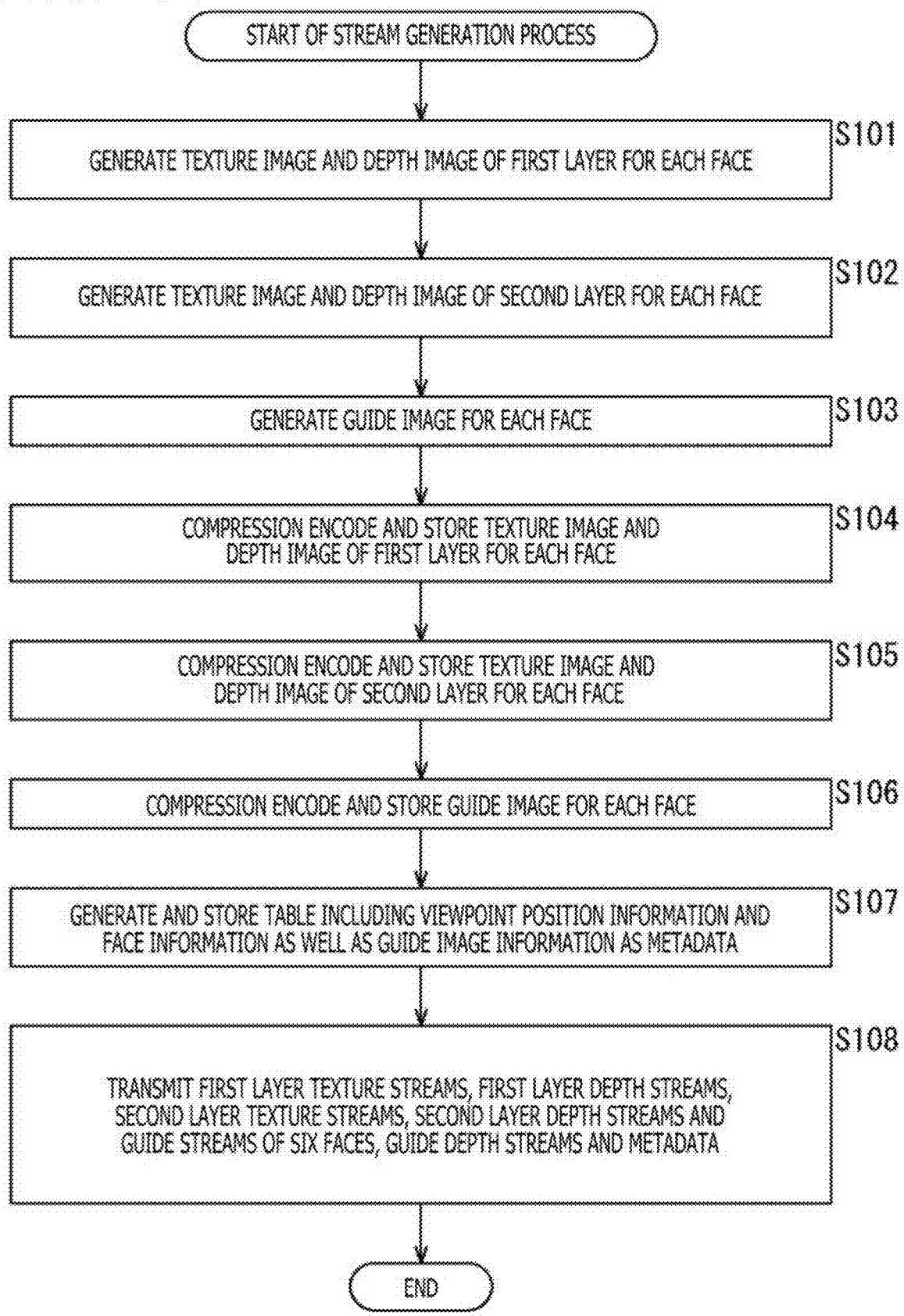
FIG. 34 is a flow chart illustrating a stream generation process of the second embodiment.

While the stream generation process of FIG. 34 corresponds to the stream generation process depicted in FIG. 18 in the first embodiment, the processes at steps S10 to S16 common to those in the first embodiment are omitted. In other words, the stream generation process of FIG. 34 corresponds to the processes at and after step S17 of the stream generation process of FIG. 18.

First, at step S101, the first layer generation section 52 generates texture images and depth images of the first layer of the six faces. This process is similar to the process at step S17 of FIG. 18.

At step S102, the second layer generation section 54 generates texture images and depth images of the second layer of the six faces. This process is similar to the process at step S18 of FIG. 18.

At step S103, the guide information generation section 611 generates guide images of the faces corresponding to the six faces of the first layer. Further, the guide information generation section 611 generates depth images corresponding to the guide images of the faces corresponding to the six faces of the first layer. In the case where the guide images do not have depth information, the process for generating depth images corresponding to the guide images is omitted.

It is to be noted that the guide image may not necessarily be provided correspondingly to all of the six faces of the first layer, and may be provided only for part of the six faces of the first layer.

At step S104, the encoder 53 performs compression encoding for the texture images and the depth images of the first layer of the faces supplied from the first layer generation section 52 for each face and for each kind of image, and supplies and stores resulting images to and into the storage 58. This process is similar to the process at step S19 of FIG. 18, and the first layer texture streams and the first layer depth streams of the six faces are stored into the storage 58 by this process.

At step S105, the encoder 55 performs compression encoding for the texture images and the depth images of the second layer of the faces supplied from the second layer generation section 54 for each face and for each kind of the image, and supplies and stores resulting images to and into the storage 58. This process is similar to the process at step S20 of FIG. 18, and the second layer texture streams and the second layer depth streams of the six faces are stored into the storage 58 by this process.

At step S106, the encoder 612 performs compression encoding for the guide images of the faces supplied from the guide information generation section 611, and supplies and stores resulting images to and into the storage 58. The guide streams of the six faces are stored into the storage 58 by this process.

Further, at step S106, the encoder 612 performs compression encoding also for the depth images corresponding to the guide images of the faces, and supplies and stores resulting images to and into the storage 58. The guide depth streams of the six faces are stored into the storage 58 by this process. In the case where the guide images do not have depth information, the process for generating the guide depth streams is omitted.

At step S107, the metadata generation section 614 generates a table including viewpoint position information and face information of the first layer and the second layer and guide image information as metadata, and supplies and stores the generated metadata to and into the storage 58. This process corresponds to the process at step S21 of FIG. 18.

At step S108, the transmission section 60 reads out the first layer texture streams, first layer depth streams, second layer texture streams, second layer depth streams, guide streams and guide depth streams of the six faces that are not reconstructed and the metadata from the storage 58 and transmits the read out data to the home server 13. In the case where the guide images do not have depth information, the process for transmitting the guide depth streams is omitted. This process corresponds to the process at step S26 of FIG. 18.

As described above, the content server 12 of the second embodiment adds guide images to texture images and depth images of the first layer and the second layer and transmits a result of the addition to the home server 13. Consequently, when a display image is to be generated, for example, a guide image can be referred to as correct answer image of the imaginary region and the picture quality of the display image can be enhanced.

(Home Server)

Now, a configuration of the image displaying system on the home server 13 side in the second embodiment is described.

Figure 35:
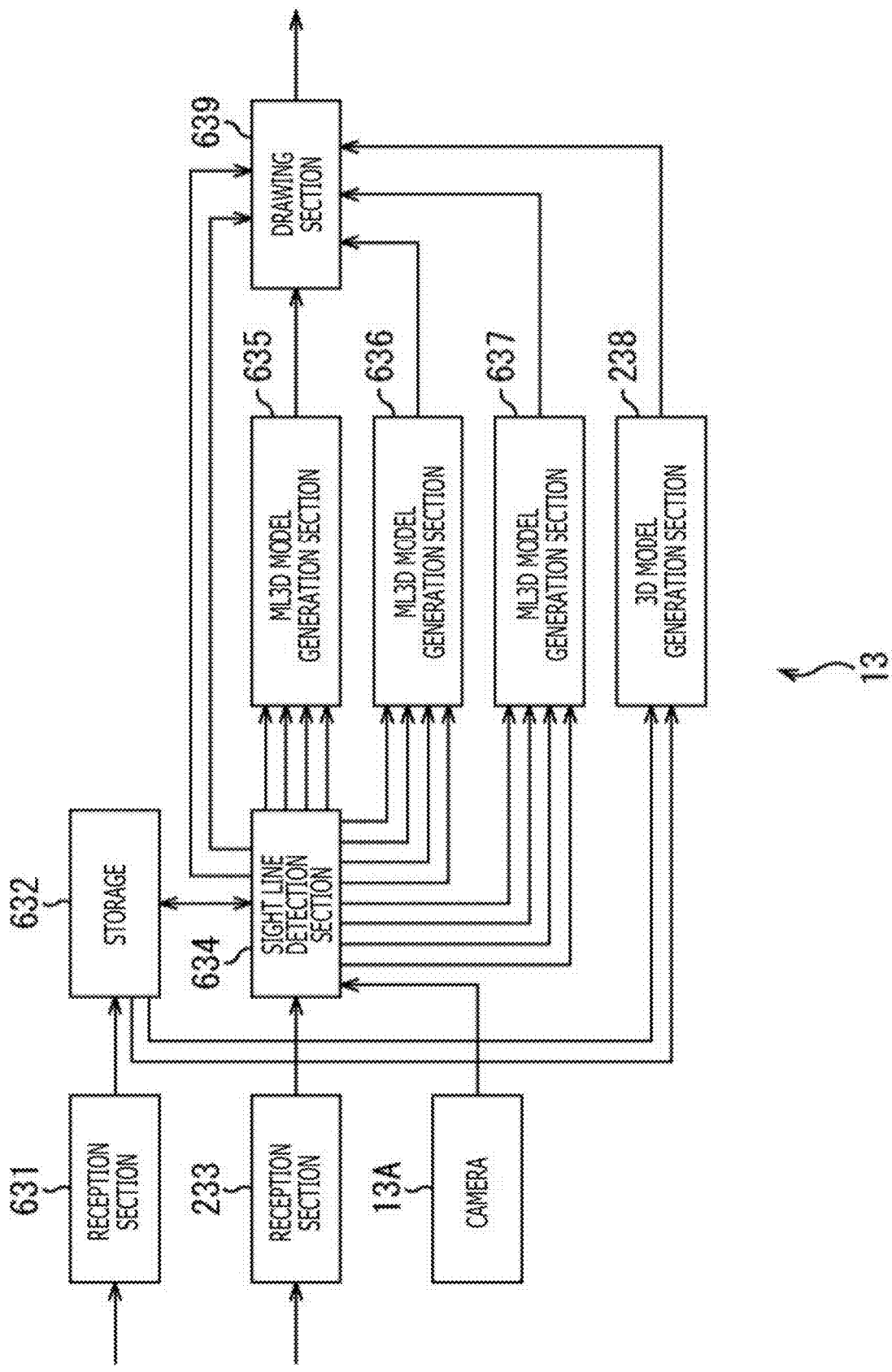
FIG. 35 is a block diagram depicting a configuration example of a home server of the second embodiment.

FIG. 35 is a block diagram depicting a configuration example of the home server 13 in the second embodiment.

In FIG. 35, like elements to those of the home server 13 in the first embodiment depicted in FIG. 19 are denoted by like reference characters, and description of them is omitted suitably.

In the second embodiment, the reception section 231, storage 232, sight line detection section 234, ML3D model generation sections 235 to 237 and drawing section 239 of FIG. 19 are replaced into a reception section 631, a storage 632, a sight line detection section 634, ML3D model generation sections 635 to 637 and a drawing section 639.

The reception section 631 receives first layer texture streams, first layer depth streams, second layer texture streams, second layer depth streams, guide streams and guide depth streams of the six faces and metadata transmitted from the content server 12 and supplies them to the storage 632.

The storage 632 stores first layer texture streams, first layer depth streams, second layer texture stream, second layer depth streams, guide streams and guide depth streams of the six faces and metadata supplied from the reception section 631.

It is to be noted that, in the case where the guide images do not have depth information, reception and storage of the guide depth streams of the six faces are omitted.

The sight line detection section 634 performs, for texture images and depth images of the first layer and the second layer, a process similar to that of the sight line detection section 234 of the first embodiment. Further, in the sight line detection section 634, a process for guide images and depth images corresponding to the guide images is added.

In particular, the sight line detection section 634 reads out guide streams corresponding to first layer texture streams supplied to the ML3D model generation sections 635 to 637 from the storage 632, and supplies the read out streams to the ML3D model generation sections 635 to 637. The sight line detection section 634 supplies, in the case where also depth images corresponding to the guide images are transmitted thereto, also the guide depth streams to the ML3D model generation sections 635 to 637.

The ML3D model generation sections 635 to 637 generate three-dimensional data at sampling points corresponding to pixels of the texture images of the first layer using the first layer texture streams and the first layer depth streams supplied from the sight line detection section 634. Further, the ML3D model generation sections 635 to 637 generate three-dimensional data at sampling points corresponding to pixels of the texture images of the second layer using the second layer texture streams and the second layer depth streams supplied from the sight line detection section 634. The ML3D model generation sections 635 to 637 supply the three-dimensional data of the first layer and the second layer to the drawing section 639. The processes are similar to those of the first embodiment.

Further, the ML3D model generation sections 635 to 637 each generate three-dimensional data of sampling points corresponding to the pixels of the guide images using the guide streams and the guide depth streams supplied from the sight line detection section 634. In the case where the guide images do not have depth information, two-dimensional data of sampling points corresponding to the pixels of the guide images is generated.

The drawing section 639 performs, on the basis of three-dimensional data of a low resolution texture image supplied from the 3D model generation section 238, triangle patch drawing (point group drawing) of the low resolution texture image in the 3D model coordinate system. Thereafter, the drawing section 639 performs triangle patch drawing of the texture images of the first layer and the second layer in the 3D model coordinate system on the basis of three-dimensional data of the texture images of the first layer and the second layer supplied from the ML3D model generation sections 635 to 637 and three-dimensional data (or two-dimensional data) of the guide images and viewpoint position information and face information supplied from the sight line detection section 234.

The drawing section 639 performs perspective projection (mapping) of triangle patches generated in the 3D model coordinate system to a viewing range setting, as a viewpoint, a viewing position supplied from the sight line detection section 634 to generate a display image. The drawing section 639 transmits the display image to the conversion apparatus 14 of FIG. 1.

(Configuration Example of ML3D Model Generation Section)

Figure 36:
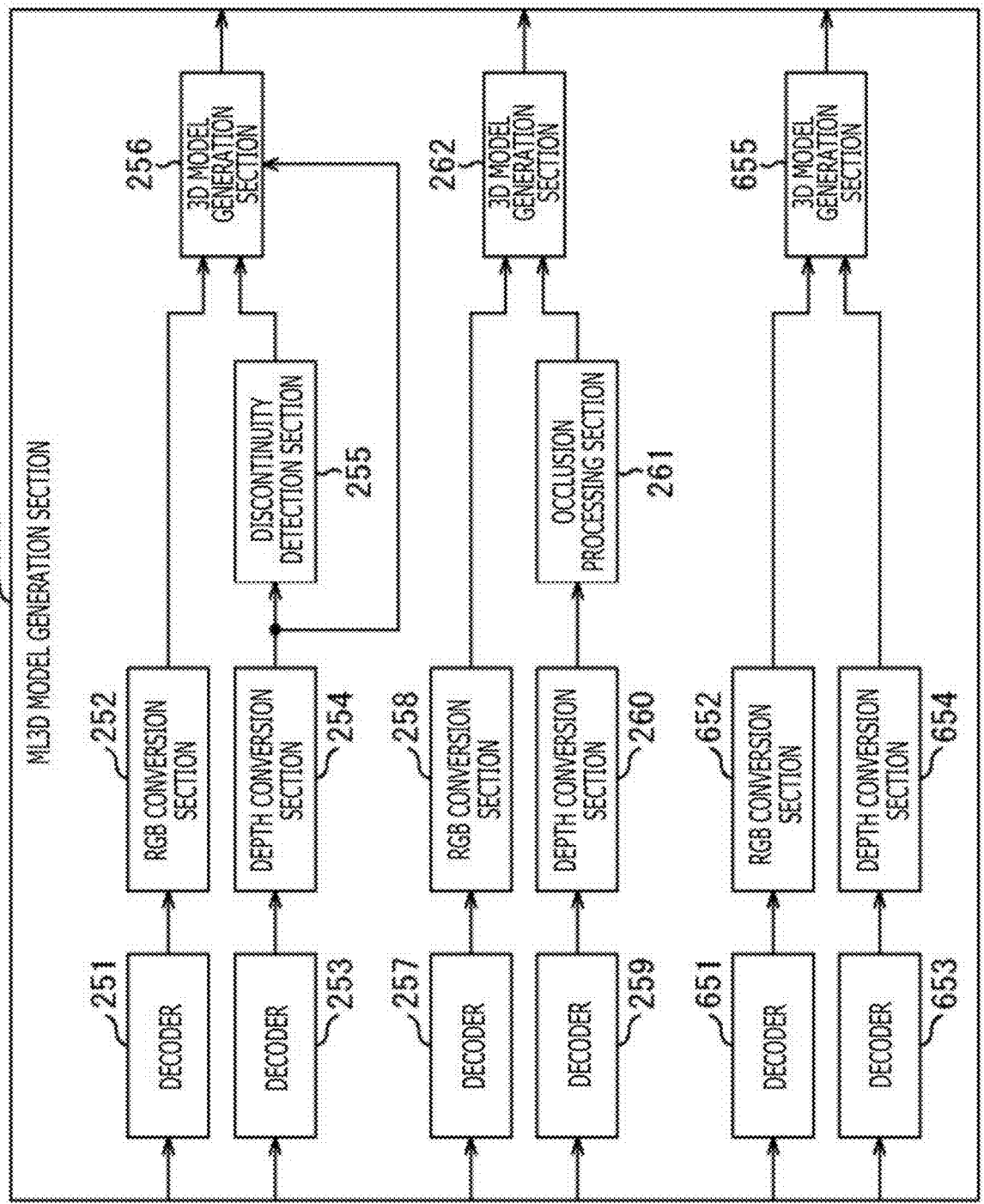
FIG. 36 is a block diagram depicting a configuration example of an ML3D model generation section of FIG. 35.

FIG. 36 is a block diagram depicting a configuration example of the ML3D model generation section 635 of FIG. 35.

In FIG. 36, like elements to those of the ML3D model generation section 235 in the first embodiment depicted in FIG. 20 are denoted by like reference characters, and description of them is omitted suitably.

In the ML3D model generation section 635 depicted in FIG. 36, in comparison with the ML3D model generation section 235 in the first embodiment depicted in FIG. 20, a decoder 651, an RGB conversion section 652, a decoder 653, a depth conversion section 654 and a 3D model generation section 655 for processing guide images are newly added.

The decoder 651 decodes a guide stream supplied from the sight line detection section 634 of FIG. 35 to generate a guide image. The decoder 651 supplies the guide image to the RGB conversion section 652.

The RGB conversion section 652 converts YCbCr values as pixel values of pixels of the guide image into RGB values and supplies the RGB values to the 3D model generation section 655.

The decoder 653 decodes a guide depth stream supplied from the sight line detection section 634 to generate a depth image corresponding to a guide image. The decoder 653 supplies the depth image corresponding to the guide image to the depth conversion section 654.

The depth conversion section 654 performs 8-bit dequantization for pixel values of pixels of the depth image corresponding to the guide image supplied from the decoder 653 and obtains reciprocals 1/r. Then, the depth conversion section 654 calculates, on the basis of the reciprocals 1/r of the pixels, three-dimensional positions (u, v, z) in a texture coordinate system of the pixels and supplies them to the 3D model generation section 655.

The 3D model generation section 655 generates, on the basis of three-dimensional positions (u, v, z) of pixels of the guide image supplied from the depth conversion section 654, for each pixel, connection information representative of connection of a sampling point corresponding to the pixel to sampling points corresponding to two pixels neighboring with the sampling point. In particular, the 3D model generation section 655 generates, for each pixel, connection information representative of connection between a sampling point corresponding to the pixel and pixels corresponding to two points configuring vertices of a triangle patch.

The 3D model generation section 655 generates connection information representative of connection of pixels of a guide image and three-dimensional positions (u, v, z) and RGB values of the pixels of the guide image as three-dimensional data of a guide image. The 3D model generation section 655 supplies the three-dimensional data of the guide image to the drawing section 639 depicted in FIG. 35.

It is to be noted that, though not depicted, the ML3D model generation section 636 and the ML3D model generation section 637 are configured similarly to the ML3D model generation section 635.

(Utilization Method of Guide Image)

A utilization method of a guide image is described with reference to FIG. 37.

To the drawing section 639, three-dimensional data of a texture image of the second layer and three-dimensional data of a guide image are supplied, for example, from the ML3D model generation section 635.

Figure 37:
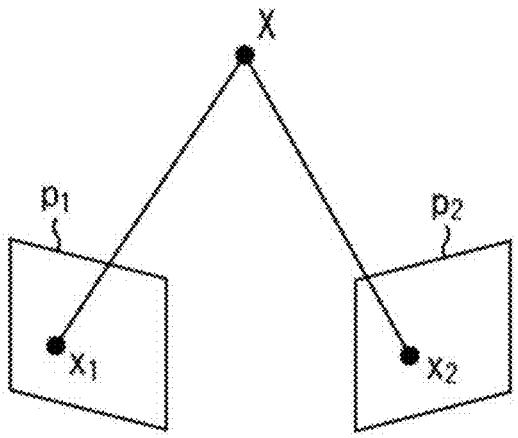
FIG. 37 is a view illustrating a utilization method of a guide image.

It is assumed that, as depicted in FIG. 37, the two-dimensional position on a texture image of the second layer corresponding to a sampling point X on a three-dimensional model coordinate system is $x_1$ and the two-dimensional position on a guide image corresponding to the sampling point X is $x_2$. At this time, the two dimensional position $x_1$ on the texture image of the second layer can be represented as $x_1=P_1X$ using a camera parameter $P_1$ of the texture image of the second layer. Similarly, the two dimensional position $x_2$ on the guide image can be represented as $x_2=P_2X$ using a camera parameter $P_2$ of the guide image.

Since the two-dimensional position $x_1$ on the texture image of the second layer is known, the position of the sampling point X on the 3D model coordinate system can be recognized from $x_1=P_1X$. If the position of the sampling point X can be recognized, then the two-dimensional position $x_2$ on the guide image can be recognized from $x_2=P_2X$.

Similarly, since the two-dimensional position $x_2$ on the guide image is known, the position of the sampling point X on the 3D model coordinate system can be recognized from $x_2=P_2X$. If the position of the sampling point X can be recognized, then the two-dimensional position $x_1$ on the texture image of the second layer can be recognized from $x_1=P_1X$.

Accordingly, if a guide image and a depth image corresponding to the guide image are transmitted as guide information, then the two-dimensional position $x_1$ on the texture image of the second layer and the two-dimensional position $x_2$ on the guide image can be determined bidirectionally.

On the other hand, even in the case where guide information includes only a guide image having no depth image, the two-dimensional position $x_2$ on the guide image can be recognized from the two-dimensional position $x_1$ on the texture image of the second layer.

Accordingly, by addition of guide information, pixel values of a guide image as a correct answer image corresponding to the two-dimensional position $x_1$ on the texture image of the second layer can be known, and therefore, the picture quality can be improved.

The drawing section 639 compares pixel values of a display image generated using texture images and depth images of the second layer (three-dimensional data of texture images of the second layer) and corresponding pixel values of a guide image (three-dimensional data of the guide image) and executes a process for changing the pixel values in response to a result of the comparison. The drawing section 639 functions as a guide image utilization section configured to improve the picture quality of a display image utilizing a guide image as a correct answer image.

(Description of First Reproduction Process)

Now, a first reproduction process by the home server 13 according to the second embodiment is described with reference to a flow chart of FIG. 38.

Figure 38:
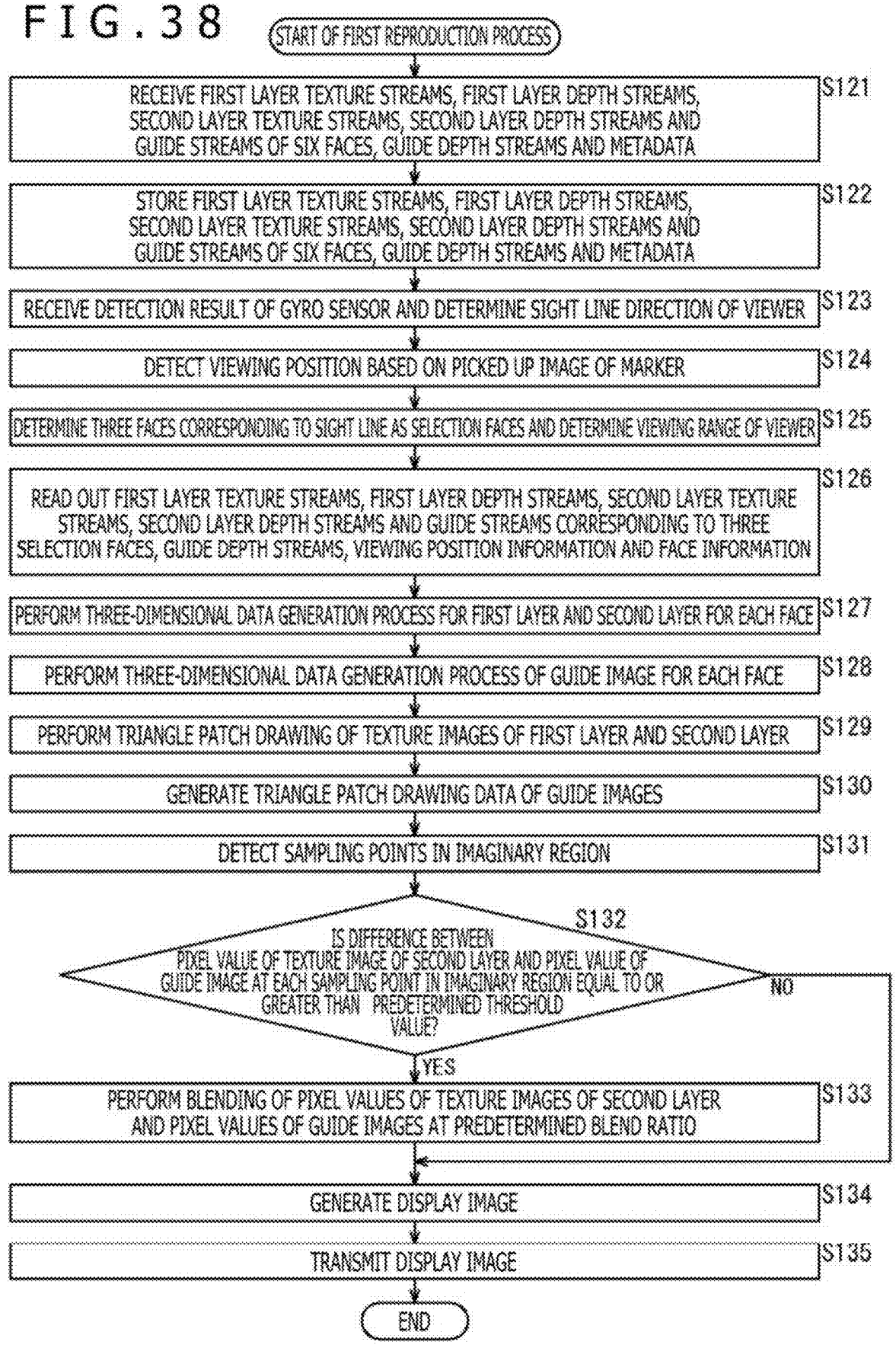
FIG. 38 is a flow chart illustrating a first reproduction process of the second embodiment.

While the first reproduction process of FIG. 38 corresponds to the reproduction process depicted in FIG. 26 in the first embodiment, since processes relating to a low resolution texture stream and a low resolution depth stream are similar to those in the first embodiment, description of them is omitted.

First at step S121, the reception section 631 receives first layer texture streams, first layer depth streams, second layer texture streams, second layer depth streams, guide streams and guide depth streams of the six faces, which are not in a reconstructed form, and metadata from the storage 58 and supplies them to the storage 632. In the case where the guide images do not have depth information, the process for receiving the guide depth streams is omitted. This process corresponds to the process at step S41 of FIG. 26.

At step S122, the storage 632 stores the first layer texture streams, first layer depth streams, second layer texture streams, second layer depth streams, guide streams and guide depth streams of the six faces and the metadata. In the case where the guide images do not have depth information, the process for storing the guide depth streams is omitted. This process corresponds to the process at step S42 of FIG. 26.

At step S123, the reception section 233 receives a detection result of the gyro sensor 15B of FIG. 1 from the head mounted display 15 and supplies the detection result to the sight line detection section 634. The sight line detection section 634 determines a sight line direction of a viewer in a 3D model coordinate system on the basis of the detection result of the gyro sensor 15B. This process corresponds to the processes at steps S43 and S44 of FIG. 26.

At step S124, the camera 13A images the marker 15A applied to the head mounted display 15 and supplies a picked up image obtained as a result of the imaging to the sight line detection section 634. The sight line detection section 634 detects a viewing position in the 3D model coordinate system on the basis of the picked up image of the marker 15A supplied from the camera 13A and supplies the viewing position to the drawing section 639. This process corresponds to the processes at steps S45 and S46 of FIG. 26.

At step S125, the sight line detection section 634 determines three faces corresponding to a sight line vector closest to the sight line from among the six faces as selection faces, determines a viewing range of the viewer in the 3D model coordinate system and supplies the viewing range to the drawing section 639. This process corresponds to the processes at steps S47 and S48 of FIG. 26.

At step S126, the sight line detection section 634 reads out the first layer texture streams, first layer depth streams, second layer texture streams, second layer depth streams, guide streams and guide depth streams corresponding to the three selection faces from the storage 632, and supplies them to the ML3D model generation sections 235 to 237 for each face. Further, the sight line detection section 634 reads out the viewpoint position information and the face information corresponding to the three selection faces from the storage 632 and supplies them to the drawing section 639. In the case where the guide images do not have depth information, the process for reading out the guide depth streams and supplying them to the ML3D model generation sections 235 to 237 for each face is omitted. This process corresponds to the process at step S49 of FIG. 26.

At step S127, the ML3D model generation sections 635 to 637 perform a three-dimensional data generation process for generating three-dimensional data of sampling points of the first layer and the second layer for each face.

At step S128, the ML3D model generation sections 635 to 637 perform a three-dimensional data generation process for generating three-dimensional data of the sampling points of the guide images for each face. This process in the case where the guide images do not have depth information is a process for generating two-dimensional data of the sampling points of the guide image.

At step S129, the drawing section 639 performs, on the basis of the three-dimensional data of the first layer and the second layer supplied from the ML3D model generation sections 635 to 637 and the viewpoint position information and the face information supplied from the sight line detection section 634, triangle patch drawing of texture images of the first layer and the second layer in the 3D model coordinate system. This triangle patch drawing is executed after triangle patch drawing of low resolution texture images similarly as in the first embodiment.

At step S130, the drawing section 639 generates, on the basis of the three-dimensional data of the guide images supplied from the ML3D model generation sections 635 to 637 and the viewpoint position information and the face information supplied from the sight line detection section 634, triangle patch drawing data for guide images in the 3D model coordinate system. In the case where the guide images do not have depth information, the triangle patch drawing data of the guide images are data having no information in the depth direction.

At step S131, the drawing section 639 detects sampling points in an imaginary region from among sampling points that are vertices of the triangle patch drawing of the generated texture images of the second layer.

Although each of the texture images of the faces of the second layer is divided into three regions of a valid region, an imaginary region and an unnecessary region as described hereinabove with reference to FIG. 11, the drawing section 639 can identify an imaginary region of the second layer by checking predetermined information.

For example, it is settled in advance that, when a texture image of the second layer is to be compression encoded, for pixels in the imaginary region, a quantization parameter Qp is set within a predetermined range. In such a case as just described, the drawing section 639 can identify the imaginary region of the second layer by checking the quantization parameter Qp of the pixels from the decoder 251.

Further, for example, in the case where the depth images of the second layer are transmitted in the 4:2:0 YUV format, the depth information can be transmitted using only the Y component. Therefore, it is possible to place and transmit a bit signal representative of whether or not the pixel is in an imaginary region into and together with the remaining CbCr component. In this case, the drawing section 639 can identify the imaginary region of the second layer by acquiring the bit signal indicative of whether or not each pixel is in an imaginary region from the decoder 253.

As an alternative, an imaginary region may be detected using a discontinuity pixel detected by the occlusion processing section 261.

Further, at step S131, the drawing section 639 detects sampling points of the guide images corresponding to the sampling points of the detected imaginary region from the triangle patch drawing data of the guide images. The corresponding relationship between pixels of the texture images of the second layer and pixels of the guide images can be found bidirectionally in the case where the guide images have depth information as described above with reference to FIG. 37, but can be found, in the case where the guide images have no depth information, using a pixel of the texture image of the second layer as a start point.

At step S132, the drawing section 639 decides, in regard to each sampling point of the imaginary region, whether or not the difference between the pixel value of a texture image of the second layer and the pixel value of a guide image is equal to or greater than a predetermined threshold value.

In the case where it is decided at step S132 that, in regard to at least one sampling point of the imaginary region, the difference between the pixel value of a texture image of the second layer and the pixel value of a guide image is equal to or greater than the predetermined threshold value, the processing advances to step S133, at which the drawing section 639 performs, for the sampling point of a triangle patch of a texture image of the second layer decided that the difference between the pixel values is equal to or greater than the predetermined threshold value, blending of the pixel value (RGB value) of the texture image of the second layer and the pixel value (RGB value) of the guide image at a predetermined blend ratio. In the case where the blend ratio of the guide image is 100%, the pixel value of the texture image of the second layer is overwritten with the pixel value of the guide image.

On the other hand, in the case where it is decided at step S132 that, in regard to all sampling points of the imaginary region, the difference between the pixel value of a texture image of the second layer and the pixel value of a guide image is equal to or greater than the predetermined threshold value, the process at step S133 is skipped.

At step S134, the drawing section 639 perspectively projects the triangle patches drawn in the 3D model coordinate system to a viewing range using the viewing position supplied from the sight line detection section 634 as a viewpoint to generate a display image. At step S135, the drawing section 639 transmits the display image to the conversion apparatus 14 of FIG. 1.

According to the first reproduction process described above, the drawing section 639 can improve the picture quality of the display image since it can compare pixel values in an imaginary region of texture images of the second layer with pixel values of guide images as correct answer images and rewrite the pixel values in the imaginary region in response to a result of the comparison.

(Description of Second Reproduction Process)

Now, a second reproduction process by the home server 13 in the second embodiment is described with reference to a flow chart of FIG. 39.

Figure 39:
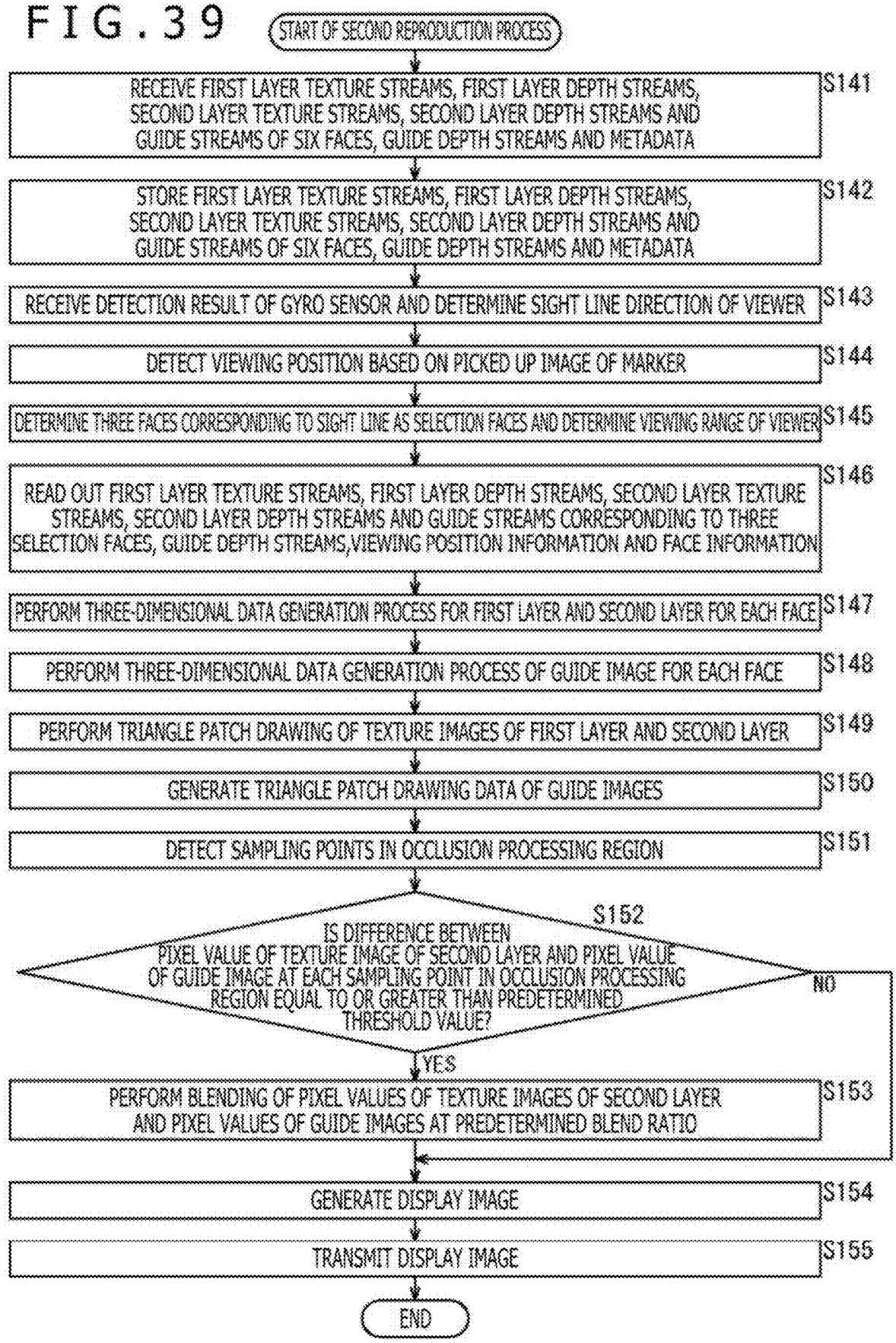
FIG. 39 is a flow chart illustrating a second reproduction process of the second embodiment.

Since processes at steps S141 to S150 of FIG. 39 are similar to the processes at steps S121 to S130 of FIG. 38, respectively, description of them is omitted.

At step S151, the drawing section 639 detects sampling points in an occlusion processing region that is a region in which an occlusion process has been performed from among sampling points that are vertices of triangle patch drawing of generated texture images of the second layer.

Since the occlusion process is executed by the occlusion processing section 261, the drawing section 639 acquires information that specifies the sampling points in the occlusion processing region from the occlusion processing section 261 to detect the sampling points in the occlusion processing region.

Further, at step S151, the drawing section 639 detects sampling points of the guide images corresponding to the detected sampling points in the occlusion processing region from the triangle patch drawing data of the guide images. The corresponding relationship between pixels of the texture images of the second layer and pixels of the guide images can be found bidirectionally in the case where the guide images have depth information as described above with reference to FIG. 37, but can be found, in the case where the guide images have no depth information, using a pixel of a texture image of the second layer as a start point.

At step S152, the drawing section 639 decides, in regard to each of the sampling points in the occlusion processing region, whether or not the difference between the pixel value of the texture image of the second layer and the pixel value of the guide image is equal to or greater than a predetermined threshold value.

In the case where it is decided at step S152 that, in regard to at least one of the sampling points in the occlusion processing region, the difference between the pixel value of the texture image of the second layer and the pixel value of the guide image is equal to or greater than the predetermined threshold value, the processing advances to step S153, at which the drawing section 639 performs, for a sampling point of a triangle patch of the texture image of the second layer decided that the difference between the pixel values is equal to or greater than the predetermined threshold value, blending of the pixel value (RGB value) of the texture image of the second layer and the pixel value (RGB value) of the guide image at a predetermined blend ratio. In the case where the blend ratio of the guide image is 100%, the pixel value of the texture image of the second layer is overwritten with the pixel value of the guide image.

On the other hand, in the case where it is decided at step S152 that, in regard to all sampling points in the occlusion processing region, the difference between the pixel value of the texture image of the second layer and the pixel value of the guide image is not equal to or greater than the predetermined threshold value, the process at step S153 is skipped.

At step S154, the drawing section 639 perspectively projects the triangle patches drawn in the 3D model coordinate system to a viewing range using the viewing position supplied from the sight line detection section 634 as a viewpoint to generate a display image. At step S155, the drawing section 639 transmits the display image to the conversion apparatus 14 of FIG. 1.

According to the second reproduction process described above, the drawing section 639 can improve the picture quality of the display image since it can compare pixel values in an occlusion processing region of texture images of the second layer with pixel values of guide images as correct answer images and rewrite the pixel values in response to a result of the comparison.

Figure 40:
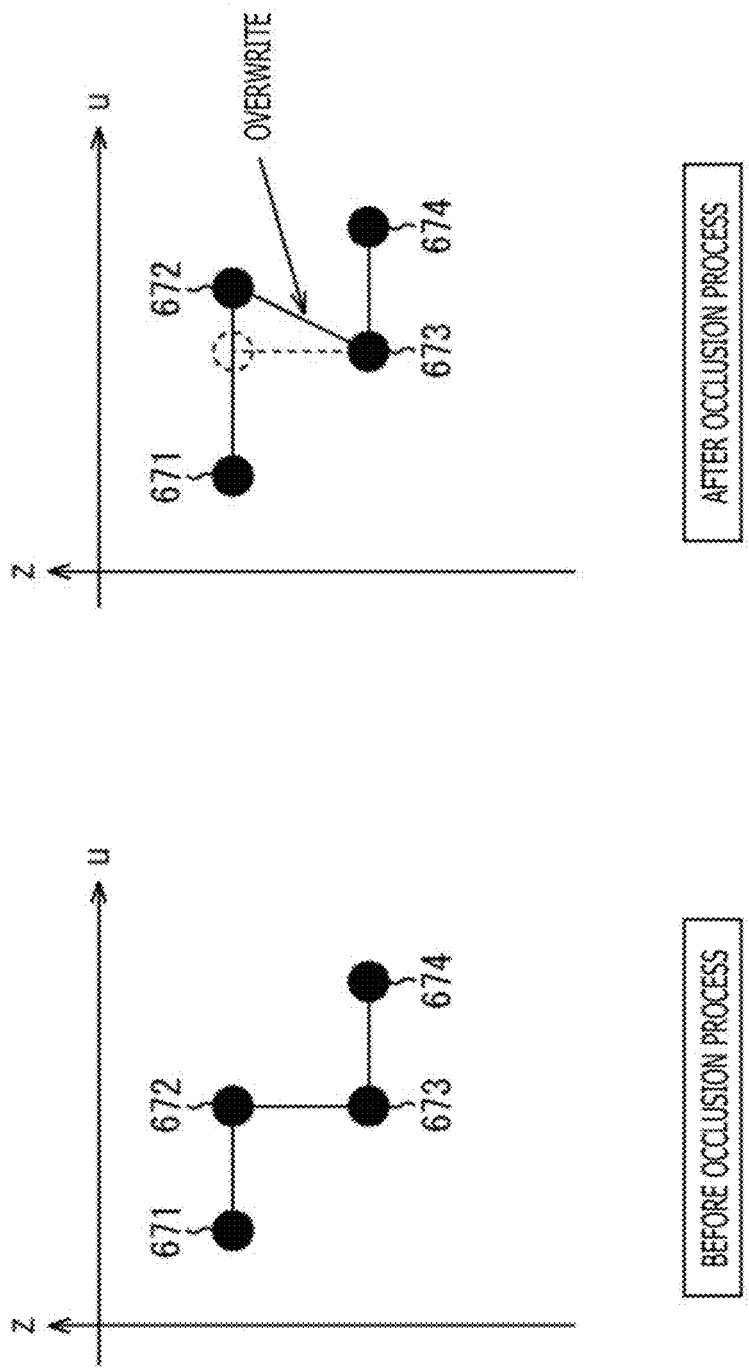
FIGS. 40A and 40B are views depicting a concept of the second reproduction process.

FIGS. 40A and 40B are views depicting a concept of the second reproduction process.

In FIGS. 40A and 40B, the axis of abscissa represents a u axis and the axis of ordinate represents a z axis. Further, a black round mark represents a sampling point. Further, in the example of FIGS. 40A and 40B, as the position in the depth direction comes to the deeper side, the z coordinate increases.

The u coordinate of a sampling point 672 from among sampling points 671 to 674 of the second layer is corrected by the occlusion process of the occlusion processing section 261.

In this case, the drawing section 639 performs blending of a triangle patch including the sampling point 672 in an occlusion processing region, namely, a triangle patch having vertices at the sampling points 672 and 673 and a further sampling point not detected, at a predetermined blend ratio using pixel values of the guide image.

Figure 41:
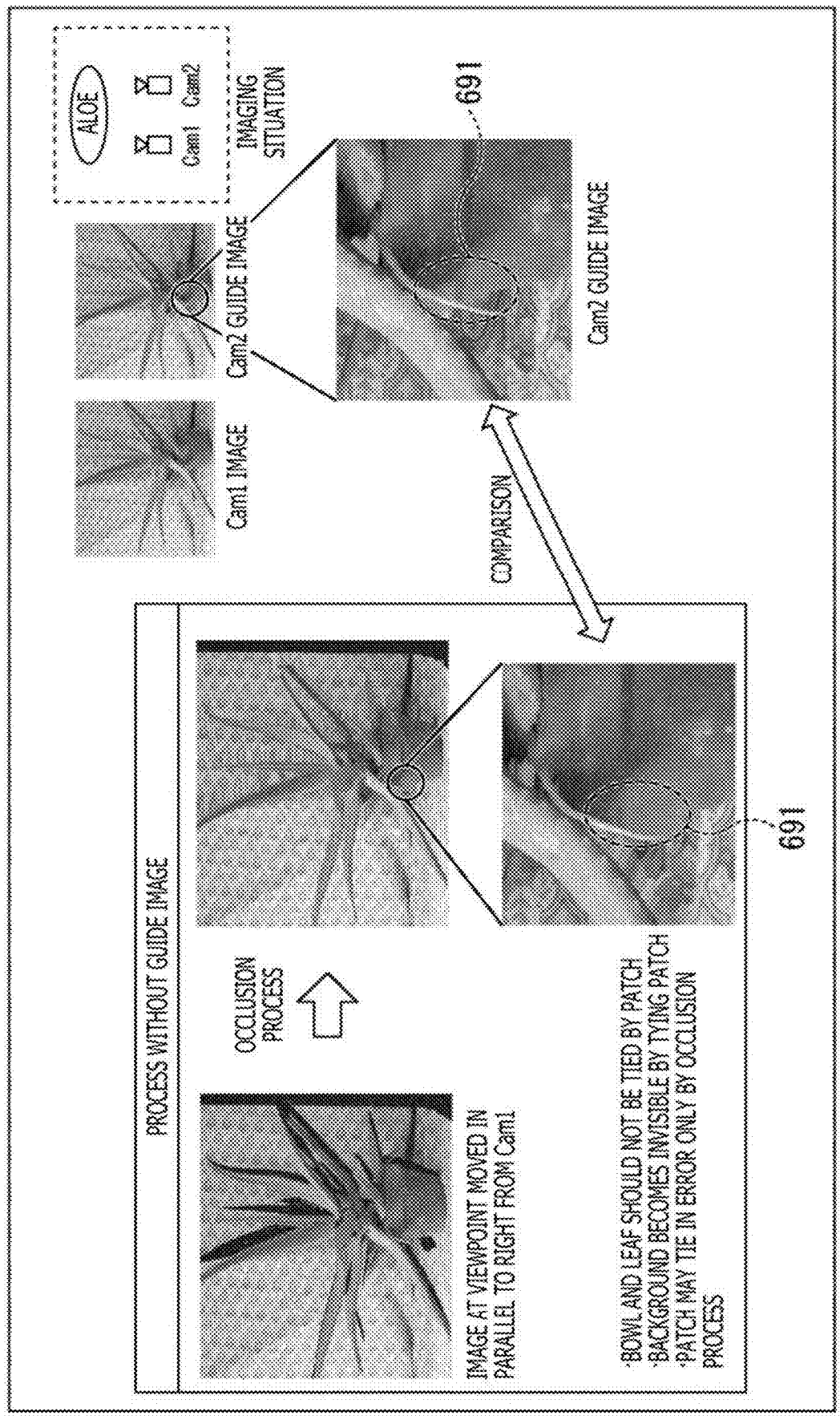
FIG. 41 is a view illustrating the second reproduction process using a particular image.

FIG. 41 is a view illustrating the second reproduction process using a particular image.

A case is described in which, as depicted at a right upper portion in FIG. 41, an aloe as an imaging object is imaged by a camera Cam1 and another camera Cam2 and an image picked up by the camera Cam1 is set as a texture image of the first layer and an image picked up by the camera Cam2 is set as a guide image.

For example, in the case where the drawing section 639 applies an occlusion process to generate an image of a viewpoint moved in parallel to right from the viewpoint of the camera Cam1, although a region 691 between a bowl and a leaf surrounded by a broken line should not be tied by a patch, a patch may be tied in error by an occlusion process.

At this time, if a guide image picked up by the camera Cam2 is available, then the inappropriately tied patch can be removed by comparing the image after the occlusion process and the guide image with each other, and the picture quality can be improved thereby.

As described above, according to the second reproduction process, since pixel values in an occlusion processing region of the second layer can be rewritten using the guide image as a correct answer image, the picture quality of a display image can be improved.

(Guide Image)

As described above, a guide image is an image that is referred to in order to replace the pixel values in an imaginary region of the second layer hidden by a foreground given by an imaging object included in a texture image of the first layer with more appropriate pixel values and is, as it were, an image to be referred to as a correct answer (image of Ground Truth).

Although, in the example described above, images actually imaged by the six cameras 11a to 11f configuring the multi camera 11 or images actually imaged by the cameras 11g to 11j disposed separately from the multi camera 11 are used, not picked up images outputted from the cameras but reconstructed images may be used. Further, the resolution, frame rate or presence/absence of depth images may be different from that of texture images of the first and second layers.

Although the difference in resolution or frame rate and presence/absence of a depth image can be determined as occasion demands, for example, the resolution and so forth of a guide image can be changed by the distance from a camera for picking up the guide image to an imaging object.

Figures 42A, 42B:
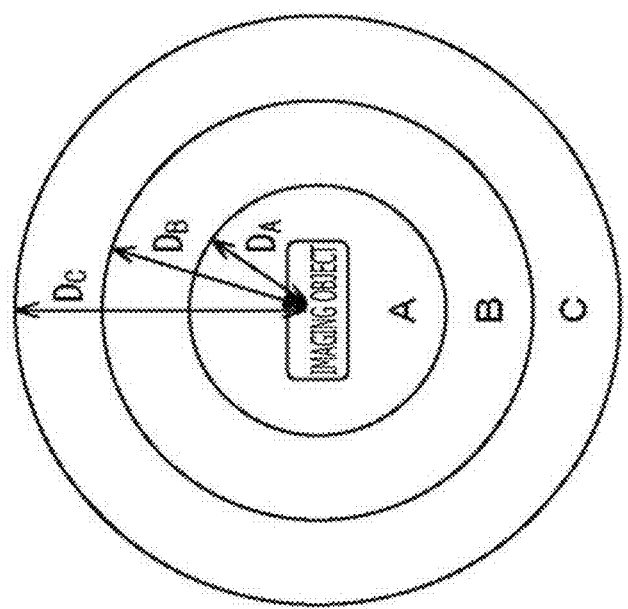
FIGS. 42A and 42B are views illustrating a guide image.

FIGS. 42A and 42B depicts an example in which the resolution of a guide image, the frame rate and presence/absence of a depth image are changed in response to the distance from a camera for picking up the guide image to an imaging object.

In the example of FIGS. 42A and 42B, the distance from a camera for picking up a guide image to an imaging object varies among three distances DA, DB and DC (DA<DB<DC) depending upon arrangement of the cameras.

The guide image picked up by the camera at the distance $D_A$ has a resolution of 1920×1080 pixels, an acquisition frame rate of 30 fps (frame per second) and depth information.

The guide image picked up by the camera at the distance $D_B$ has a resolution of 960×540 pixels, an acquisition frame rate of 20 fps and depth information.

The guide image picked up by the camera at the distance $D_C$ has a resolution of 480×270 pixels, an acquisition frame rate of 10 fps and no depth information.

In this manner, the resolution and so forth of a guide image can be changed by the distance from a camera for picking up a guide image to an imaging object.

As an alternative, all cameras may perform imaging with a high resolution (for example, 1920×1080 pixels), a high frame rate (for example, 60 fps) and depth information such that transmission is performed changing the resolution, frame rate and presence/absence of depth information in response to a network frequency band upon transmission.

The second embodiment described above is directed to an example in which guide images as guide information are added to and transmitted together with texture images and depth images of a plurality of layers including the first layer and the second layer described hereinabove in connection with the first embodiment.

However, guide images may be added to and transmitted together with, not texture images and depth images of a plurality of layers, but texture images and depth images of one layer corresponding only to the first layer described hereinabove. Also in this case, the picture quality of a display image can be improved by comparing, when a display image in which a viewpoint is moved on the basis of texture images and depth images of the single first layer on the home server 13 side is generated, the generated display image and a guide image with each other and blending pixel values of the guide image at a predetermined blend ratio.

3. Third Embodiment (Configuration Example of Third Embodiment of Image Displaying System)

Figure 43:
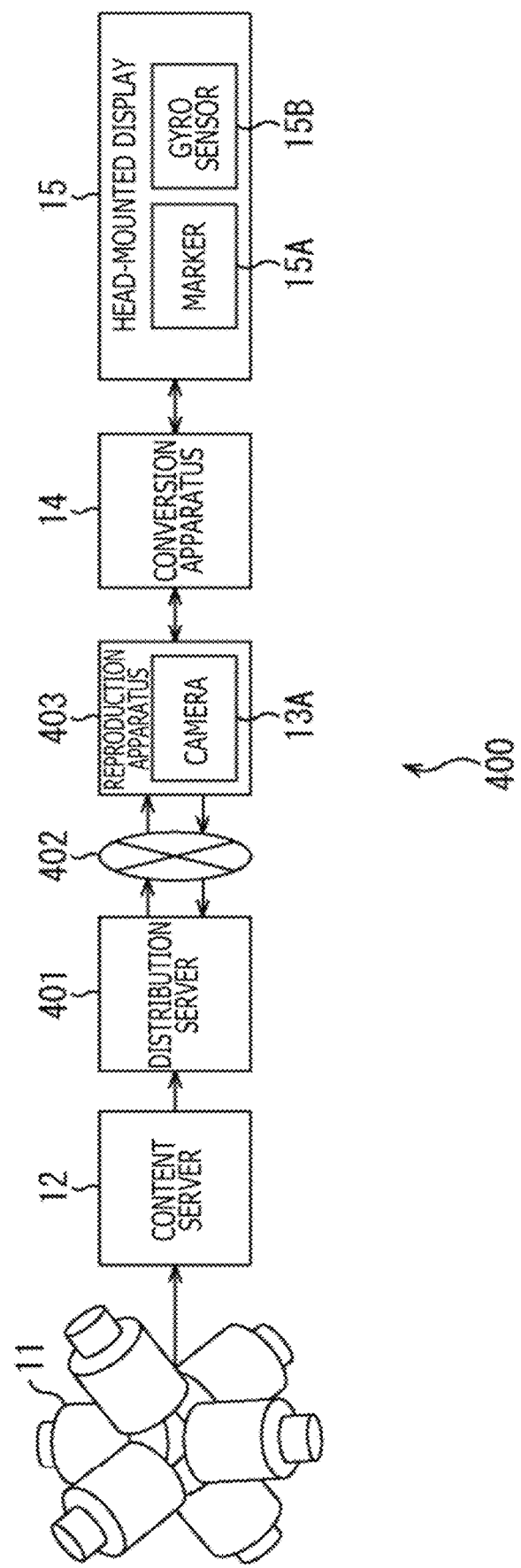
FIG. 43 is a block diagram depicting a configuration example of a third embodiment of an image displaying system to which the present disclosure is applied.

FIG. 43 is a block diagram depicting a configuration example of a third embodiment of the image displaying system to which the present disclosure is applied.

Like components depicted in FIG. 43 to those of FIG. 1 are denoted by like reference characters. Overlapping description is suitably omitted.

The image displaying system 400 of FIG. 43 includes a multi camera 11, a content server 12, a conversion apparatus 14, a head mounted display 15, a distribution server 401, a network 402, and a reproduction apparatus 403. In the image displaying system 400, only a first layer texture stream, a first layer depth stream, a second layer texture stream and a second layer depth stream of one face corresponding to a sight line from among six faces are distributed to and reproduced by the reproduction apparatus 403.

In particular, the distribution server 401 of the image displaying system 400 receives and stores a low resolution texture stream and a low resolution depth stream, first layer texture streams, first layer depth streams, second layer texture streams and second layer depth streams of six faces, and metadata transmitted thereto from the content server 12.

Further, the distribution server 401 is connected to the reproduction apparatus 403 through the network 402. The distribution server 401 transmits a low resolution texture stream and a low resolution depth stream, a first layer texture stream, a first layer depth stream, a second layer texture stream and a second layer depth stream of one face and metadata stored therein to the reproduction apparatus 403 through the network 402 in response to a request from the reproduction apparatus 403.

The reproduction apparatus 403 (image processing apparatus) requests the distribution server 401 for a low resolution texture stream, a low resolution depth stream and metadata through the network 402 and accepts a low resolution texture stream, a low resolution depth stream and metadata transmitted thereto in accordance with the request.

Further, the reproduction apparatus 403 has a camera 13A built therein. Similarly to the home server 13, the reproduction apparatus 403 detects a viewing position in a 3D model coordinate system and determines a sight line direction and a viewing range of the viewer in the 3D model coordinate system.

Then, the reproduction apparatus 403 determines, on the basis of the viewing position and the sight line direction in the 3D model coordinate system and a table of the first layer included in metadata, one face corresponding to a sight line vector closest the sight line from among the six faces of the first layer as a selection face. The reproduction apparatus 403 request for a first layer texture stream, a first layer depth stream, a second layer texture stream and a second layer depth stream corresponding to the one selection face through the network 402. The reproduction apparatus 403 receives a first layer texture stream, a first layer depth stream, a second layer texture stream and a second layer depth stream corresponding to the one selection face transmitted thereto in response to the request.

The reproduction apparatus 403 uses the low resolution texture stream and the low resolution depth stream as well as the first layer texture stream, first layer depth stream, second layer texture stream and second layer depth stream corresponding to the one selection face to generate a display image. The process for generating a display image of the reproduction apparatus 403 is similar to the process of the home server 13 except that the number of selection faces is one, and therefore, description of the same is omitted. The reproduction apparatus 403 transmits the display image to the conversion apparatus 14 through an HDMI cable not depicted.

<4. Different Example of Texture Image>

Figure 44A:
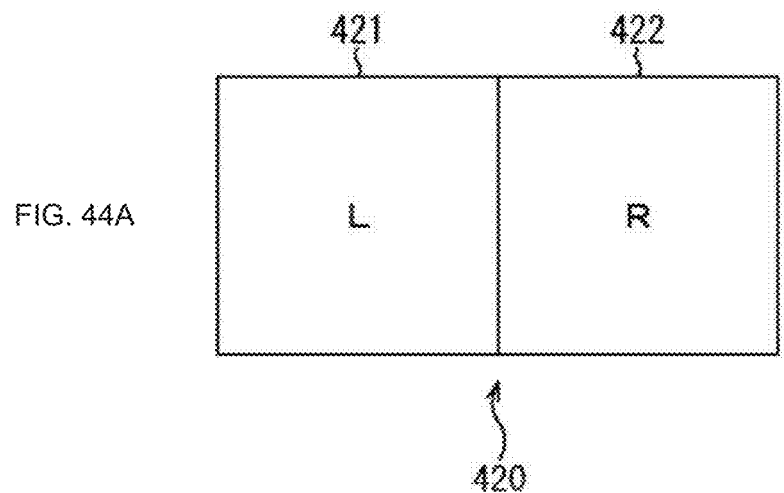
FIGS. 44A and 44B are views depicting a different example of a texture image of a first layer.
Figure 44B:
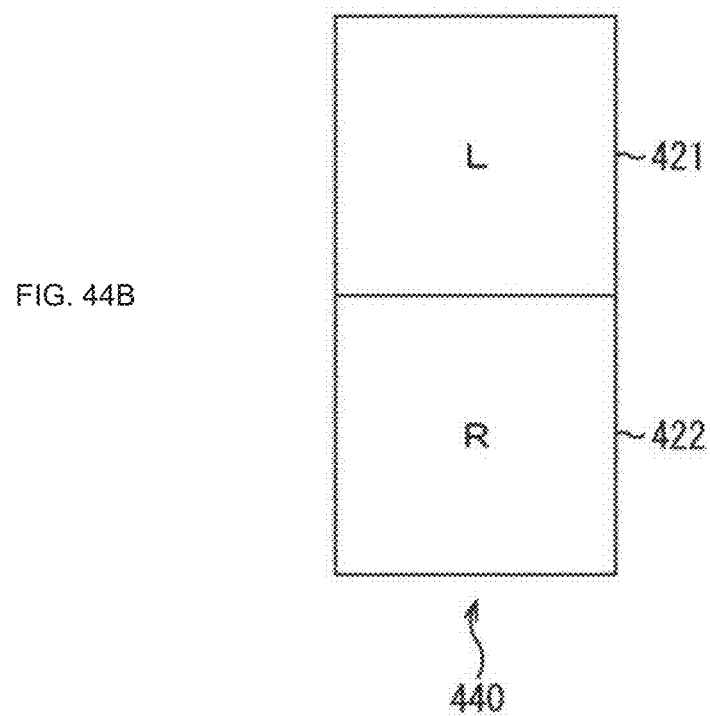

FIGS. 44A and 44B are views depicting a different example of a texture image of the first layer.

While, in the foregoing description, the texture image of each face of the first layer is a texture image of one viewpoint O, it may be a composite image of texture images of a viewpoint for the left eye and a viewpoint for the left eye corresponding to the viewpoint O.

In particular, the texture image of each face of the first layer may be, as depicted in FIG. 44A, for example, a packing image 420 obtained by packing a texture image 421 of each face of the first layer of a viewpoint for the left eye corresponding to the viewpoint O and a texture image 422 of each face of the first layer of the viewpoint for the right eye in the transverse direction (horizontal direction).

Further, as depicted in FIG. 44B, a texture image of each face of the first layer may be, for example, a packing image 440 obtained by packing a texture image 421 and a texture image 422 in a vertical direction (vertical direction).

Similarly, a texture image of each face of the second layer may be, for example, a packing image obtained by packing a texture image of the second layer of a viewpoint for the left eye corresponding to one viewpoint of the second layer on the face and a texture image of the second layer of a viewpoint for the right eye in a transverse direction or a vertical direction.

As described above, in the case where a texture image of each of the faces of the first layer and the second layer is a texture image obtained by packing images of a viewpoint for the left eye and a viewpoint for the right eye, a texture image obtained as a result of decoding is separated into a texture image of a viewpoint for the left eye and a texture image of a viewpoint for the right eye. Then, three-dimensional data for the left eye and three-dimensional data for the right eye are generated in regard to the first layer and the second layer.

Then, a display image for the left eye is generated from the three-dimensional data for the left eye on the basis of the viewing direction and the viewing position of the left eye corresponding to the viewing direction and the viewing position of the viewer. Further, a display image for the right eye is generated from the three-dimensional data for the right eye on the basis of the viewing direction and the viewing position of the right eye corresponding to the viewing direction and the viewing position of the viewer. Then, in the case where the head mounted display 15 can perform 3D display, the head mounted display 15 displays the display image for the left eye as an image for the left eye and displays the display image for the right eye as an image for the right eye to 3D display the display image.

It is to be noted that, while, in the first to third embodiments, picked up images are mapped to a regular octahedron to generate an omnidirectional image, the 3D model to which picked up images are to be mapped can be, in addition to a regular octahedron, a sphere, a cube or the like. In the case where picked up images are mapped to a sphere, the omnidirectional image is an image, for example, according to a positive pyramid projection of a sphere to which picked up images are mapped.

Further, a low resolution texture stream and a low resolution depth stream may not be generated. Depth images of the first layer and the second layer may not be generated. Further, a texture image and a depth image of the second layer may be generated only on one of faces to which a picked up image of a significant imaging object is mapped.

Furthermore, also low resolution texture images and low resolution depth images may be generated in a hierarchized state similarly to texture images and depth images of a high resolution.

5. Fourth Embodiment (Description of Computer to which Present Disclosure is Applied)

While the series of processes described above can be executed by hardware, it may otherwise be executed by software. Where the series of processes is executed by software, a program that constructs the software is installed into a computer. Here, the computer includes a computer incorporated in hardware for exclusive use, for example, a personal computer for universal use that can execute various functions by installing various programs, and so forth.

Figure 45:
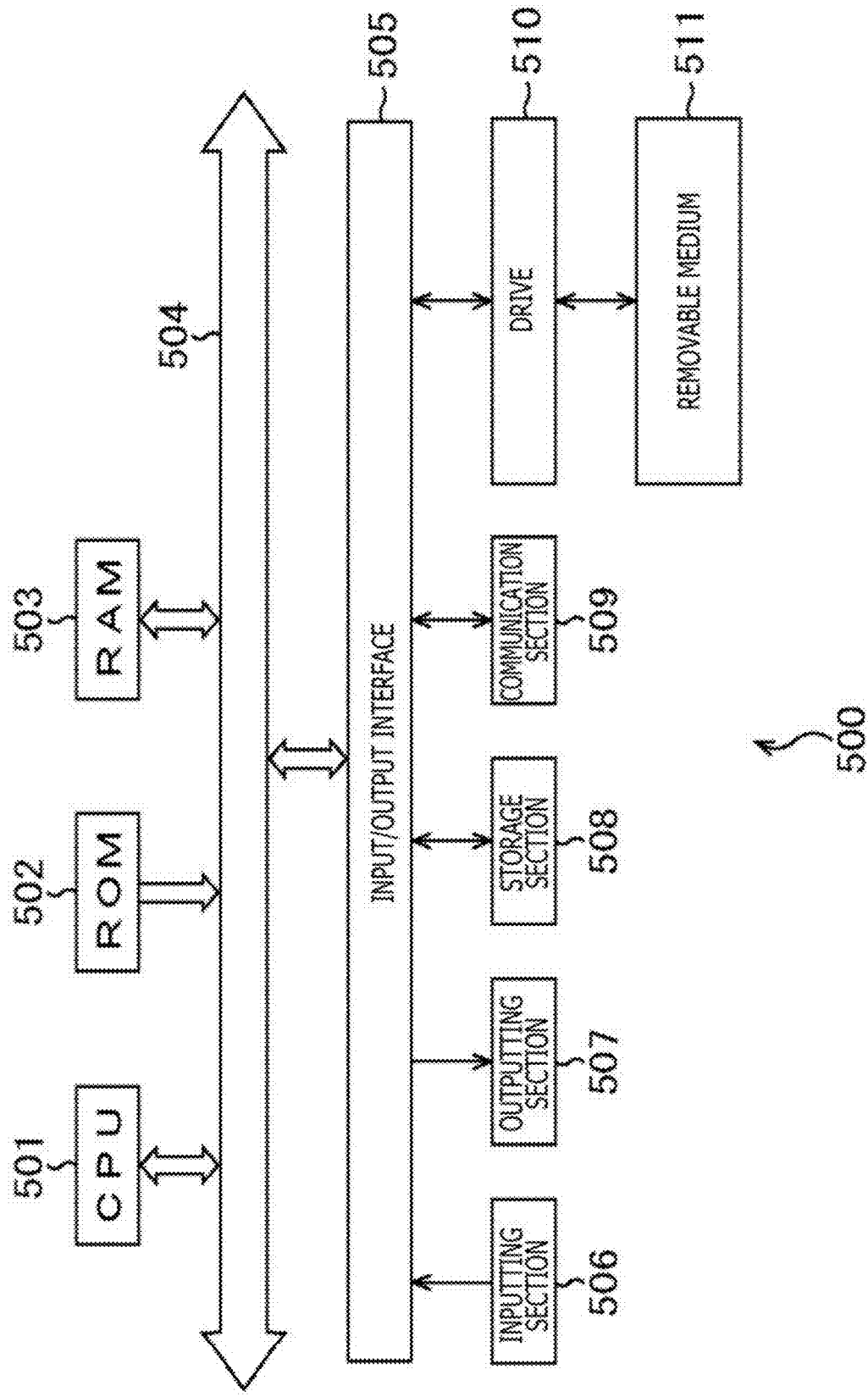
FIG. 45 is a block diagram depicting a configuration example of hardware of a computer.

FIG. 45 is a block diagram depicting a configuration example hardware of a computer that executes the series of processes described hereinabove in accordance with a program.

In the computer 500, a CPU (Central Processing Unit) 501, a ROM (Read Only Memory) 502 and a RAM (Random Access Memory) 503 are connected to each other by a bus 504.

To the bus 504, an input/output interface 505 is connected further. To the input/output interface 505, an inputting section 506, an outputting section 507, a storage section 508, a communication section 509 and a drive 510 are connected.

The inputting section 506 includes a keyboard, a mouse, a microphone and so forth. The outputting section 507 includes a display, a speaker and so forth. The storage section 508 includes a hard disk, a nonvolatile memory and so forth. The communication section 509 includes a network interface or the like. The drive 510 drives a removable medium 511 such as a magnetic disk, an optical disk, a magneto-optical disk, a semiconductor memory or the like.

In the computer 500 configured in such a manner as described above, the CPU 501 loads a program stored, for example, in the storage section 508 into the RAM 503 through the input/output interface 505 and the bus 504 to perform the series of processes described above.

The program that is executed by the computer 500 (CPU 501) can be recorded into and provided as the removable medium 511, for example, as a package medium or the like. Further, the program can be provided through a wired or wireless transmission medium such as a local area network, the Internet, a digital satellite broadcast or the like.

In the computer 500, a program can be installed into the storage section 508 through the input/output interface 505 by mounting a removable medium 511 on the drive 510. Further, the program can be received by the communication section 509 through a wired or wireless transmission medium and installed into the storage section 508. Further, the program can be installed in advance into the ROM 502 or the storage section 508.

It is to be noted that the program executed by the computer 500 may be a program in which processes are performed in time series in accordance with the order described herein or may be a program in which processes are executed in parallel or at a necessary timing such as, for example, when the program is called or the like.

6. Application Example

The technology according to the present disclosure can be applied to various products. For example, the technology according to the present disclosure may be implemented as an apparatus that is incorporated in various types of mobile bodies such as automobiles, hybrid electric cars, motorcycles, bicycles, personal mobilities, airplanes, drones, ships, robots, construction machines, agricultural machines (tractors) and so forth.

FIG. 46 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 46, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 46 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 47 depicts an example of installation positions of the imaging section 7410 and the outside-vehicle information detecting section 7420. Imaging sections 7910, 7912, 7914,

7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 47 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 46, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 46, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 46 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It is to be noted that a computer program for implementing the functions of the image displaying system 10 (400) according to the present embodiments with reference to FIGS. 1, 2, 3, 4A, 4B, 5A, 5B, 6, 7, 8A, 8B, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24A, 25A, 25B, 26, 27, 28, 29, 30, 31A, 31B, 32, 33, 34, 35, 36, 37, 38, 39, 40A, 40B, 41, 42A, 42B, and 43 can be incorporated into some control unit or the like. Further, also it is possible to provide a computer-readable recording medium in which such a computer program as just described is stored. The recording medium may be, for example, a magnetic disk, an optical disk, a magneto-optical disk, a flash memory or the like. Further, the computer program described above may be distributed, for example, through a network without using a recording medium.

In the vehicle control system 7000 described above, the image displaying system 10 (400) according to the present embodiments described hereinabove with reference to FIGS. 1, 2, 3, 4A, 4B, 5A, 5B, 6, 7, 8A, 8B, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24A, 25A, 25B, 26, 27, 28, 29, 30, 31A, 31B, 32, 33, 34, 35, 36, 37, 38, 39, 40A, 40B, 41, 42A, 42B, and 43 can be applied to the vehicle control system 7000 of the application example depicted in FIG. 46. For example, the multi camera 11 of the image displaying system 10 (400) corresponds at least to part of the imaging section 7410. Further, the content server 12, home server 13 (distribution server 401, network 402 and reproduction apparatus 403) and conversion apparatus 14 are integrated and correspond to the microcomputer 7610 and the storage section 7690 of the integrated control unit 7600. The head mounted display 15 corresponds to the display section 7720. It is to be noted that, in the case where the image displaying system 10 (400) is applied to the vehicle control system 7000, the camera 13A, marker 15A and gyro sensor 15B are not provided, and a sight line direction and a viewing position of a viewer are inputted by an operation of the input section 7800 by a passenger who is a viewer. By applying the image displaying system 10 (400) to the vehicle control system 7000 of the application example depicted in FIG. 46 in such a manner as described, a display image of high picture quality can be generated using an omnidirectional image.

Further, at least part of the components of the image displaying system 10 (400) described hereinabove with reference to FIGS. 1, 2, 3, 4A, 4B, 5A, 5B, 6, 7, 8A, 8B, 9, 10, 11, 12A, 12B, 12C, 13A, 13B, 13C, 14A, 14B, 15, 16A, 16B, 17, 18, 19, 20, 21A, 21B, 22, 23A, 23B, 24A, 24A, 25A, 25B, 26, 27, 28, 29, 30, 31A, 31B, 32, 33, 34, 35, 36, 37, 38, 39, 40A, 40B, 41, 42A, 42B, and 43 may be implemented by a module for the integrated control unit 7600 depicted in FIG. 46 (for example, by an integrated circuit module configured by one die). As an alternative, the image displaying system 10 (400) described with reference to FIGS. 1, 2, 3, 4A, 4B, 5A, 5B, 6, 7, 8A, 8B, 9, 10, 11, 12A, 12B, 120, 13A, 13B, 130, 14A, 14B, 15, 16A, 16B, 17, 18, 19, 20, 21A, 21B, 22, 23A, 23B, 24A, 24A, 25A, 25B, 26, 27, 28, 29, 30, 31A, 31B, 32, 33, 34, 35, 36, 37, 38, 39, 40A, 40B, 41, 42A, 42B, and 43 may be implemented by a plurality of control units of the vehicle control system 7000 depicted in FIG. 46.

In the present specification, the term system is used to signify an aggregation including a plurality of constituent elements (devices, modules (parts) and so forth) and it does not matter whether or not all of the constituent elements are accommodated in the same housing. Accordingly, a plurality of apparatus accommodated in separate housings and connected to each other through a network configure a system, and also one apparatus that includes a plurality of modules accommodated in a single housing configures a system.

It is to be noted that the advantageous effects described herein are illustrative to the last and are not restrictive, and other advantages may be available.

Further, the embodiment of the present disclosure is not limited to the embodiments described hereinabove, and various alterations are possible without departing from the subject matter of the present disclosure.

For example, the present disclosure can assume a configuration for crowd computing in which one function is shared by a plurality of devices through a network and processed in collaboration.

Further, the steps described hereinabove in connection with the flow charts can be executed by a single apparatus or can be executed by sharing by a plurality of apparatus.

Further, where one step includes a plurality of processes, the plurality of processes included in the one step can be executed by a single device and also can be executed by sharing by a plurality of apparatus.

It is to be noted that the present disclosure can assume such a configuration as described below.

(1)

An image processing apparatus, including:

a reception section configured to receive a texture image and a depth image as well as a guide image to be referred to upon generation of a display image in which the texture image and the depth image are used; and a guide image utilization section configured to compare a pixel value of the display image generated using the texture image and the depth image and a corresponding pixel value of the guide image with each other and execute a process for changing the pixel value in response to a result of the comparison.

(2)

The image processing apparatus according to (1) above, in which the texture image and the depth image include a texture image and a depth image of a first layer and a texture image and a depth image of a second layer, the texture image and the depth image of the first layer include a texture image and a depth image of an omnidirectional image, and the texture image and the depth image of the second layer include a texture image and a depth image in an occlusion region at a viewpoint of the texture image of the first layer.

(3)

The image processing apparatus according to (2) above, in which the guide image utilization section compares a pixel value of the display image corresponding to an imaginary region of the texture image of the second layer and a corresponding pixel value of the guide image with each other and changes the pixel value in response to a result of the comparison.

(4)

The image processing apparatus according to (2) above, in which the guide image utilization section compares a pixel value of the display image corresponding to an occlusion processing region of the texture image of the second layer and a corresponding pixel value of the guide image with each other and changes the pixel value in response to a result of the comparison.

(5)

The image processing apparatus according to any one of (1) to (4) above, in which the guide image utilization section compares a pixel value of the display image generated using the texture image and the depth image and a corresponding pixel value of the guide image with each other, and executes a blending process of blending the pixel value of the display image and the corresponding pixel value of the guide image at a given blend ratio in response to a result of the comparison.

(6)

The image processing apparatus according to any one of (1) to (5) above, in which the guide image has also depth information.

(7)

The image processing apparatus according to any one of (1) to (6) above, in which a resolution of the guide image is lower than a resolution of the texture image.

(8)

The image processing apparatus according to any one of (1) to (7) above, in which a frame rate of the guide image is lower than a frame rate of the texture image.

(9)

An image processing method by an image processing apparatus, including the steps of:

receiving a texture image and a depth image as well as a guide image to be referred to upon generation of a display image in which the texture image and the depth image are used; and comparing a pixel value of the display image generated using the texture image and the depth image and a corresponding pixel value of the guide image with each other and executing a process for changing the pixel value in response to a result of the comparison.

(10)

An image processing apparatus, including:

an image generation section configured to generate a texture image and a depth image as well as a guide image to be referred to upon generation of a display image in which the texture image and the depth image are used.

(11)

The image processing apparatus according to (10) above, in which the texture image and the depth image include a texture image and a depth image of a first layer and a texture image and a depth image of a second layer, the texture image and the depth image of the first layer include a texture image and a depth image of an omnidirectional image, and the texture image and the depth image of the second layer include a texture image and a depth image in an occlusion region at a viewpoint of the texture image of the first layer.

(12)

The image processing apparatus according to (10) above, in which the guide image includes an actual image of a camera used for generation of a texture image and a depth image of the first layer.

(13)

The image processing apparatus according to (10) above, in which the guide image includes an actual image of a camera installed at a position different from that of a camera used for generation of a texture image and a depth image of the first layer.

(14)

The image processing apparatus according to any one of (10) to (13) above, in which the guide image has also depth information.

(15)

The image processing apparatus according to any one of (10) to (14) above, in which a resolution of the guide image is lower than a resolution of the texture image.

(16)

The image processing apparatus according to any one of (10) to (15) above, in which a frame rate of the guide image is lower than a frame rate of the texture image.

(17)

An image processing method by an image processing apparatus, including the step of:

generating a texture image and a depth image as well as a guide image to be referred to upon generation of a display image in which the texture image and the depth image are used.

REFERENCE SIGNS LIST

12 Content server, 13 Home server, 34 High resolution image processing section, 235 to 237 ML3D model generation section, 239 Drawing section, 611 Guide information generation section, 612 Encoder, 613 Setting section, 614 Metadata generation section, 631 Reception section, 632 Storage, 634 Sight line detection section, 635 to 637 ML3D model generation section, 639 Drawing section, 256 3D model generation section, 262 3D model generation section, 655 3D model generation section, 501 CPU, 502 ROM, 503 RAM, 506 Inputting section, 507 Outputting section, 508 Storage section, 509 Communication section, 510 Drive

The invention claimed is:

1. An image processing apparatus, comprising:
a processor configured to:
receive a texture image and a depth image of a first layer, a texture image and a depth image of a second layer, and a guide image;
generate a display image including an occlusion region of the first layer in a viewing range, wherein
the display image is generated using the texture image and the depth image of the second layer based on a change in a viewpoint from a first viewpoint to a second viewpoint, and
the first viewpoint is different from the second viewpoint;
compare a pixel value of the display image with a corresponding pixel value of the guide image; and
execute a process to change the pixel value of the display image in response to a result of the comparison.

2. The image processing apparatus according to claim 1, wherein
the texture image and the depth image of the first layer include an omnidirectional image.

3. The image processing apparatus according to claim 1, wherein the processor is further configured to:
compare the pixel value of the display image corresponding to an imaginary region of the texture image of the second layer with the corresponding pixel value of the guide image; and
change the pixel value of the display image in response to the result of the comparison.

4. The image processing apparatus according to claim 1, wherein the processor is further configured to:
compare the pixel value of the display image corresponding to the occlusion region of the texture image of the second layer with the corresponding pixel value of the guide image; and
change the pixel value of the display image in response to the result of the comparison.

5. The image processing apparatus according to claim 1, wherein the processor is further configured to:
compare the pixel value of the display image generated using the texture image and the depth image with the corresponding pixel value of the guide image; and
execute a blending process to blend the pixel value of the display image and the corresponding pixel value of the guide image at a given blend ratio in response to the result of the comparison.

6. The image processing apparatus according to claim 1, wherein the guide image includes depth information.

7. The image processing apparatus according to claim 1, wherein a resolution of the guide image is lower than a resolution of the texture image.

8. The image processing apparatus according to claim 1, wherein a frame rate of the guide image is lower than a frame rate of the texture image.

9. An image processing method, comprising:
in an image processing apparatus:
receiving a texture image and a depth image of a first layer, a texture image and a depth image of a second layer, and a guide image;
generating a display image including an occlusion region of the first layer in a viewing range, wherein
the display image is generated using the texture image and the depth image of the second layer based on a change in a viewpoint from a first viewpoint to a second viewpoint, and
the first viewpoint is different from the second viewpoint;
comparing a pixel value of the display image with a corresponding pixel value of the guide image; and
executing a process for changing the pixel value of the display image in response to a result of the comparison.

10. An image processing apparatus, comprising:
a processor configured to:
generate a texture image and a depth image of a first layer, a texture image and a depth image of a second layer, and a guide image; and
transmit the texture image and the depth image of the first layer and the texture image and the depth image of the second layer for generation of a display image including an occlusion region of the first layer in a viewing range, wherein
the display image is generated using the texture image and the depth image of the second layer based on a change in a viewpoint from a first viewpoint to a second viewpoint, and
the first viewpoint is different from the second viewpoint.

11. The image processing apparatus according to claim 10, wherein
the texture image and the depth image of the first layer include an omnidirectional image.

12. The image processing apparatus according to claim 10, wherein the guide image includes a first image of a first camera used for the generation of the texture image and the depth image of the first layer.

13. The image processing apparatus according to claim 12, wherein the guide image further includes a second image of a second camera installed at a position different from a position of the first camera used for the generation of the texture image and the depth image of the first layer.

14. The image processing apparatus according to claim 10, wherein the guide image further includes depth information.

15. The image processing apparatus according to claim 10, wherein a resolution of the guide image is lower than a resolution of the texture image.

16. The image processing apparatus according to claim 10, wherein a frame rate of the guide image is lower than a frame rate of the texture image.

17. An image processing method, comprising:
in an image processing apparatus:
generating a texture image and a depth image of a first layer and a texture image and a depth image of a second layer, and a guide image; and
transmitting the texture image and the depth image of the first layer and the texture image and the depth image of the second layer for generation of a display image including an occlusion region of the first layer in a viewing range, wherein
the display image is generated using the texture image and the depth image of the second layer based on a change in a viewpoint from a first viewpoint to a second viewpoint, and
the first viewpoint is different from the second viewpoint.

* * * * *